(12) United States Patent
Maruyama et al.

(10) Patent No.: US 8,120,665 B2
(45) Date of Patent: Feb. 21, 2012

(54) IMAGE PROCESSING METHOD AND APPARATUS, DIGITAL CAMERA, AND RECORDING MEDIUM RECORDING IMAGE PROCESSING PROGRAM

(75) Inventors: Go Maruyama, Tokyo (JP); Shin Aoki, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 710 days.

(21) Appl. No.: 12/063,684

(22) PCT Filed: Aug. 9, 2006

(86) PCT No.: PCT/JP2006/316076
§ 371 (c)(1),
(2), (4) Date: Feb. 13, 2008

(87) PCT Pub. No.: WO2007/023715
PCT Pub. Date: Mar. 1, 2007

(65) Prior Publication Data
US 2009/0225180 A1 Sep. 10, 2009

(30) Foreign Application Priority Data

Aug. 25, 2005 (JP) .................................. 2005-243958
Aug. 31, 2005 (JP) .................................. 2005-251440

(51) Int. Cl.
*H04N 5/235* (2006.01)
(52) U.S. Cl. ..................... 348/222.1; 348/239; 348/252; 382/282
(58) Field of Classification Search .................. None
See application file for complete search history.

(56) References Cited

U.S. PATENT DOCUMENTS

| 2004/0165786 A1* | 8/2004 | Zhang et al. | 382/276 |
| 2005/0013486 A1* | 1/2005 | Wiedemann et al. | 382/181 |
| 2005/0078200 A1* | 4/2005 | Morichika | 348/231.99 |

FOREIGN PATENT DOCUMENTS

| JP | 5 252352 | 9/1993 |
| JP | 9 288741 | 11/1997 |
| JP | 11 238123 | 8/1999 |
| JP | 2000 341501 | 12/2000 |
| JP | 2001 177716 | 6/2001 |
| JP | 2002 359838 | 12/2002 |
| JP | 2005 122320 | 5/2005 |
| JP | 2005 122328 | 5/2005 |

* cited by examiner

*Primary Examiner* — Jason Chan
*Assistant Examiner* — Yih-Sien Kao
(74) *Attorney, Agent, or Firm* — Oblon, Spivak, McClelland, Maier & Neustadt, L.L.P.

(57) ABSTRACT

A technology for recognizing one or more quadrangles from an input image is disclosed. Edge areas are detected from the input image, lines corresponding to the edge areas are extracted, a line pair selected from the extracted lines is categorized according to a positional relationship between two lines included in the line pair, a line pair evaluation value is calculated for the line pair, a combination of two line pairs is selected, a quadrangle is generated from four lines included in the two line pairs selected, a quadrangle evaluation value is calculated for the quadrangle based on the categories and the line pair evaluation values of the two line pairs forming the quadrangle, and a quadrangle is selected based on the calculated quadrangle evaluation value.

12 Claims, 43 Drawing Sheets

FIG.2
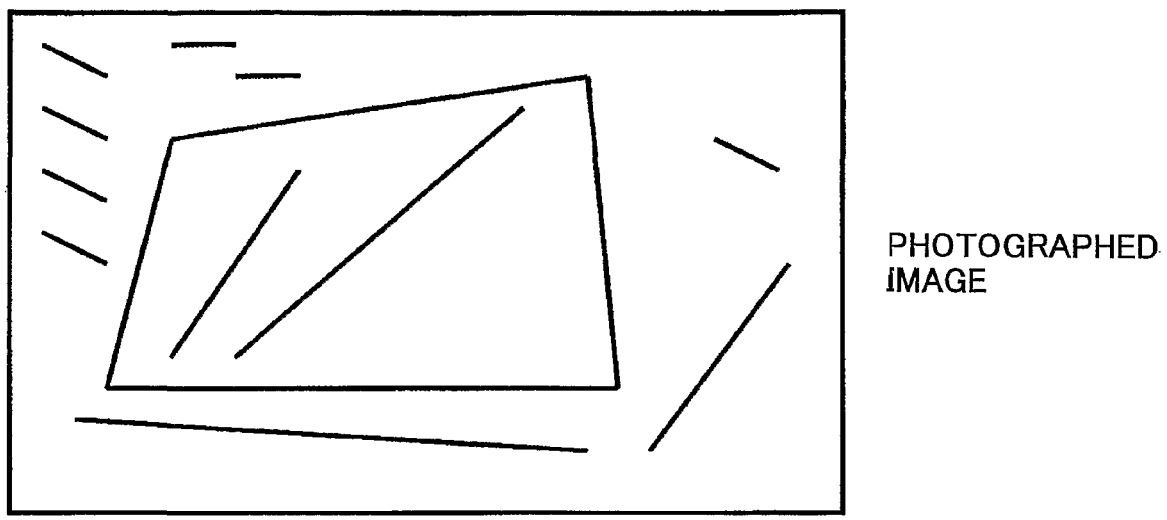
PHOTOGRAPHED IMAGE
DISTORTION CORRECTION
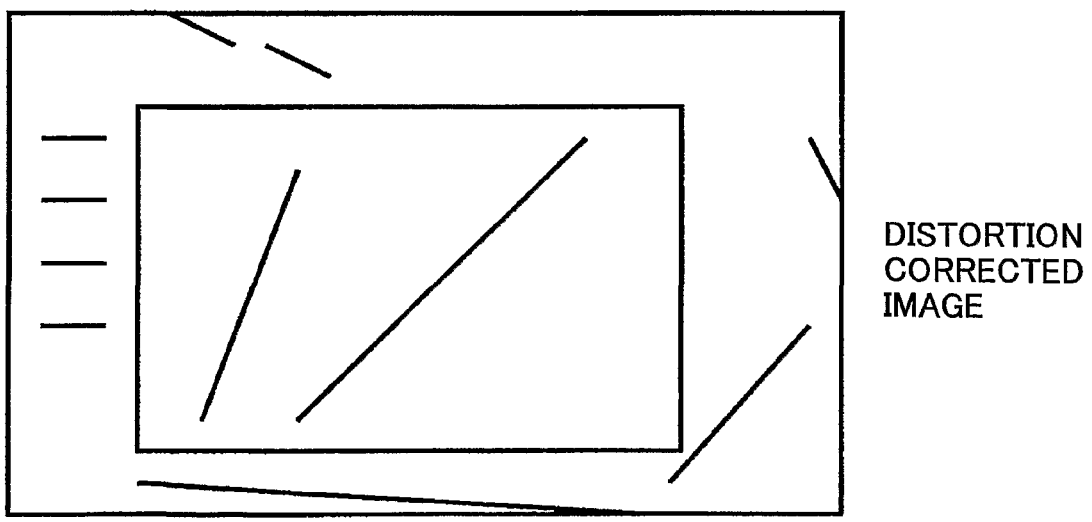
DISTORTION CORRECTED IMAGE

FIG.5A

| -1 | 0 | 1 |
|---|---|---|
| -2 | 0 | 2 |
| -1 | 0 | 1 |

SOBEL FILTER IN X DIRECTION

FIG.5B

| -1 | -2 | -1 |
|---|---|---|
| 0 | 0 | 0 |
| 1 | 2 | 1 |

SOBEL FILTER IN Y DIRECTION

FIG.5C

| $f(x00,y00)=v00$ | $f(x01,y01)=v01$ | $f(x02,y02)=v02$ |
|---|---|---|
| $f(x10,y10)=v10$ | $f(x11,y11)=v11$ | $f(x12,y12)=v12$ |
| $f(x20,y20)=v20$ | $f(x21,y21)=v21$ | $f(x22,y22)=v22$ |

LUMINANCE IMAGE

FIG.15
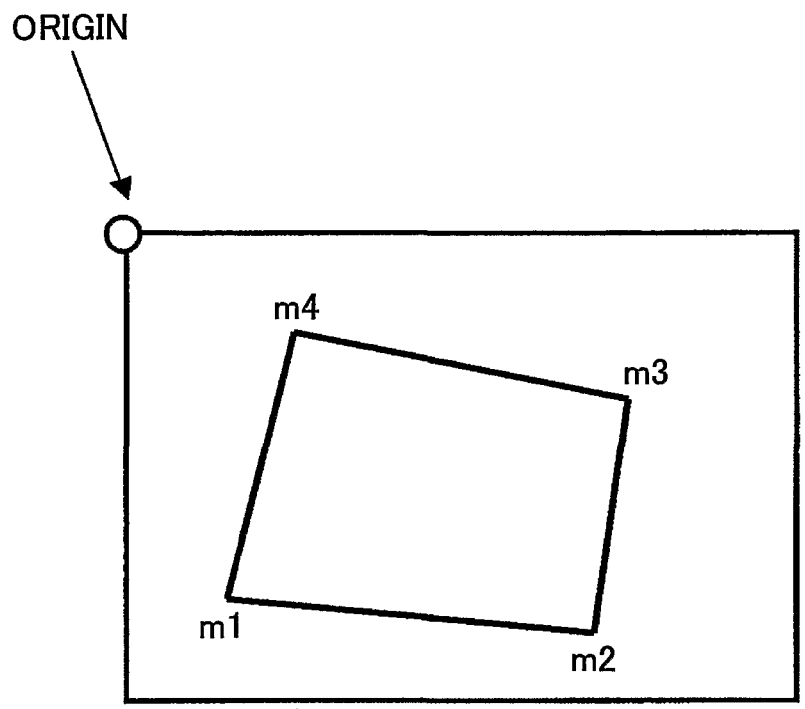
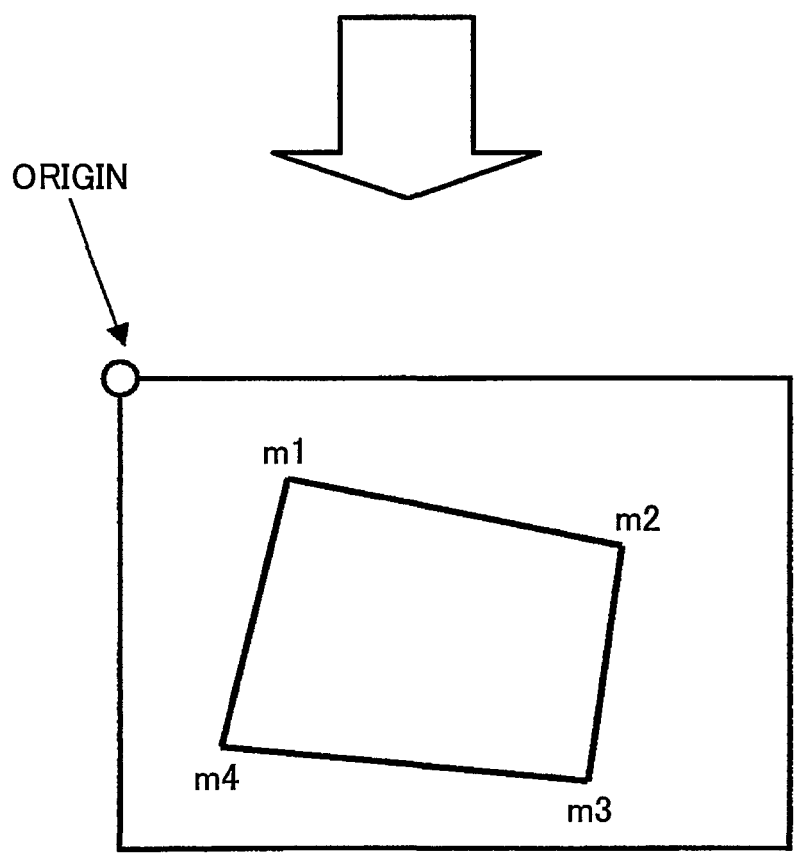

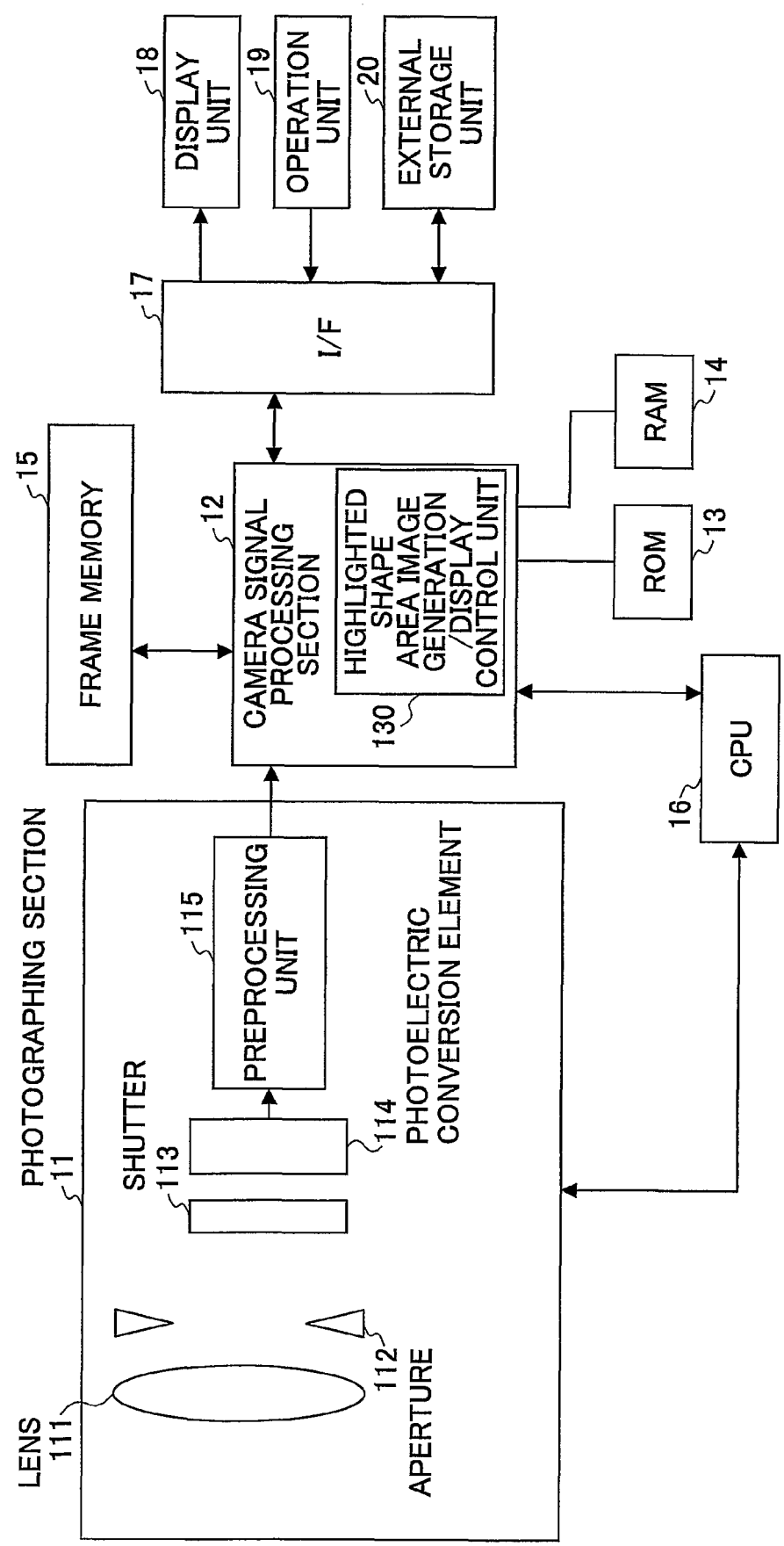

INPUT IMAGE

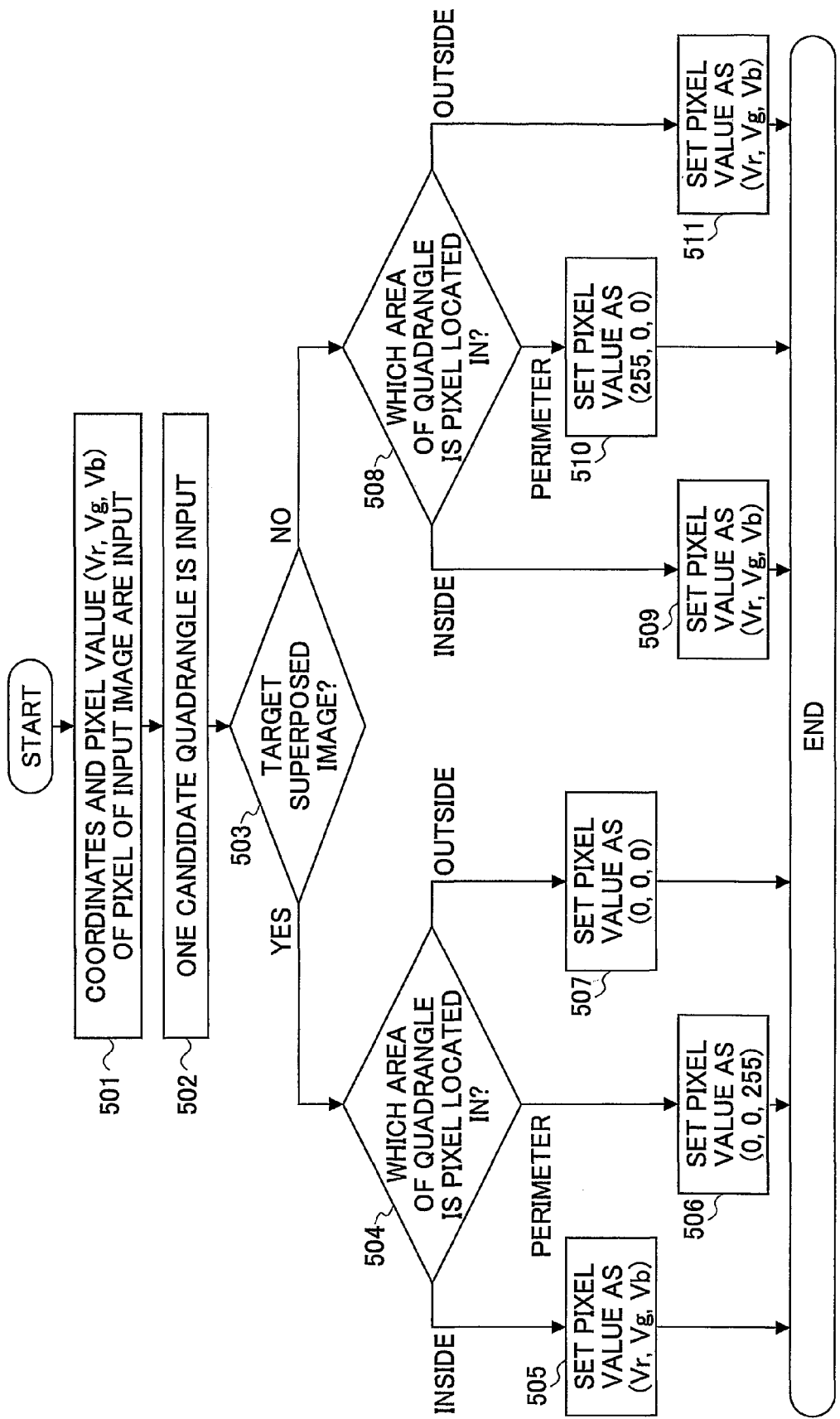

FIG.34
FIRST SUPERPOSED IMAGE
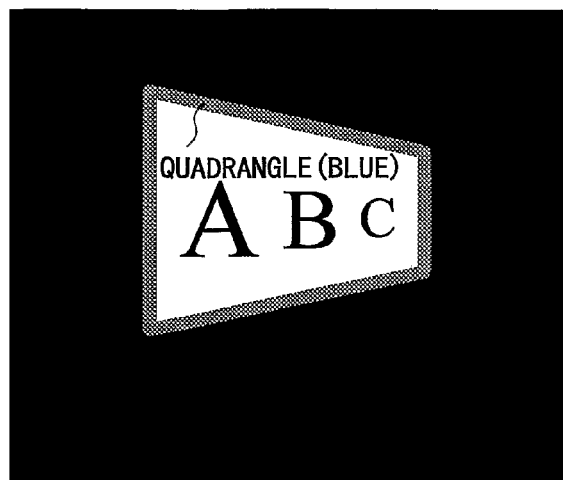
SECOND SUPERPOSED IMAGE
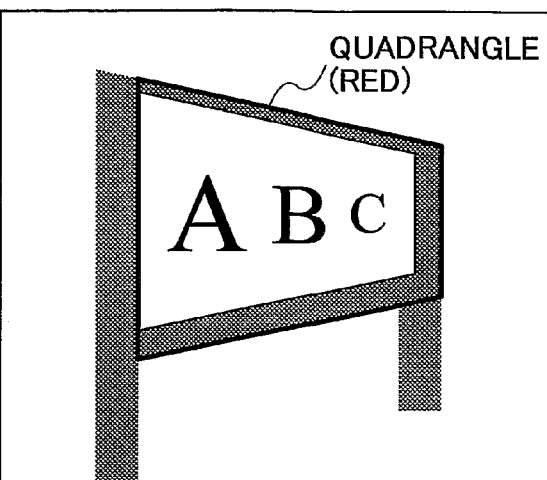
THIRD SUPERPOSED IMAGE
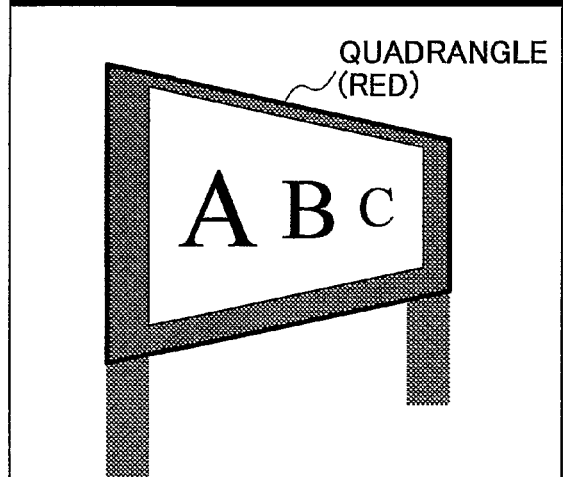
FOURTH SUPERPOSED IMAGE
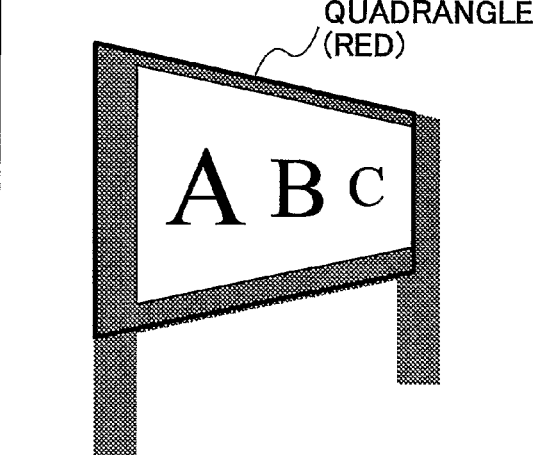

FIG.38
FIRST SUPERPOSED
IMAGE
SECOND SUPERPOSED
IMAGE
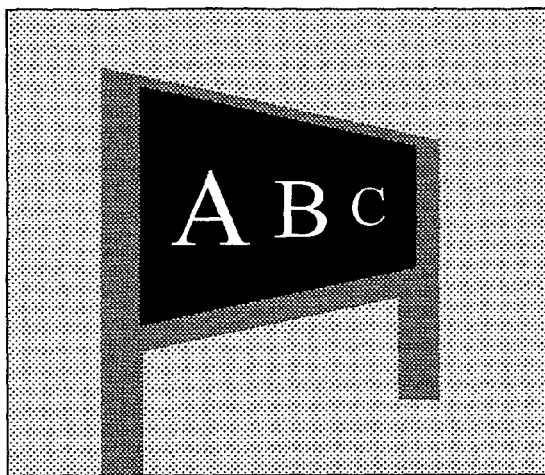
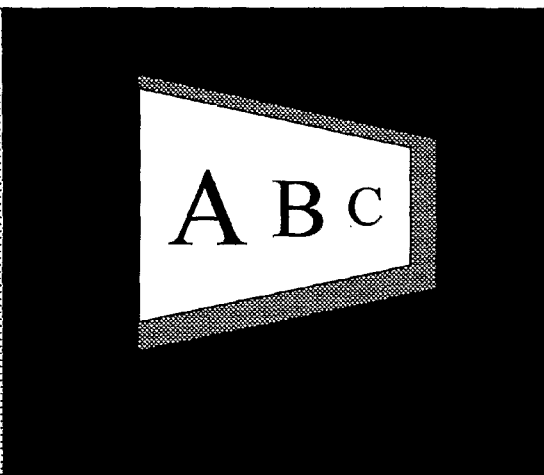
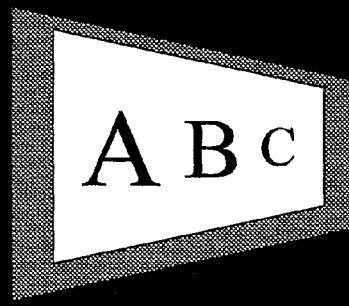
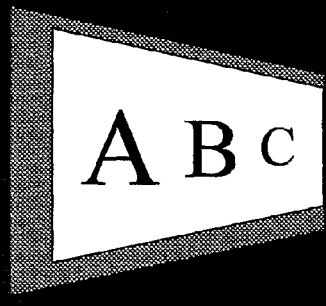
THIRD SUPERPOSED
IMAGE
FOURTH SUPERPOSED
IMAGE

FIRST SUPERPOSED IMAGE

SECOND SUPERPOSED IMAGE

THIRD SUPERPOSED IMAGE

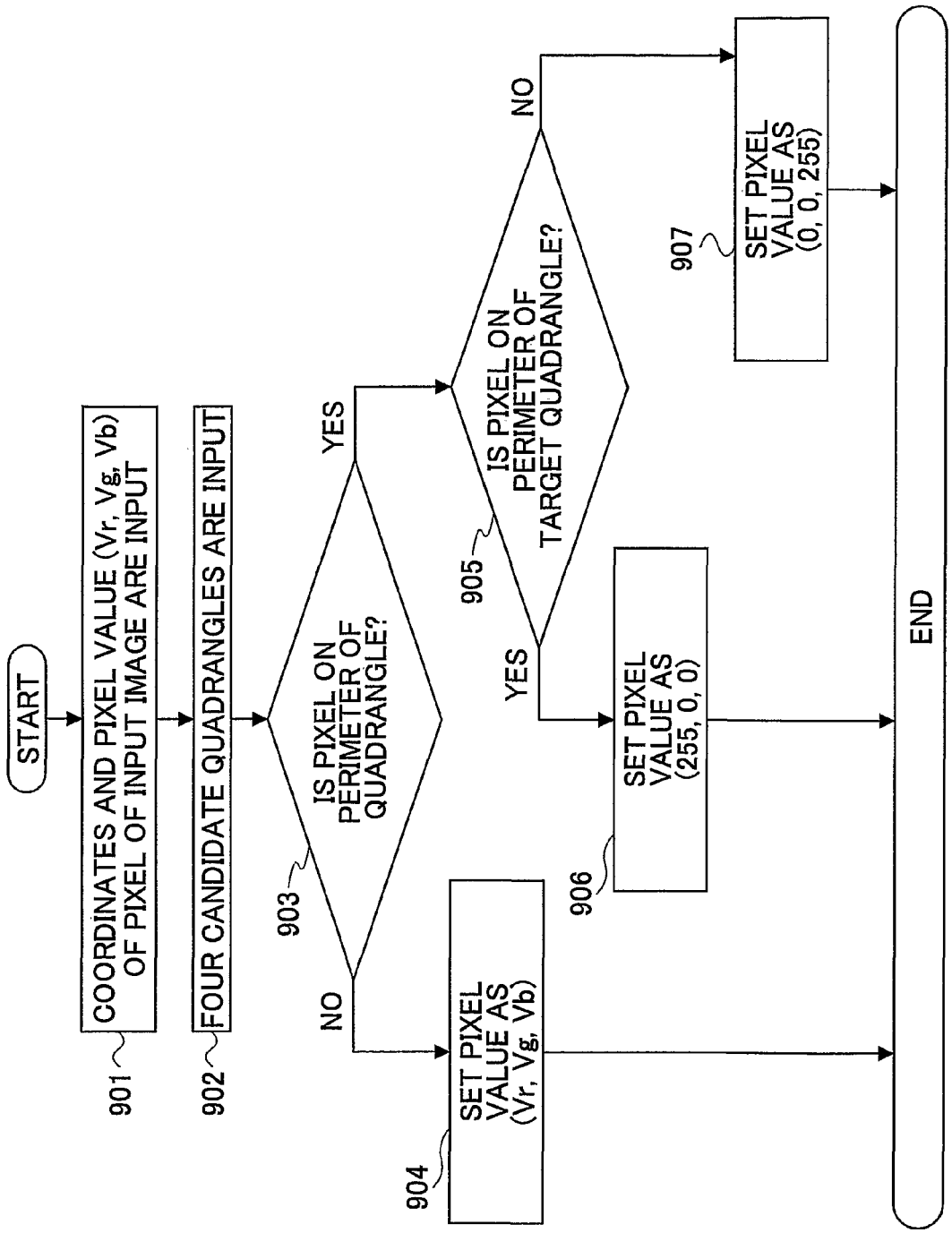

IMAGE PROCESSING METHOD AND APPARATUS, DIGITAL CAMERA, AND RECORDING MEDIUM RECORDING IMAGE PROCESSING PROGRAM

TECHNICAL FIELD

The present invention relates to a preprocessing technology for correcting distortions of photographed images, and more particularly to an image processing method and apparatus, a digital camera having functions thereof, and a recording medium recording an image processing program for recognizing a quadrangle from an input image.

Moreover, the present invention relates to an image processing method and apparatus, a digital camera having functions thereof, and a recording medium recording an image processing program for extracting a shape such as a quadrangle from a photographed image, and displaying an image including a highlighted shape area.

BACKGROUND ART

In recent years and continuing, digital cameras are becoming widely popular, and are being used not only for photographing scenery or people, but also for photographing train schedules, posters, bulletin boards, etc., instead of taking notes. However, photographed train schedules and posters may be distorted depending on the position from which the photograph is taken. Such distorted posters are difficult to read, and therefore, the photographed images are not preferable.

Even if the actual object is a rectangle, the photographed image becomes distorted depending on the position from which it is photographed, resulting in a trapezoid, for example. Such a distortion needs to be corrected when photographing a planar object such as a train schedule or a poster with a digital camera, so that the corrected image appears to have been taken from the front of the object.

Methods for correcting distorted images taken by digital cameras have been proposed. For example, typical methods are disclosed in Patent Documents 1, 2, and 3. In the conventional technology, a rectangle, etc., is extracted from a photographed image, and projection transformation is performed to make the rectangle appear to be planar. First, a reduced image is generated from a photographed image, an edge area is extracted from the reduced image, and distortion correction is performed on the edge area. Next, Hough transformation or Radon transformation is performed on the edge area that has undergone the distortion correction, to detect straight lines. A quadrangular shape of the photographed object is recognized from combinations of straight lines. A projection transformation matrix is calculated from the quadrangle, and projection transformation is performed on the photographed image, thereby correcting distortion. In another case, plural rectangles are extracted, and the rectangles are superposed onto an image. This image is displayed to a user, so that the user can select a rectangle. Projection transformation is performed based on the selected rectangle.

Patent Document 1: Japanese Laid-Open Patent Application No. 2005-122320
Patent Document 2: Japanese Laid-Open Patent Application No. 2005-122328
Patent Document 3: Japanese Laid-Open Patent Application No. 2000-341501

However, in the above-described conventional technology, straight lines that are furthest from the center of the image are recognized as sides of the quadrangle by priority. Thus, when the object is not positioned in the middle of the image, i.e., when four sides to be recognized are not positioned in four directions from the center of the image, the object cannot be recognized. Moreover, because Hough transformation, etc., is performed for detecting straight lines, the process takes extensive time. The voting algorithm of the Hough transformation particularly requires an enormous amount of time. The technology disclosed in Patent Document 2 attempts to enhance process speed by restricting the tilt of candidate straight lines in an X axis direction to $45°\leq\theta\leq135°$, and the tilt of candidate straight lines in a Y axis direction to $135°\leq\theta\leq225°$; however, the speed cannot be enhanced sufficiently. Moreover, if the vertical sides and horizontal sides of a quadrangle are determined based on tilts of N (an integer number) detected straight lines, conditions of photographing an object are restricted. Specifically, the quadrangle shown in FIG. 17A can be recognized, but the quadrangle shown in FIG. 17B, which is taken by skewing the camera, cannot be recognized, even though both quadrangles are of the same object.

Accordingly, there is a need for an image processing method and apparatus, a digital camera having functions thereof, and a recording medium recording an image processing program that can recognize one or more quadrangles from an input image in a preprocess for distortion correction, with greater precision and within shorter time, compared to conventional techniques.

In another case, plural rectangles are extracted, and the extracted rectangles are superposed onto an image. This image is displayed to a user, so that the user can select a rectangle. Projection transformation is performed based on the selected rectangle.

It is practical to display a plurality of extracted rectangles to a user, and perform distortion correction based on the rectangle selected by the user. This is because it is necessary to know the user's intention in order to determine the desired object from the photographed image. For example, even if the same image is taken by different users, the desired object may be different according to the user.

However, plural extracted rectangles are typically superposed on each other, and displayed on an image at once. Therefore, it is difficult to distinguish the rectangles. The user needs to look at the same rectangle many times to confirm whether the selection is correct.

Moreover, the camera cannot know the user's intention, and therefore, the rectangle desired by the user may not always be included among automatically extracted rectangles. However, the conventional technology only allows the user to make a selection among the extracted rectangles. If the desired rectangle is not included, the user has to take the trouble of photographing the object again. Further, if the object has been taken from a moving vehicle, and the desired rectangle is not included among extracted rectangles, the user may not be able to photograph the object again.

Accordingly, there is a need for an image processing method and apparatus, a digital camera having functions thereof, and a recording medium recording an image processing program by which a user can instantly distinguish a plurality of rectangles, and easily select the optimal rectangle, in the preprocess of distortion correction of, e.g., a digital camera, where a plurality of extracted rectangles superposed on an image is displayed to allow the user to select a desired rectangle.

Further, there is a need for an image processing method and apparatus, a digital camera having functions thereof, and a recording medium recording an image processing program capable of correcting a displayed shape when a desired shape, e.g., a rectangle, is not extracted.

DISCLOSURE OF THE INVENTION

Accordingly, the present invention may provide an image processing method and apparatus, a digital camera having functions thereof, and a recording medium recording an image processing program in which the above-described problems are eliminated.

An embodiment of the present invention provides an image processing method for recognizing one or more quadrangles from an input image, the method including the steps of (a) detecting a plurality of edge areas from the input image; (b) extracting a plurality of lines corresponding to the edge areas detected; (c) categorizing a line pair selected from the extracted lines according to a positional relationship between two lines included in the line pair, and calculating a line pair evaluation value for the line pair; (d) selecting a combination of two line pairs from a plurality of line pairs, generating a quadrangle from four lines included in the two line pairs selected, and calculating a quadrangle evaluation value for the quadrangle based on the categories and the line pair evaluation values of the two line pairs forming the quadrangle; and (e) selecting a quadrangle based on the calculated quadrangle evaluation value.

An embodiment of the present invention provides an image processing apparatus for recognizing one or more quadrangles from an input image, the apparatus including an edge area detecting unit configured to detect a plurality of edge areas from the input image; a line extracting unit configured to extract a plurality of lines corresponding to the edge areas detected; a line pair categorization/evaluation unit configured to select a line pair from the extracted lines, categorize the line pair according to a positional relationship between two lines included in the line pair, and calculate a line pair evaluation value for the line pair; a quadrangle evaluation unit configured to select a combination of two line pairs from a plurality of line pairs, generate a quadrangle from four lines included in the two line pairs selected, and calculate a quadrangle evaluation value for the quadrangle based on the categories and the line pair evaluation values of the two line pairs forming the quadrangle; and a quadrangle selecting unit configured to select a quadrangle based on the calculated quadrangle evaluation value.

An embodiment of the present invention provides an image processing method including the steps of extracting a plurality of shapes from an input image; creating a plurality of highlighted shape area images corresponding to the shapes extracted at the extracting step by superposing the shapes in the input image and highlighting an image area of each shape; and controlling display of the highlighted shape area images.

An embodiment of the present invention provides an image processing apparatus including a display unit configured to display an image; a shape extracting unit configured to extract a plurality of shapes from an input image; a superposed image creating unit configured to create a plurality of highlighted shape area images corresponding to the shapes extracted by the shape extracting unit by superposing the shapes in the input image and highlighting an image area of each shape; and an image display control unit configured to control the display unit to display the highlighted shape area images.

ADVANTAGEOUS EFFECT OF THE INVENTION

According to the present invention, a quadrangle can be recognized from a photographed image, and the recognized quadrangle can be transformed into an image that appears to have been taken from the front, with high precision and high speed.

According to the present invention, in using a digital camera, etc., when a plurality of shapes, e.g., rectangles, extracted from a photographed image are superposed on an image displayed for the user to select a desired rectangle, the user can easily select the optimal rectangle. Moreover, when a desired shape is not extracted, the user can modify an extracted shape to obtain the desired shape, without taking a photograph of the object again.

BRIEF DESCRIPTION OF THE DRAWINGS

FIG. 2 is a conceptual diagram of distortion correction;

FIGS. 5A, 5B, 5C are examples of edge detection filters and a luminance image to which the filters are applied;

FIG. 15 is a diagram for describing part of a process performed by a projection transformation unit shown in FIG. 3;

FIG. 18 is a block diagram of a digital camera including an image processing function according to a second embodiment of the present invention;

FIG. 33 is a flowchart of a superposed image creation method (part 2) according to a fourth embodiment;

FIG. 34 is an example of superposed images according to the fourth embodiment;

FIG. 38 is an example of superposed images according to the sixth embodiment;

FIG. 43 is still another example of a superposed image according to the seventh embodiment;

FIG. 44 is a flowchart of a superposed image creation method (part 6) according to an eighth embodiment.

BEST MODE FOR CARRYING OUT THE INVENTION

Figure 1:
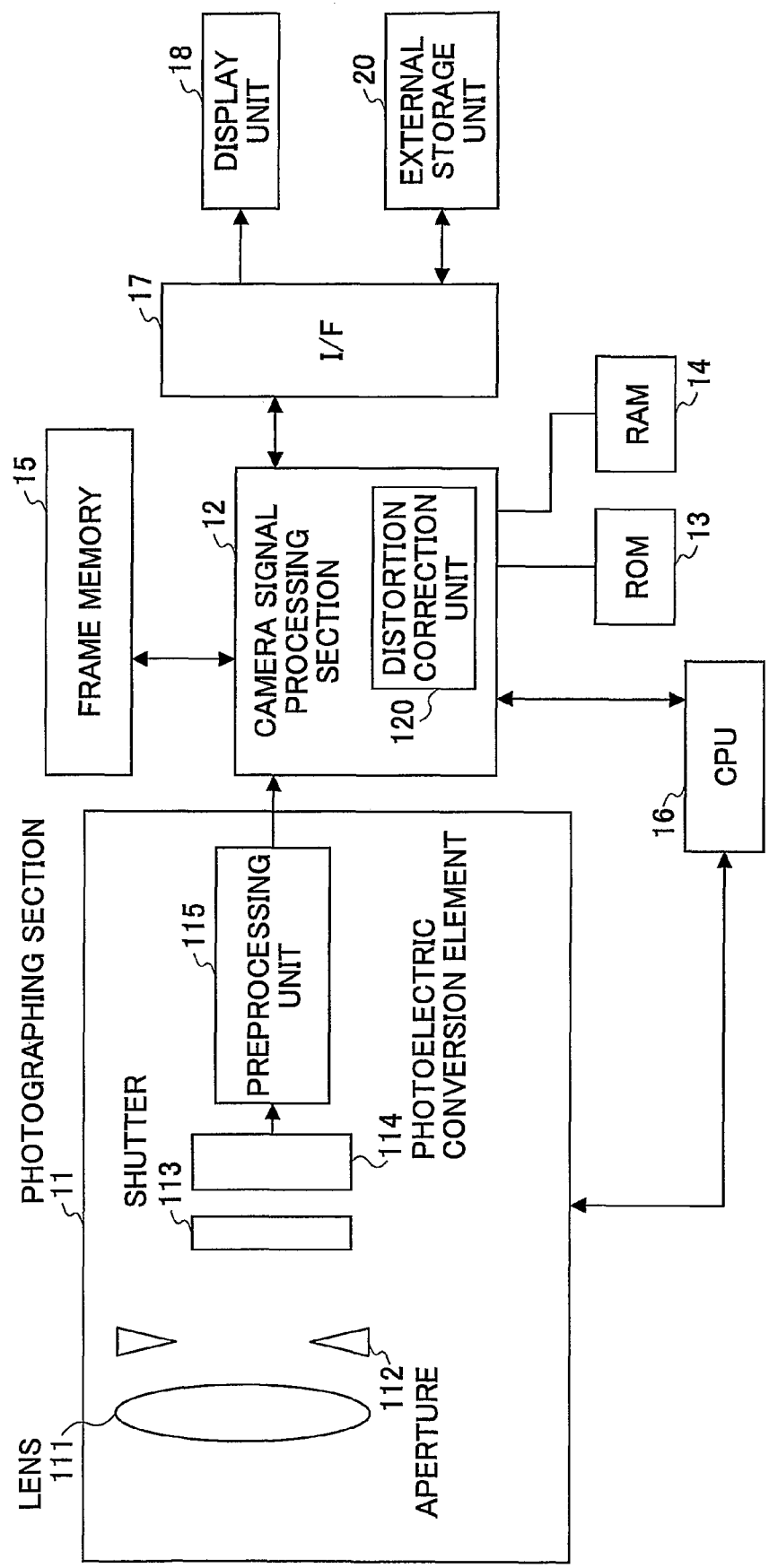
FIG. 1 is a block diagram of a digital camera including an image processing function according to a first embodiment of the present invention.

According to an embodiment of the present invention, in order to detect straight lines from an input image without performing Hough transformation that requires a large amount of time, edge directions are defined for each of the pixels of the input image, edge areas are detected from each edge direction, and lines (straight lines) corresponding to each of the edge areas are detected. This enhances the speed of the edge detection process.

As described with reference to the background art, if the vertical sides and horizontal sides of a quadrangle are determined based on tilts of N detected straight lines, conditions of photographing an object are restricted. Accordingly, in the present invention, all possible quadrangles that can be formed by combinations of four lines from among the N detected straight lines are taken into consideration, so that the object can be photographed under various conditions. However, it takes a long time to figure out all possible quadrangles that can be formed by combinations of four lines from among the N detected lines. To reduce the processing time, line pairs are created by pairing two lines from the N detected lines; each of the pairs are categorized into, for example, opposite, adjacent, or unrelated; evaluation values are given to the line pairs; quadrangles are recognized by focusing on line pairs categorized as opposite or adjacent; and a quadrangle is selected based on the evaluation value. Accordingly, the time required for the edge detection process can be reduced significantly, as described below.

The maximum number of quadrangles that can be obtained by extracting four lines from N lines is K=3×N×(N−1)×(N−2)×(N−3)/24 (the order in which the four lines are arranged is also considered). Therefore, it is imperative to reduce the number K in order to enhance the processing speed of the edge detection process.

Usually, a photograph of a rectangular signboard is taken from the front, and the signboard is made to just fit into the angle view of the digital camera. Accordingly, the rectangular signboard in the photographed image has the following characteristics:

1. The opposing sides of the rectangle are almost parallel, and are positioned at a certain distance from each other; and 2. The adjacent sides of the rectangle are almost at 90°, and have an intersecting point, as a matter of course.

Thus, two straight lines extracted from N lines are categorized as opposite when they are almost parallel, categorized as adjacent when they are almost at 90°, and are otherwise categorized as unrelated. Moreover, an intersecting point of lines obtained by infinitely extending two lines among the N lines is calculated, the distances between the intersecting point and the lines are calculated, thereby calculating the likeliness of adjacency of the two edge lines (=evaluation value).

Four lines of a quadrangle are definitely determined from a combination of two pairs of opposite lines and a combination of four adjacent lines. Therefore, from among K (an integer number) possible quadrangles, a quadrangle that is not generated from a combination of two pairs of opposite lines and a combination of four adjacent lines can be dismissed. Moreover, the four vertexes of a quadrangle are where lines intersect each other, and therefore, the quadrangle can be evaluated according to the level of four evaluation values.

In the present invention, in order to extract a quadrangle even when lines are broken due to noise, etc., or when an input image is distorted, or when the background of a photographed object includes complex colors, plural lines are combined to generate a new line, according to need.

If the conventional Sobel filter is used for detecting edges for an image including a white rectangle on a black background, all pixels along the periphery of the rectangle are extracted as one edge area. However, in the present invention, instead of performing Hough transformation, the image is divided into edge directions and edge areas are obtained thereafter, so that each side of the rectangle can be extracted as different edge areas.

Usually, when taking a photograph of an object, it is positioned in the middle, and is made to just fit into the angle of view of the camera. This tendency is taken into account in the present invention. Specifically, to make it easier for the user to determine the picture composition when taking a photograph in a distortion correction mode, an evaluation value is calculated based on the area of the quadrangle. The quadrangle can be selected in consideration of the evaluation value.

When a user chooses to take a photograph of an object on a plane using the distortion correction mode, most objects are rectangular. Thus, in the distortion correction process according to the present invention, it is assumed in advance that a rectangle is to be recognized. Accordingly, precision of recognition can be enhanced significantly when the user photographs a rectangle, by calculating a projection transformation matrix for transforming the quadrangle into a parallelogram, calculating an evaluation value based on the shape of the parallelogram after the projection transformation, and selecting a quadrangle based on the evaluation value.

Detailed descriptions of embodiments of the present invention are given below with reference to the figures.

FIG. 1 is a block diagram of a digital camera including an image processing function according to a first embodiment of the present invention. As shown in FIG. 1, a photographing section 11 includes a lens 111; an aperture 112, a shutter 113, a photoelectric conversion element 114, and a preprocessing unit 115. By operating the shutter 113, the photoelectric conversion element 114 receives an object light through the lens 111 and the aperture 112, and the object light is converted into analog image signals. An example of the photoelectric conversion element 114 is a CCD (charge-coupled device). The preprocessing unit 115 includes a preamplifier, an analog signal processing unit such as an AGC (automatic gain control), and an A/D conversion unit. The preprocessing unit 115 performs preprocesses such as amplifying/clamping on the analog image signals received from the photoelectric conversion element 114, and then converts the analog image signals into digital image signals.

The digital signals output from the preprocessing unit 115 are sent through a camera signal processing section 12, and loaded into a frame memory 15. Examples of the frame memory 15 include VRAM, SRAM, and DRAM. The frame memory 15 is used for temporarily holding image signals to be processed by the camera signal processing section 12.

The camera signal processing section 12 includes a digital signal processor (DSP). The camera signal processing section 12 includes a distortion correction unit 120, which performs the image processing function according to the present invention. Details of the distortion correction unit 120 are described below. A ROM 13 is a program memory used for holding programs executed by the camera signal processing section 12, and a RAM 14 is a working memory used for temporarily holding data that is processed halfway by the camera signal processing section 12, or other data necessary for signal processing.

A CPU 16 includes a microcomputer, and controls the photographing section 11 and the camera signal processing section 12. The CPU 16 can also serve as the ROM 13 and the RAM 14.

The camera signal processing section 12 reads image signals loaded in the frame memory 15, and performs processes on the image signals, such as image compression. Subsequently, the image signals are sent through an interface unit (I/F) 17, and stored in an external storage unit 20. Examples of the external storage unit 20 include an IC memory card and an optical magnetic disk. Alternatively, a modem card or an ISDN card can be used to send the image signals to a remote terminal via a network. On the other hand, image signals read from the external storage unit 20 are sent via the I/F 17 to the camera signal processing section 12, where the image signals are decompressed, and then loaded in the frame memory 15.

To display the image signals, the image signals in the frame memory 15 are sent to a display unit 18 via the camera signal processing section 12 and the I/F 17. An example of the display unit 18 is a liquid crystal display device provided on the digital camera.

The distortion correction unit 120 in the camera signal processing section 12 performs distortion correction. For example, digital image signals representing an input image of a photographed object are loaded in the frame memory 15. The digital image signals are sent out from the frame memory 15 and into the distortion correction unit 120. The distortion correction unit 120 extracts a quadrangular (rectangular) shape from the image, and corrects distortion of the quadrangular shape. The corrected image signals may be loaded in the frame memory 15 again, for example, to be used for subsequent processes.

FIG. 2 is a diagram for describing distortion correction. The function of the distortion correction unit 120 can be executed by storing an image processing program for distortion correction in the ROM 13, and causing the digital signal processor (DSP) in the camera signal processing section 12 to execute the program. Alternatively, the processing function can be partly or entirely be realized by hardware. Details of the configuration and process of the distortion correction unit 120 are described below.

Figure 3:
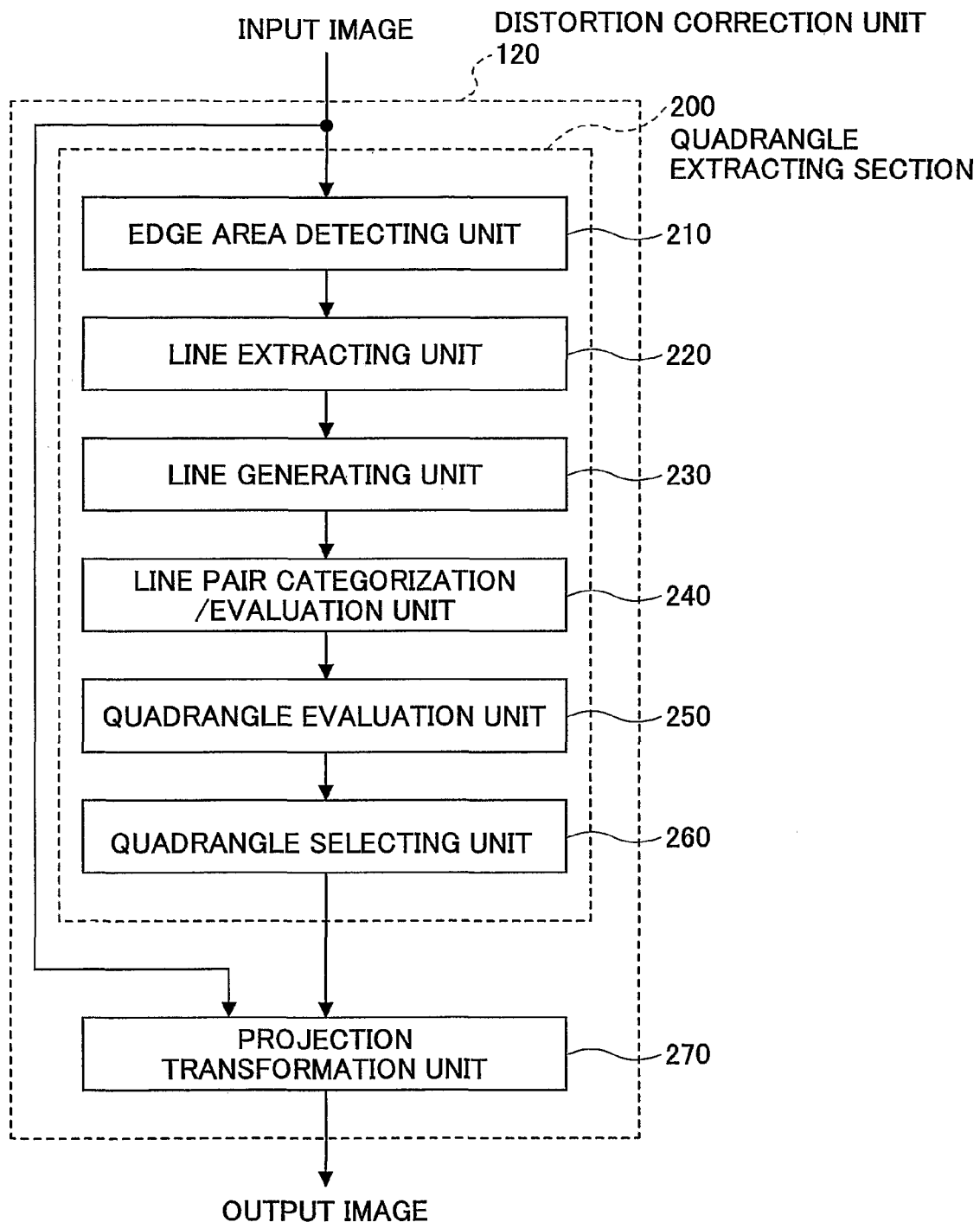
FIG. 3 is a detailed block diagram of a distortion correction unit shown in FIG. 1.

FIG. 3 is a detailed block diagram of the distortion correction unit 120. The distortion correction unit 120 includes an edge area detecting unit 210, a line extracting unit 220, a line generating unit 230, line pair categorization/evaluation unit 240, a quadrangle evaluation unit 250, a quadrangle selecting unit 260, and a projection transformation unit 270. These units (210 through 260) are collectively referred to as a quadrangle extracting section 200. Details of processes performed by each of the units are described below.

<Edge Area Extraction>

Figure 4:
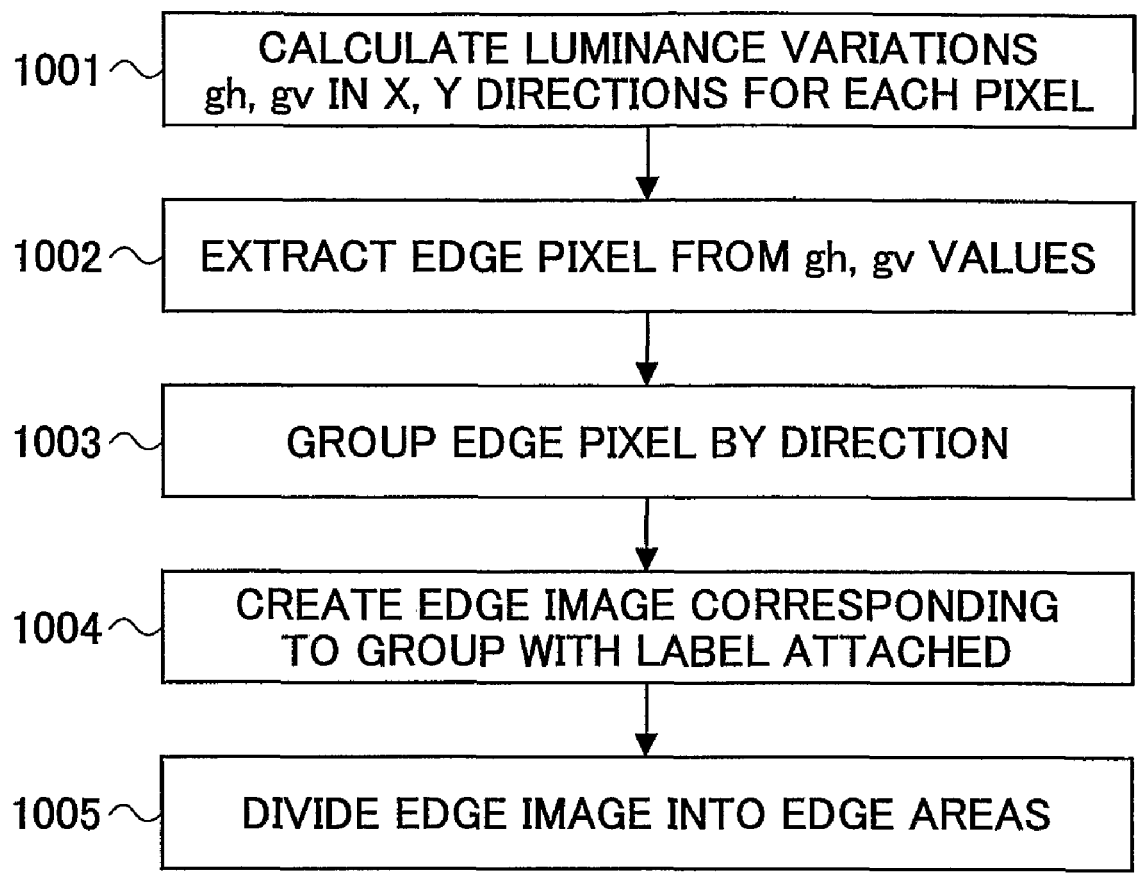
FIG. 4 is a flowchart of a process performed by an edge area detecting unit shown in FIG. 3.

The edge area detecting unit 210 detects the edge area of an input image of a photographed object. Specifically, the edge area detecting unit 210 extracts parts in the image where luminance changes significantly, and determines the extracted parts as the edge area. FIG. 4 is a flowchart of the edge area detection process.

First, an edge detection filter such as a Sobel filter or a Canny filter is applied to an input image to calculate a luminance variation gh in an X direction and a luminance variation gv in a Y direction (step 1001). The X variation gh and the Y variation gv are input in a function funcl (gh, gv), and when a return value of funcl (gh, gv) is greater than or equal to a threshold, the corresponding pixel is determined as an edge part (edge pixel). When a return value of funcl (gh, gv) is below the threshold, the corresponding pixel is determined not as an edge part, but as a non-edge pixel (step 1002). Next, a two-dimensional space formed by X variations gh and Y variations gv is divided into a plurality of groups representing different directions, and each edge pixel is assigned to one of the groups according to its direction (step 1003). In the present embodiment, as are described below, the two-dimensional space formed by gh and gv is divided into eight groups, from group 1 to group 8, and each of the edge pixels is assigned to one of the eight groups. Accordingly, each group represents an edge image. A label is attached to each edge image for identifying the direction group to which it belongs (step 1004), and the edge images are divided into edge areas (step 1005).

The edge detection process is described in more detail. An example of a luminance image of an input image is shown in FIG. 5C. Sobel filters shown in FIGS. 5A, 5B are used as edge detection filters. In the top left corner in FIG. 5C, (x00, y00) represents pixel coordinates, and v00 represents a pixel value. The same condition applies to the other pixels.

The subject pixel is assumed as pixel (x11, y11). The luminance variation gh in an X direction of the pixel (x11, y11) is obtained as follows by applying the Sobel filter in the X direction shown in FIG. 5A to the luminance image shown in FIG. 5C:

$$gh = v00 \times (-1) + v10 \times (-2) + v20 \times (-1) + v02 \times 1 + v12 \times 2 + v22 \times 1$$

The luminance variation (gv) in a Y direction of the pixel (x11, y11) is obtained as follows by applying the Sobel filter in the Y direction shown in FIG. 5B to the luminance image shown in FIG. 5C:

$$gh = v00 \times (-1) + v01 \times (-2) + v02 \times (-1) + v20 \times 1 + v21 \times 2 + v22 \times 1$$

The luminance variation g of the pixel (x11, y11) is obtained by $g=gh^2+gv^2$. When g is greater than or equal to a predetermined threshold (e.g. 50), the pixel (x11, y11) is determined as an edge pixel; when g is less than the threshold, pixel (x11, y11) is determined as a non-edge pixel.

Figure 6:
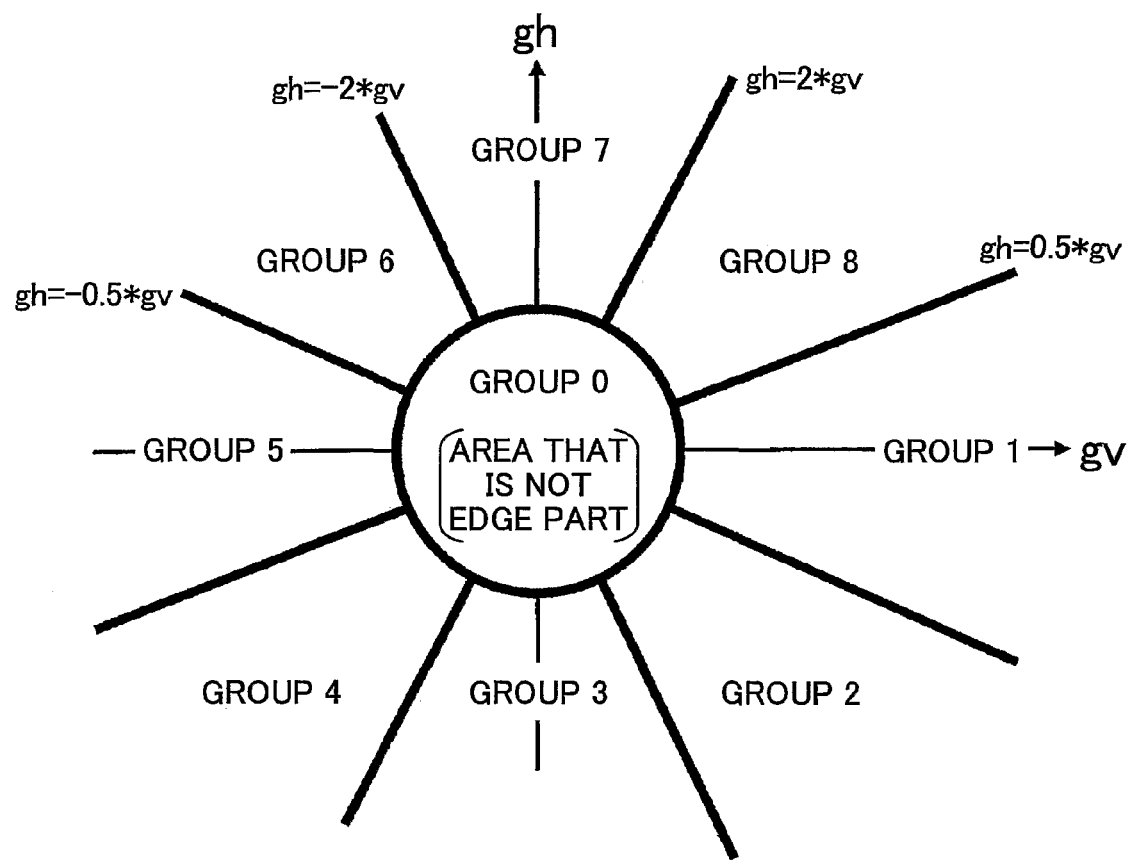
FIG. 6 is an example of a two-dimensional space divided according to luminance variations in a vertical direction and a horizontal direction.

By repeating the above process for each pixel, edge parts (edge pixels) of an input image are extracted. When the edge parts of an input image are extracted, as shown in FIG. 6, the two-dimensional space formed by luminance variations gh in the X direction and luminance variations gv in the Y direction is divided into eight groups, and the edge pixels are divided into one of the groups 1 through 8, according to their direction. By distinguishing the edge pixels by edge directions, it is possible to distinguish four edges that supposedly exist around the photographed object (i.e., each side of a rectangle can be extracted as different edge areas). Moreover, the edges can be detected without performing Hough conversion, and therefore, processing speed of the edge detection process is enhanced.

An edge image is created by assigning 0 (black) to an edge pixel and 255 (white) to a non-edge pixel. In this example, an edge image is created for each direction group 1 through 8; in other words, eight edge images are created. A label is attached to each edge image for identifying the corresponding direction group. The edge images are divided into different edge areas. Each edge area represents a connection of black pixels. If the number of edge pixels included in an edge area (black connection area) does not reach a predetermined threshold, the corresponding edge area is determined as noise, and is removed.

It is also possible to create only one edge image, and assign different colors representing different direction groups to each of the edge pixels.

<Line Extraction>

Figure 7:
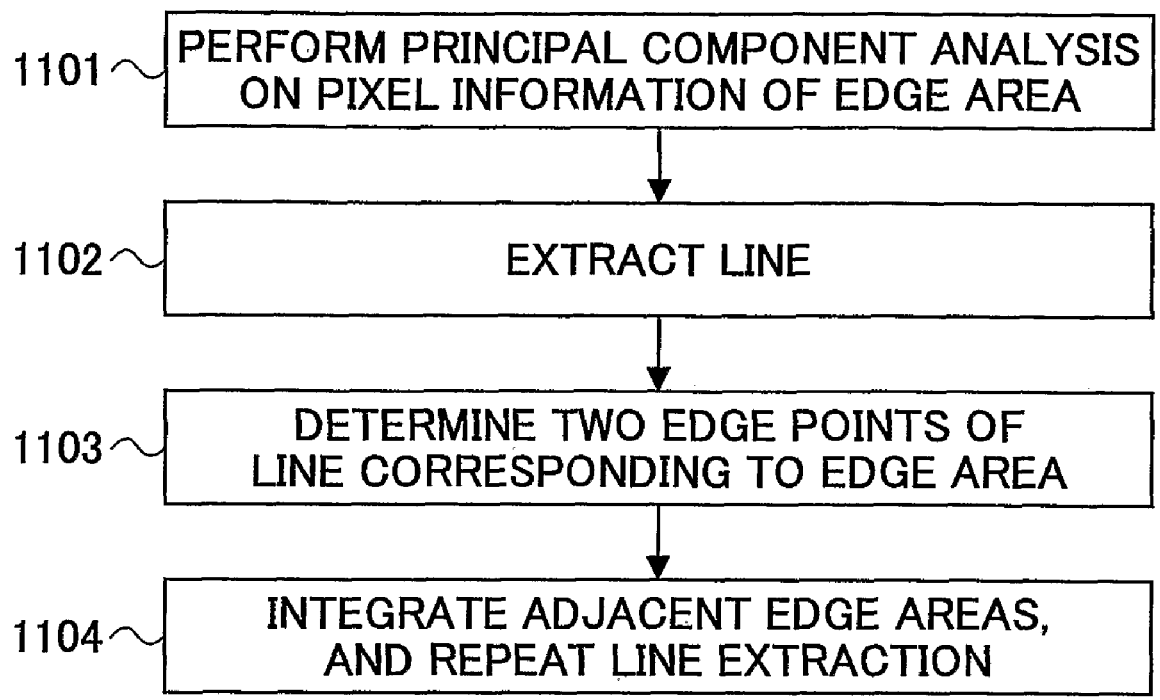
FIG. 7 is a flowchart of an overall process performed by a line extracting unit shown in FIG. 3.
Figure 8A:
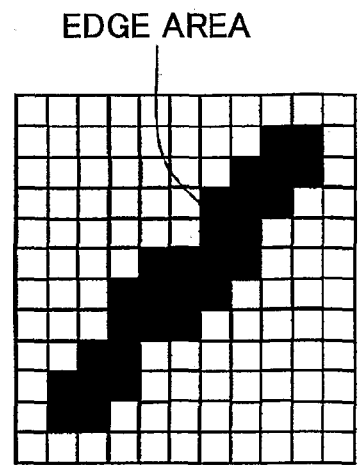
FIGS. 8A, 8B, 8C describe an example of line extraction.
Figure 8B:
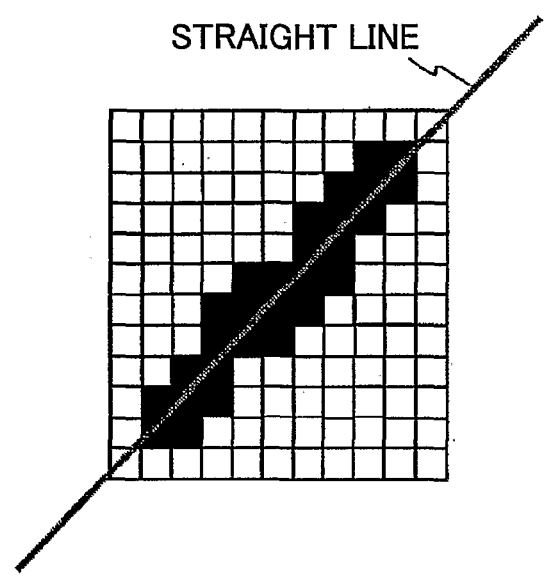
Figure 8C:
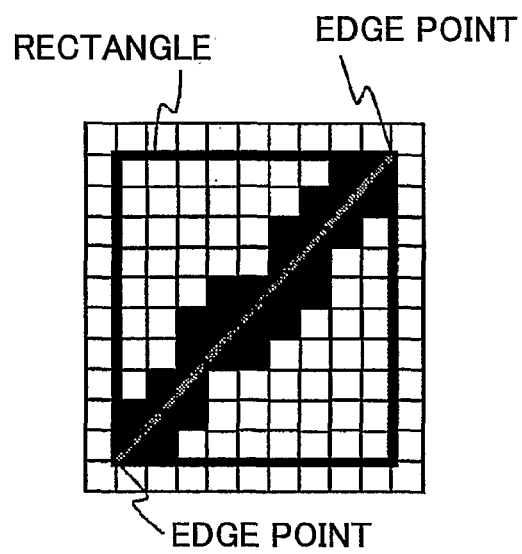

The line extracting unit 220 performs principal component analysis on pixel information of the edge areas detected by the edge area detecting unit 210, to extract a line corresponding to each edge area. The line extraction is performed for each direction group. FIG. 7 is a flowchart of the line extraction process. FIGS. 8A through 8C describe an example of line extraction.

The line extracting unit 220 performs principal component analysis on pixel information of the edge areas (step 1101), and extracts straight lines corresponding to the edge areas (step 1102). Assuming that there is an edge area as shown in FIG. 8A, principal component analysis is performed on pixel information included in this edge area. As a result, a straight line as shown in FIG. 8B is extracted. At the same time as performing principal component analysis, the contributing rate for a first principal component is obtained. When an edge area appears to be long and thin, the contributing rate for a first principal component generally indicates a large value. Thus, the contributing rate for a first principal component is used as a value for expressing the likeliness of an edge area being a straight line. This value is saved together with a straight line. Next, as shown in FIG. 8C, a minimum rectangle surrounding the edge area is defined, intersecting points of the rectangle and the line are defined, and two edge points (coordinates) of the line corresponding to the edge area is determined (step 1103).

By performing the above line extraction process for each of the edge areas detected from eight edge images, lines corresponding to the edge areas in the input image are extracted.

Figure 9:
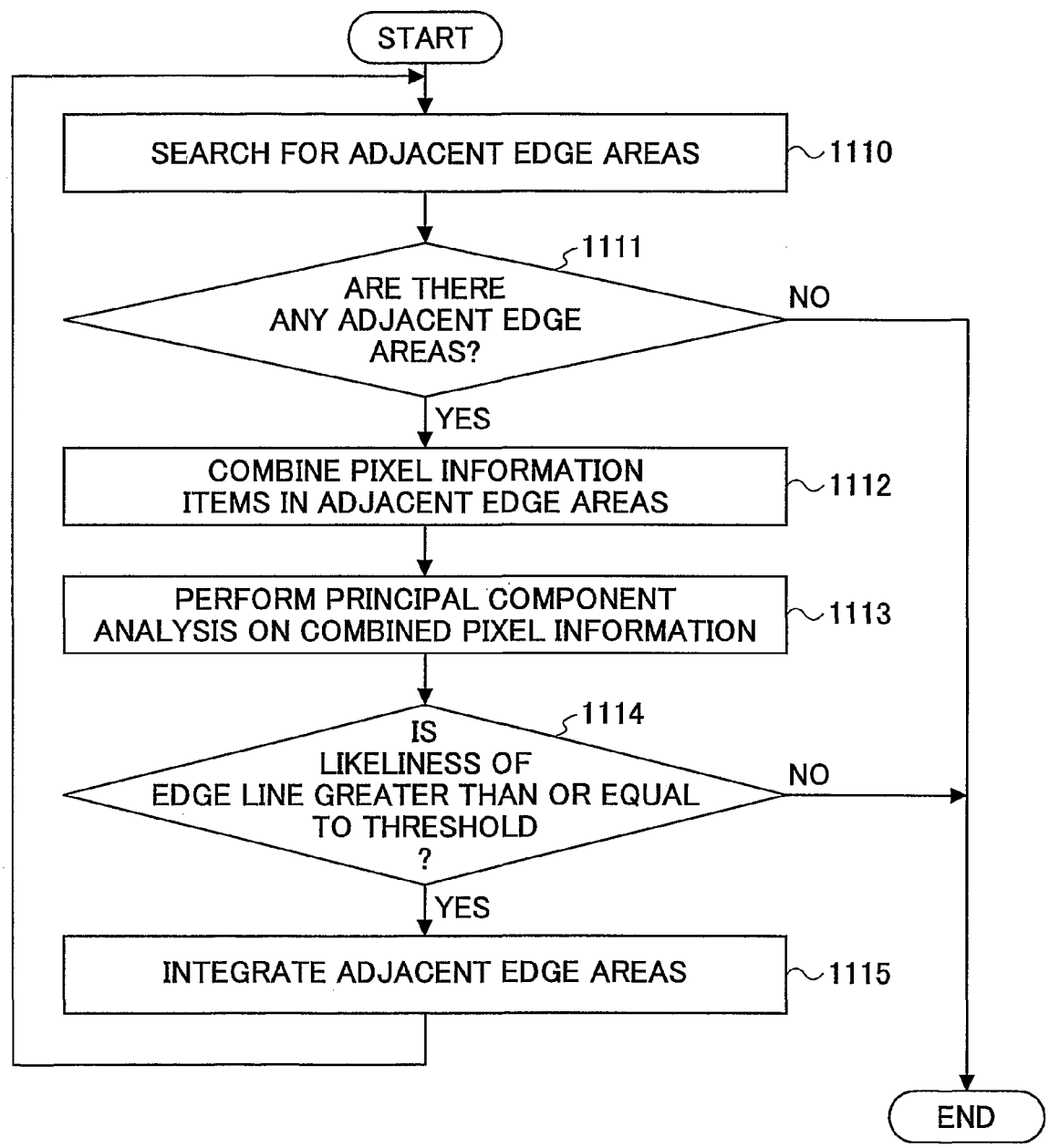
FIG. 9 is a detailed flowchart of step 1104 shown in FIG. 7.
Figure 10:
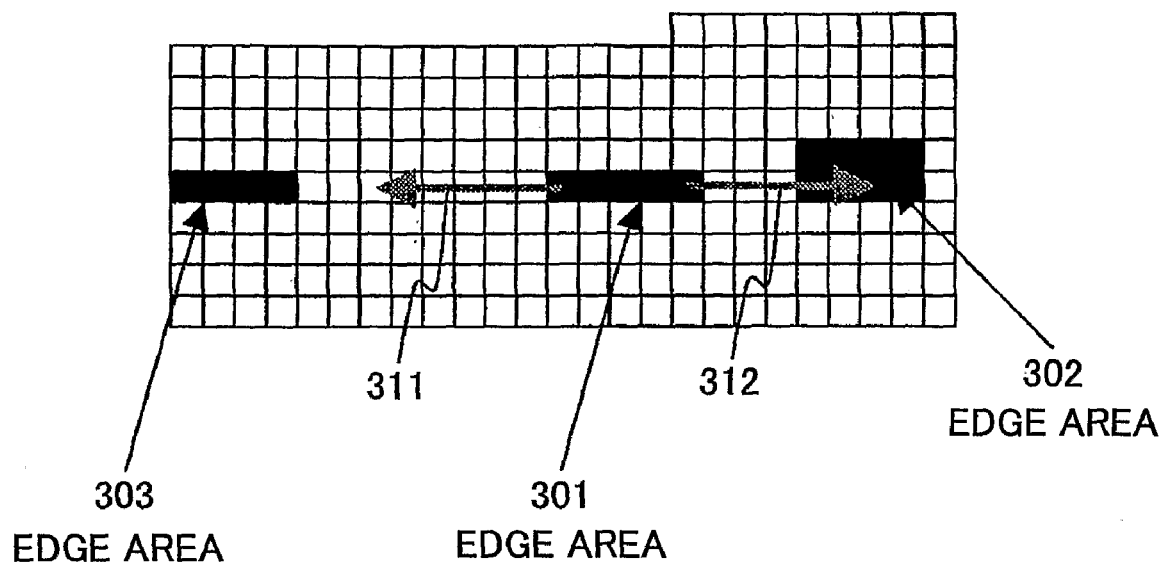
FIG. 10 is an example of searching adjacent edge areas.

Next, the following step is performed to compensate for broken straight lines, which are broken due to noise, etc. For each of the eight edge images, principal component directions (two directions) of each edge area are searched to find adjacent edge areas. If necessary (if edge areas that are supposed to be adjacent to each other are separated from each other), the adjacent edge areas are integrated, and the line extraction process is repeated (step 1104). FIG. 9 is a flowchart of the integration process for adjacent edge areas. FIG. 10 is an example of part of an edge image, including three edge areas 301, 302, 303.

First, in a certain edge area, the line extracting unit 220 searches a number of pixels defined by principal component directions (two directions) (step 1110), and determines whether adjacent edge areas exist (step 1111). For example, the line extracting unit 220 searches a defined number of pixels from the left and right edge points of the edge area 301, as indicated by arrows 311, 312 in FIG. 10. The lengths of these arrows in FIG. 10 indicate the number of defined pixels to be searched. The number of defined pixels can be a fixed value, or defined based on the length of the line corresponding to the edge area.

In FIG. 10, the distance between the edge point of the edge area 301 and the edge area 302 is within a defined number of pixels. Thus, the edge area 301 and the edge area 302 are determined as adjacent edge areas. However, the distance between the edge area 301 and the edge area 303 exceeds the defined number of pixels, and are therefore not determined as adjacent edge areas.

Next, when it is determined that adjacent edge areas exist, pixel information items in the adjacent edge areas are combined, so as to create combined pixel information (step 1112), and principal component analysis is performed on the combined pixel information (step 1113). The line extracting unit 220 determines whether the likeliness of the edge line calculated at this time is greater than or equal to a threshold (step 1114). When the likeliness is greater than or equal to the threshold (ratio of principal component is large), the line extracting unit 220 creates an integrated edge area by integrating the adjacent edge areas, and removes the original edge areas (step 1115). The process from step 1110 is repeated for the created area. This is repeated for all edge areas, and then the process shown in FIG. 7 is repeated.

Specifically, in the example shown in FIG. 10, combined pixel information is created by combining the pixel information items of the edge area 301 and the edge area 302, which are determined as adjacent edge areas. Principal component analysis is performed on the combined pixel information. If the likeliness of the edge line is greater than or equal to a threshold, the edge area 301 and the edge area 302 are unified to create a new edge area, and the edge area 301 and the edge area 302 are removed. The process from step 1110 is repeated for the new edge area.

The above process is repeated for all edge areas in the eight edge images. The process shown in FIG. 7 is repeated for the edge areas finally remaining. Accordingly, the line extraction is completed.

In the above description, edge areas extracted from eight edge images are processed individually as a matter of convenience. However, in the following description for subsequent processes, the edge areas extracted from the eight edge images are not distinguished. The total number of edge areas is assumed as N1 in the following. Thus, the total number of lines extracted by the line extracting unit 220 is N1. Each line has a serial number attached.

<Line Generation>

Figure 11:
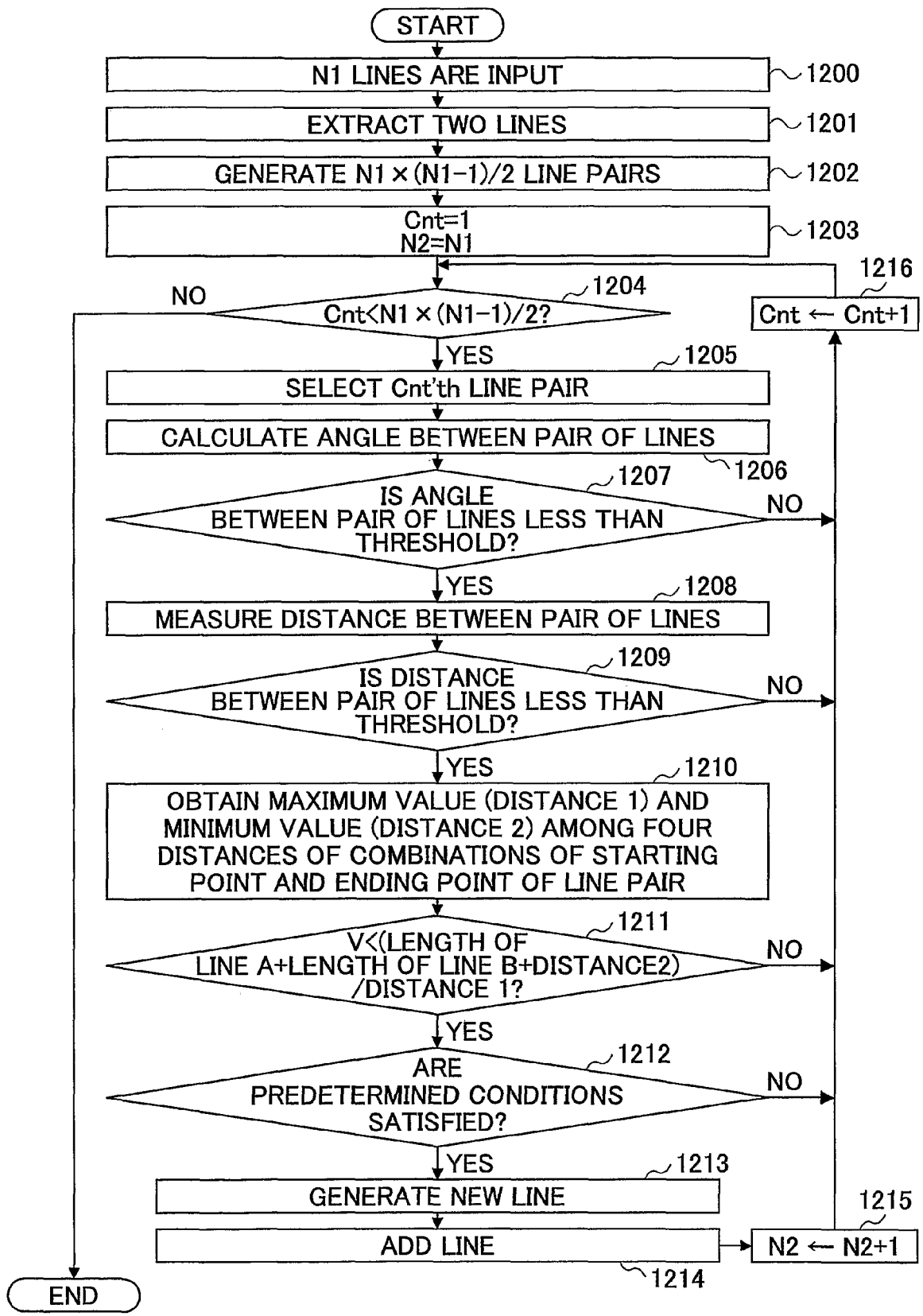
FIG. 11 is a flowchart of a process performed by a line generating unit shown in FIG. 3.
Figure 12A:
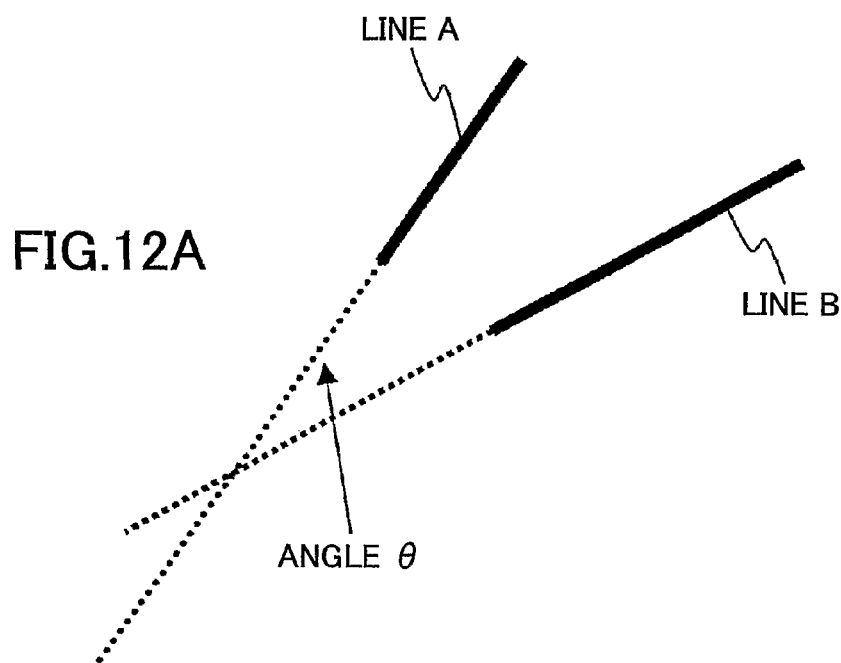
FIGS. 12A, 12B, 12C are examples of line generation.
Figure 12B:
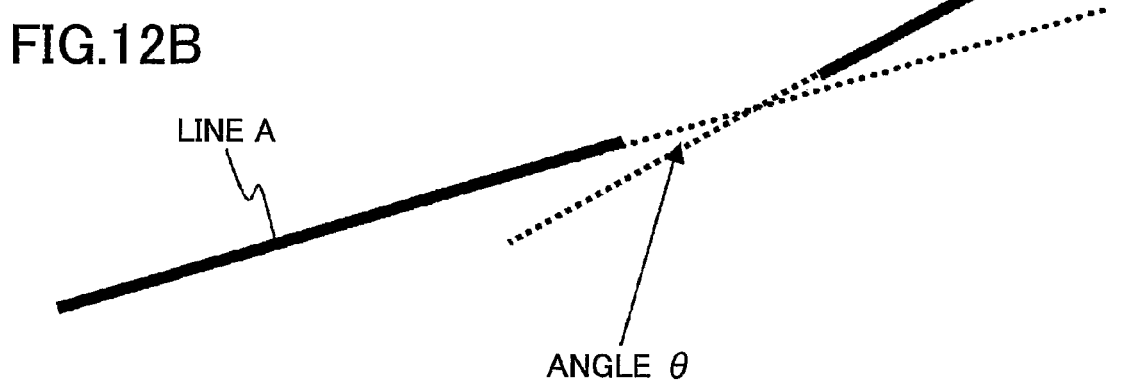
Figure 12C:
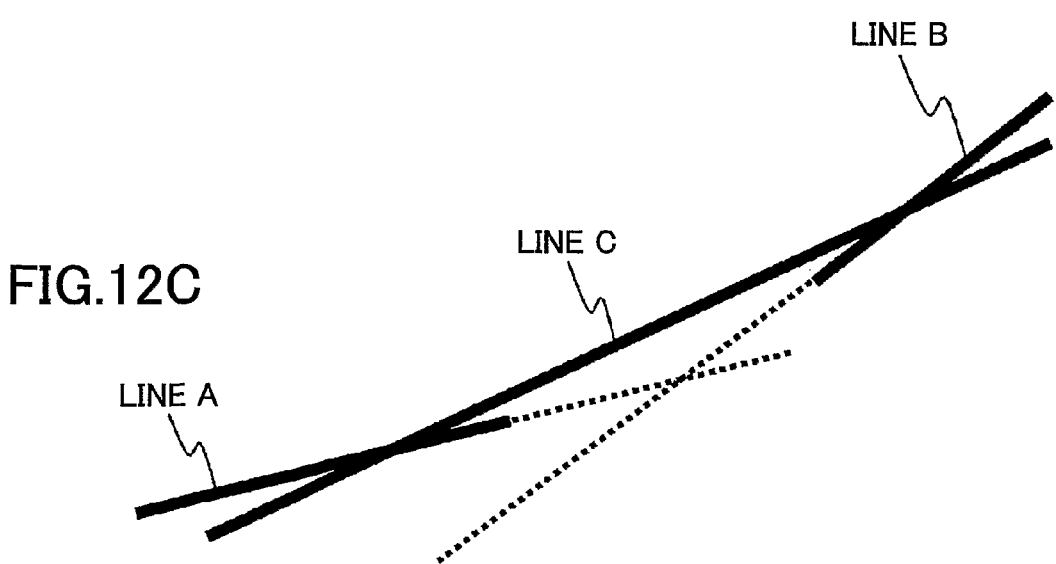

The line generating unit 230 performs a process for generating a new line from the N1 lines extracted by the line extracting unit 220, according to need. When the edge area detecting unit 210 divides the edge images into eight directions, a single line may be erroneously divided into a plurality of lines. The line generating unit 230 performs a process to compensate for such a case. The line generating unit 230 operates when an input image is distorted, or when the background of a photographed object includes complex colors. FIG. 11 is a flowchart of a process performed by the line generating unit 230. FIGS. 12A, 12B, 12C are examples of line generation.

N1 lines extracted by the line extracting unit 220 are input (step 1200). Among them, the line generating unit 230 extracts two lines having a number i and a number j (step 1201). The line generating unit 230 generates all possible pairs of lines out of the N1 lines; the total number of pairs is expressed by N1×(N1−1)/2 (step 1202). A serial number is given to all of the line pairs. A default value of a count value Cnt is set to 1, and N2 is set to N2=N1 (step 1203). Cnt represents the serial number of a line pair that is the process subject, and N2 represents the sum of existing lines (N1)+new lines. Subsequently, the following steps are performed.

The line generating unit 230 determines whether the count value Cnt has exceeded N1×(N1−1)/2 (step 1204). When the count value Cnt has exceeded N1×(N1−1)/2 (No in step 1204), the process ends. When the count value Cnt has not exceeded N1×(N1−1)/2 (Yes in step 1204), the line generating unit 230 selects the Cnt'th pair of lines (the 1st pair at first) (step 1205), and calculates an angle between the two lines included in the pair (line A and line B) in the range of 0° to 90° (step 1206). The line generating unit 230 determines whether the angle between the line A and the line B is greater than or equal to a predetermined threshold (e.g. 5°) (step 1207). When the line generating unit 230 determines that the angle is greater than or equal to the threshold (No in step 1207), the count value is incremented by 1 (Cnt+1) (step 1216), and the process returns to step 1204. FIG. 12A and FIG. 12B are examples of positional relationships of the line A and the line B, and the angle therebetween is indicated by θ. FIG. 12A is an example when the angle θ between the pair of lines A, B is greater than or equal to the threshold, and FIG. 12B is an example when the angle θ between the pair of lines A, B is less than the threshold.

When the line generating unit 230 determines that the angle is less than the threshold (Yes in step 1207), the line generating unit 230 measures the distance between the pair of lines A, B (step 1208). The distance between the pair of lines A, B is defined as the minimum value among the distances 1 to 4 as described below.

1. Distance between a straight line obtained by infinitely extending line B, and the starting point of line A
2. Distance between a straight line obtained by infinitely extending line B, and the ending point, of line A
3. Distance between a straight line obtained by infinitely extending line A, and the starting point of line B
4. Distance between a straight line obtained by infinitely extending line A, and the ending point of line B The line generating unit 230 determines whether the obtained distance between the lines A, B is below a predetermined threshold (step 1209). When the distance is greater than or equal to the threshold (distance is too large) (No in step 1209), the count value is incremented by 1 (Cnt+1) (step 1216), and the process returns to step 1204.

On the other hand, when the distance is less than the threshold (Yes in step 1209), four distances are obtained from the combinations of the starting point and the ending point of the line A and the starting point and the ending point of the line B. The maximum value (distance 1) and the minimum value (distance 2) among the four distances obtained are determined (step 1210). The line generating unit 230 determines whether the following formula (1) is satisfied, where V is a predetermined threshold (step 1211):

$$V < (\text{length of line } A + \text{length of line } B + \text{distance 2})/\text{distance 1} \qquad (1)$$

When the formula (1) is not satisfied (No in step 1211), the count value is incremented by 1 (Cnt+1) (step 1216), and the process returns to step 1204.

When the formula (1) is satisfied (Yes in step 1211), the line generating unit 230 compares the X, Y coordinates of line A and line B of the line pair, and determines whether the following conditions are satisfied (step 1212):

[Conditions]

(The X coordinates of the starting point and the ending point of line A are greater than or equal to the X coordinates of the starting point and the ending point of line B, or the X coordinates of the starting point and the ending point of line A are less than the X coordinates of the starting point and the ending point of line B) and (The Y coordinates of the starting point and the ending point of line A are greater than or equal to the Y coordinates of the starting point and the ending point of line B, or the Y coordinates of the starting point and the ending point of line A are less than the Y coordinates of the starting point and the ending point of line B). When these conditions are not satisfied (No in step 1212), the count value is incremented by 1 (Cnt+1) (step 1216), and the process returns to step 1204.

When these conditions are satisfied (Yes in step 1212), a new line is generated (step 1213). The new line is a line C having a starting point and an ending point that is a combination of two points whose distances are maximum among the four distances obtained in step 1210, from the combinations of the starting point and the ending point of the line A and the starting point and the ending point of the line B. For the example of FIG. 12B, the new line C is generated as shown in FIG. 12C. The existing lines (line A and line B) are not removed, and are treated as lines not satisfying the conditions described in step 1212. The generated line is added with a subsequent serial number (step 1214). N2 is incremented by 1, which is expressed by N2+1 (step 1215), and the count value is incremented by 1 (Cnt+1) (step 1216), and the process returns to step 1204.

The above process is repeated for all line pairs, which is N1×(N1−1)/2 pairs, so that necessary lines are generated and added. Accordingly, a total of N2 lines are obtained by adding the lines newly generated by the line generating unit 230 to the existing N1 lines.

In the above description, a line is generated when the conditions in steps 1207, 1209, 1211, 1213 are satisfied. However, if necessary, a new line can be generated even when only one of the conditions are satisfied. Moreover, it is possible to create a new line pair consisting of the generated line C and an existing line, and determine whether another new line needs to be created.

<Line Pair Categorization/Evaluation>

Figure 13:
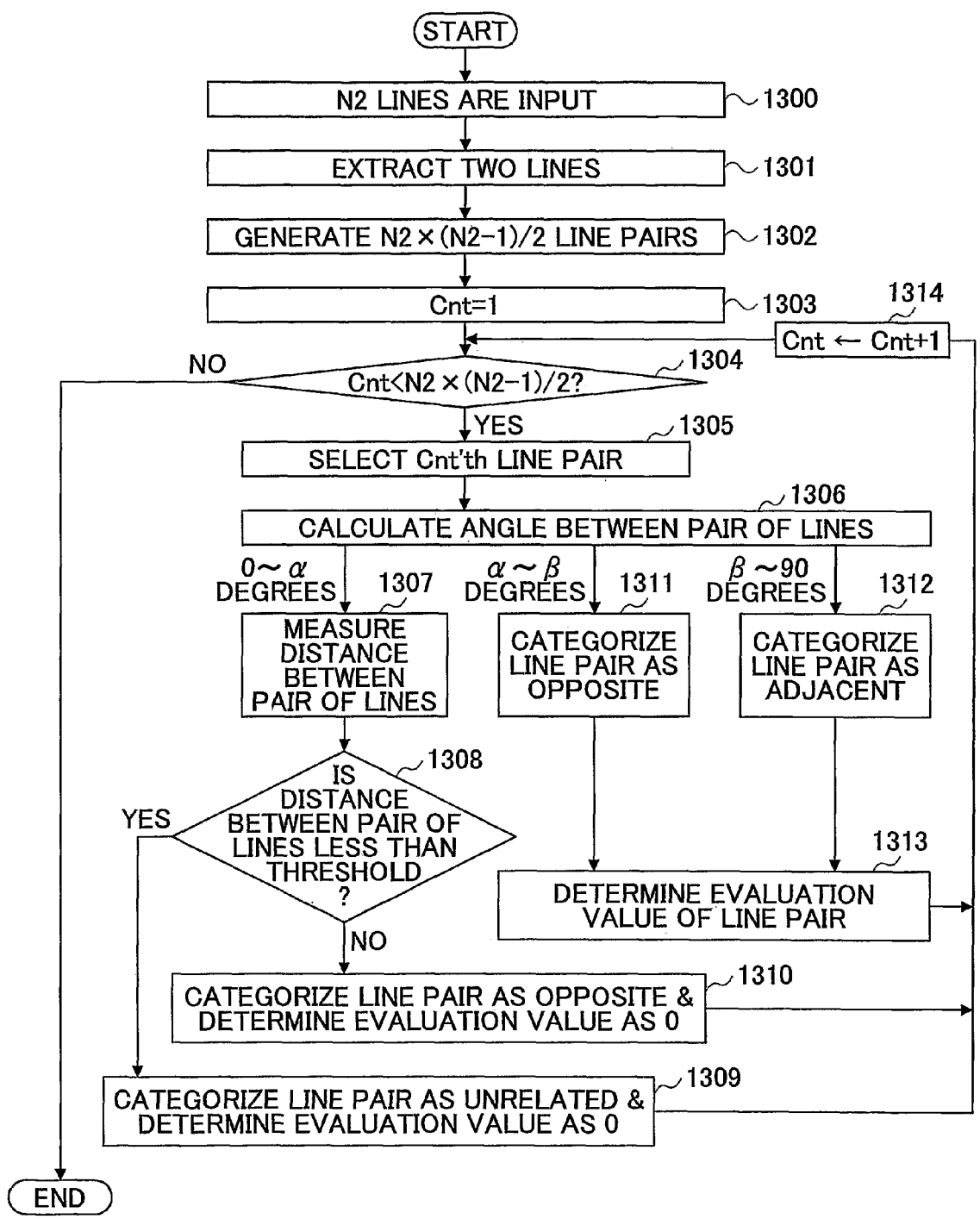
FIG. 13 is a flowchart of a process performed by a line pair categorization/evaluation unit shown in FIG. 3.

The line pair categorization/evaluation unit 240 extracts two lines having a number i and a number j (hereinafter, line pair i, j) from the N2 lines, corresponding to the sum of the existing N1 lines and the (N2−N1) lines generated by the line generating unit 230. The line pair categorization/evaluation unit 240 categorizes line pairs, and determines evaluation values. In this example, the line pairs are categorized as: unrelated, opposite, or adjacent. FIG. 13 is a flowchart of the process performed by the line pair categorization/evaluation unit 240.

N2 lines, corresponding to the sum of the existing N1 lines and the lines generated by the line generating unit 230, are input (step 1300). Two lines having the number i and the number j are extracted (line pair i, j) (step 1301). All line pair combinations from the N2 lines are generated; the total number of pairs corresponding to N2×(N2−1)/2 (step 1302). A serial number is given to each of the line pairs. A default value of a count value Cnt is set to 1 (step 1303). Subsequently, the following steps are performed.

The line pair categorization/evaluation unit 240 determines whether the count value Cnt is greater than or equal to N2×(N2−1)/2 (step 1304). When the count value Cnt is greater than or equal to N2×(N2−1)/2 (No in step 1304), the process ends. When the count value Cnt is less than N2×(N2−1)/2 (Yes in step 1304), the line pair categorization/evaluation unit 240 selects the Cnt'th pair of lines (the 1st pair at first) (step 1305), and calculates an angle between the two lines included in the pair (line A and line B) in the range of 0° to 90° (step 1306). Examples of the angle between the lines A, B are as shown in FIGS. 12A, 12B. The following process is performed according to the angle between the lines A, B. Values of α, β are predetermined based on, for example, statistics.

When the angle between the pair of lines is 0° to α°, the line pair categorization/evaluation unit 240 measures the distance between the pair of lines (step 1307). The line pair categorization/evaluation unit 240 determines whether the distance between the pair of lines is below a predetermined threshold (step 1308). When the distance between the pair of lines is below the predetermined threshold (Yes in step 1308), the line pair categorization/evaluation unit 240 categorizes the line pair as unrelated, and determines the evaluation value as 0 (step 1309). When the distance between the pair of lines is greater than or equal to the threshold (No in step 1308), the line pair categorization/evaluation unit 240 categorizes the line pair as opposite, and determines the evaluation value as 0 (step 1310). Subsequently, the count value is incremented by 1 (Cnt+1) (step 1314), and the process returns to step 1304.

When the angle between the pair of lines is α° to β°, the line pair categorization/evaluation unit 240 categorizes the line pair as opposite (step 1311), and the process proceeds to step 1313. When the angle between the pair of lines is β° to 90°, the line pair categorization/evaluation unit 240 categorizes the line pair as adjacent (step 1312), and the process proceeds to step 1313. Subsequently, the count value is incremented by 1 (Cnt+1) (step 1314), and the process returns to step 1304.

In step 1313, the evaluation value of the line pair is obtained as follows. The evaluation value is indicated between 0 and 1.

1. Obtain an intersecting point O of a straight line obtained by infinitely extending line A, and a straight line obtained by infinitely extending line B
2. Obtain the Euclid distance between the intersecting point O and the starting point of line A, and the Euclid distance between the intersecting point O and the ending point of line A, and the shorter distance is determined as a distance A
3. Obtain the Euclid distance between the intersecting point O and the starting point of line B, and the Euclid distance between the intersecting point O and the ending point of line B, and the shorter distance is determined as a distance B
4. The distance A and the distance B is substituted into the following formula (2) to calculate the evaluation value (Value)

$$\text{Value} = \frac{1}{2 + \frac{\text{Distance } A}{\text{Const.1}}} + \frac{1}{2 + \frac{\text{Distance } B}{\text{Const.1}}}$$

Const. 1 is a constant number according to the image size. By changing the Const. 1, it is possible to perform the calculation even when the intersecting point O exists outside the image area and a vertex of a quadrangle to be extracted exists outside the image area.

In the present embodiment, the line pairs are categorized as opposite, adjacent, or unrelated, and there is one type of evaluation value. It is also possible to determine an evaluation value for opposing lines. However, the process takes more time with increased categories or evaluation values.

<Quadrangle Evaluation>

Figure 14:
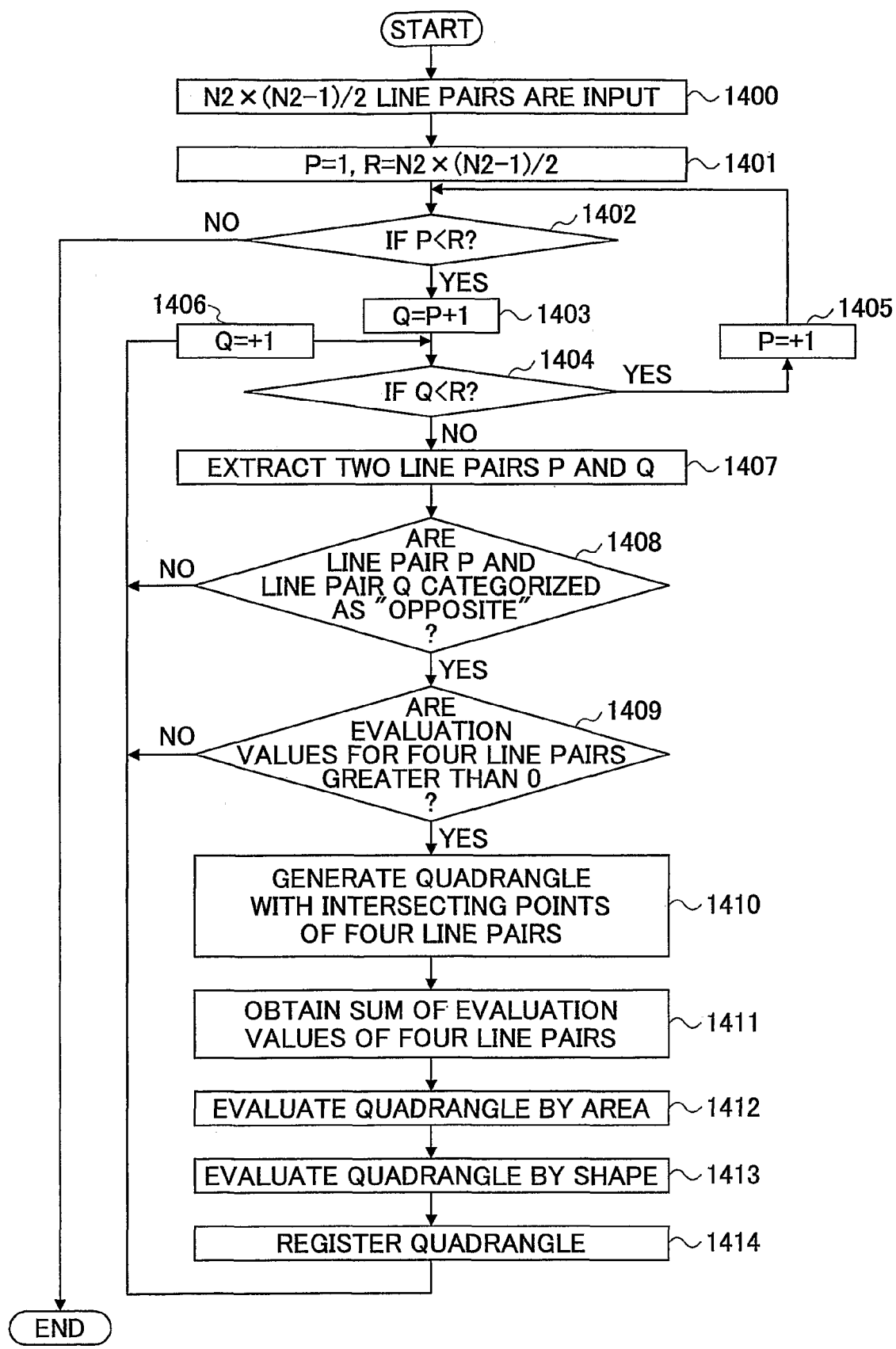
FIG. 14 is a flowchart of a process performed by a quadrangle evaluation unit shown in FIG. 3.

The quadrangle evaluation unit 250 sequentially extracts two line pairs from R (an integer number) pairs (R=N2(N2−1)/2) obtained by the line pair categorization/evaluation unit 240. Based on the categories and the evaluation values of the two line pairs extracted, an evaluation value is determined for a quadrangle formed by two line pairs. FIG. 14 is a flowchart of a process performed by the quadrangle evaluation unit 250.

The N2×(N2−1)/2 number of line pairs obtained by the line pair categorization/evaluation unit 240 are input (step 1400). Values of P and R are set as P=1, R=N2×(N2−1)/2 (step 1401). Out of R pairs (R=N2×(N2−1)/2), all possible combinations of two line pairs are extracted (steps 1402 through 1406), and the following steps are performed.

The quadrangle evaluation unit 250 extracts two line pairs, a line pair P and a line pair Q (step 1407). The line pair P is equivalent to a line pair i, j including a line i and a line j, and the line pair Q is equivalent to a line pair k, l including a line k and a line l.

The quadrangle evaluation unit 250 determines whether both the line pair P and the line pair Q include opposite lines (step 1408). When the line pair P and the line pair Q are both categorized as opposite, there is a possibility that the line i, the line j, the line k, and the line l included in the line pair P and the line pair Q form a quadrangle. Thus, the quadrangle evaluation unit 250 determines whether the evaluation values for four line pairs (line pair j, k, line pair i, l, line pair i, k, line pair j, l) are greater than 0 (step 1409). When the evaluation values for all four pairs are greater than 0, the quadrangle evaluation unit 250 generates a quadrangle formed by an intersecting point m1 of line (straight line) i and line k, an intersecting point m2 of line i and line l, an intersecting point m3 of line j and line k, and an intersecting point m4 of line j and line k (step 1410). An evaluation value V of this quadrangle (i, k, j, l) is calculated by adding the evaluation values of the four line pairs (step 1411).

In the present embodiment, the determination is made based on whether the evaluation values of the line pairs are greater than 0. However, it is also possible to provide a threshold for the evaluation value of the line pairs, and sort the evaluation values of the line pairs beforehand so as to use only line pairs that have high evaluation values. Accordingly, the edge detection process requires less time. Moreover, when coordinates of m1, m2, m3, m4 are positioned far away from the image area, it is possible to set V(i, k, j, l)=0. Further, when the quadrangle m1m2m3m4 is not a convex quadrangle, it is possible to set V(i, k, j, l)=0.

Next, an area S of the quadrangle m1m2m3m4 is obtained, and is multiplied by V(i, k, j, l) (step 1412). Instead of multiplying S, it is possible to create a function g(S) that monotonically increases with S, and perform multiplication or addition between g(S) and V(i, k, j, l).

Next, the quadrangle evaluation unit 250 evaluates the shape of the quadrangle m1m2m3m4 (step 1413). This is performed as follows. The intersecting point of the line i and the line j of the line pair i, j, and the intersecting point of the line k and the line l of the line pair k, l are considered as two vanishing points. A projective transformation matrix that transforms the two vanishing points into infinite distances is obtained. The projective transformation matrix is obtained by hypothesizing that the quadrangle m1m2m3m4 is a parallelogram existing on a three-dimensional plane, and calculating a unit normal vector (a, b, c) on a plane (for example, refer to "Gazo Rikai", written by Kenichi Kanaya, published by Morikita Shuppan in May, 1990). Accordingly, it is possible to obtain a rotational transfer matrix that can match the unit normal vector with the optical axis of the camera, by using the focal length when the image is photographed. Then, a projection parallelogram n1n2n3n4 is obtained by performing projection transformation on the quadrangle m1m2m3m4, and one angle θ (0° to 90°) of the projection parallelogram is calculated. When θ is greater than or equal to 90°, the other angles of the parallelogram are calculated. The calculated θ is multiplied by V(i, k, j, l). Instead of multiplying θ, it is possible to create a function f(θ) that monotonically increases with θ, and perform multiplication or addition between f(θ) and V(i, k, i, l). Further, the V(i, k, j, l) weighted by the area S or g(s) can further be weighted by θ or f(θ).

Next, the intersecting points m1, m2, m3, m4 of the four line pairs forming the quadrangle i, k, j, l and the evaluation value V(i, k, j, l) are loaded in a memory, etc. (step 1414).

<Quadrangle Selection>

The quadrangle selecting unit 260 selects one or more quadrangles from the quadrangles loaded by the quadrangle evaluation unit 250, in descending order of the evaluation value V(i, k, j, l). If necessary, the selection can be made by using one or both of evaluation values of the area and evaluation values of the shape.

<Projection Transformation>

The projection transformation unit 270 calculates a projection transformation matrix based on the quadrangle selected by the quadrangle selecting unit 260, performs projection transformation on an input image, and corrects distortion.

The projection transformation matrix can be calculated as follows. The order of the vertexes of the quadrangle m1m2m3m4 is rearranged to be in a clockwise order, with the vertex closest to the origin at the starting point. FIG. 15 is an example of the rearrangement. The same method as that of step 1413 is used to calculate a projection parallelogram, and obtain a value for m1m2:m1m4. Assuming that the image size of an input image is 1 MB×1 MB, the projection transformation unit 270 obtains a rectangle that satisfies horizontal length:vertical length=m1m2:m1m4, that has the largest area, and whose center matches the center of the image. The vertexes of the obtained rectangle are denoted by u1, u2, u3, u4 in a clockwise direction. Similar to the quadrangle m1m2m3m4, u1 is the vertex closest to the origin, among u1, u2, u3, u4. The projection transformation unit 270 obtains a projective transformation matrix that links the vertexes of the quadrangle m1m2m3m4 with the vertexes of the rectangle u1u2u3u4, as m1→u1, m2→u2, m3→u3, m4→u4.

By using the projection transformation matrix thus obtained, projection transformation is performed on the input image. According to need, when performing projection transformation; it is also possible to enlarge/reduce the image, or shift the image in a parallel direction or in a rotating direction.

Figure 16A:
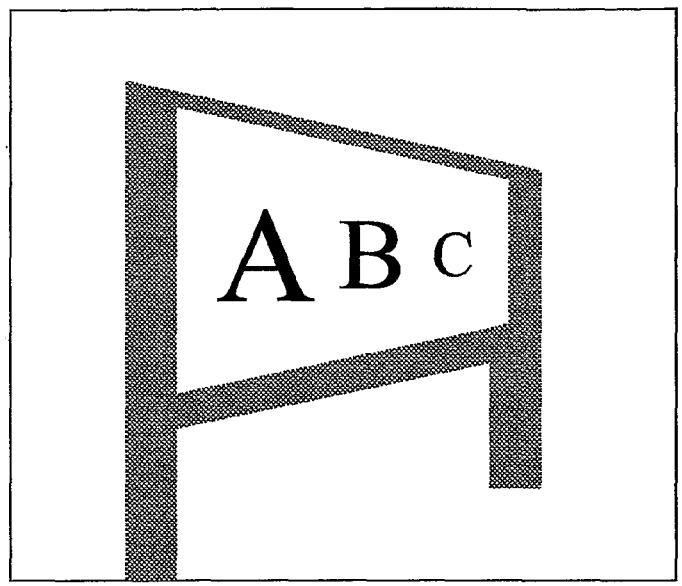
FIGS. 16A, 16B, 16C are diagrams describing an example of correcting distortion of a quadrangle extracted from a photographed image.
Figure 16B:
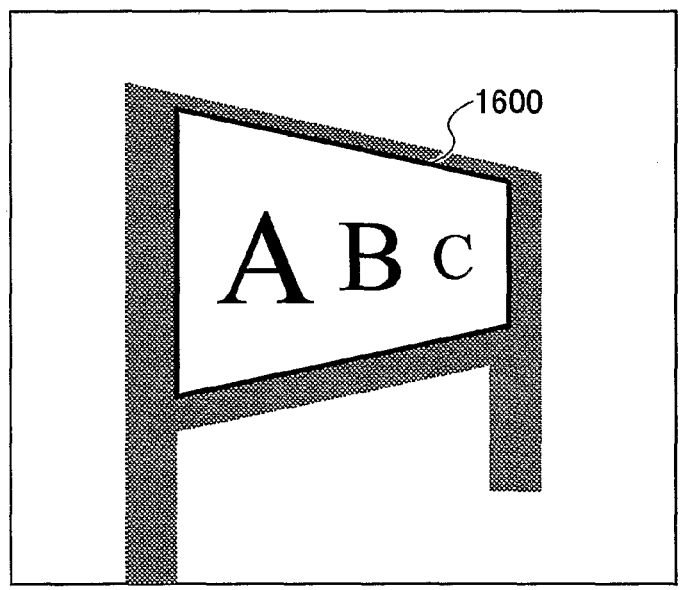
Figure 16C:
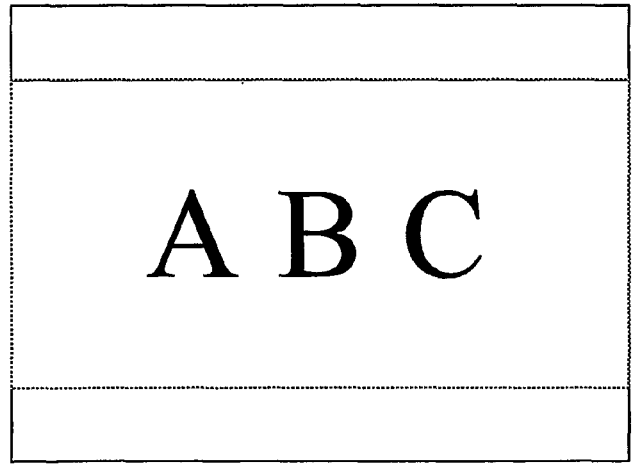
Figure 17A:
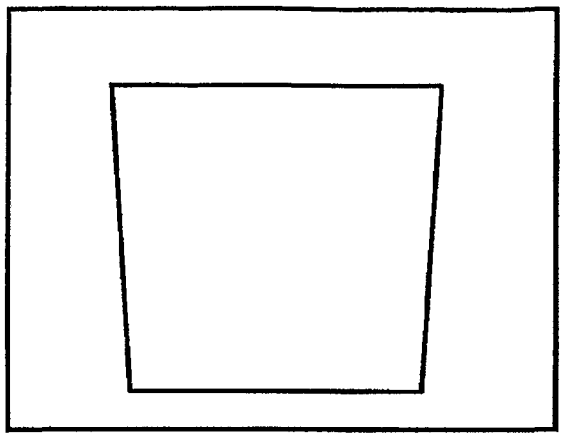
FIGS. 17A, 17B are diagrams for describing a problem of the conventional technology.
Figure 17B:
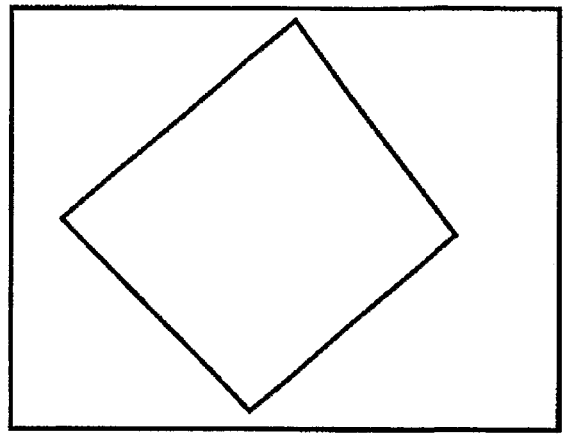

FIGS. 16A, 16B, 16C are an example of correcting distortion of a quadrangle extracted from a photographed image. FIG. 16A is a photographed image (input image), and a quadrangle 1600 shown in FIG. 16B is extracted from a projection image of this image. When distortion is corrected, an image shown in FIG. 16C can be obtained.

A digital camera according to an embodiment of the present invention includes the following units. A first unit extracts plurality of shapes (quadrangles, rectangles, etc.) from a single photographed image input to the camera. A second unit highlights the extracted shapes, superposes each highlighted shape in the input image, thereby creating a plurality of highlighted shape area images. A third unit displays the highlighted shape area images on the digital camera. The highlighted shape area image is created by performing different processes on different areas in the input image (distinguishing by using different colors or inverted colors), on one or more areas among the inside, the outside, or the perimeter of the extracted shape. A highlighted shape area image is created/displayed for each extracted shape. Accordingly, the user can easily confirm and distinguish each of the shapes.

By displaying a plurality of highlighted shape area images at once, a plurality of shapes can be confirmed at once. By displaying a plurality of highlighted shape area images one by one, each image can be displayed at high resolution.

By setting one shape as the target shape, and creating/displaying the highlighted shape area image corresponding to the target shape so as to be distinguished from highlighted shape area images corresponding to shapes other than the target shape, the user can immediately distinguish and easily select the desired shape. Further, by enlarging the highlighted shape area image, it is possible to display only the target shape in high resolution.

The digital camera applicable to the present invention includes a unit for modifying a desired shape in the highlighted shape area image by the user's operation. Therefore, when a desired shape is not extracted, the user can modify an extracted shape, so that it is unnecessary to take a photograph of the object again.

More detailed descriptions are given below. FIG. 18 is a block diagram of a digital camera including an image processing function according to a second embodiment of the present invention. As shown in FIG. 18, a photographing section 11 includes a lens 111, an aperture 112, a shutter 113, a photoelectric conversion element 114, and a preprocessing unit 115. By operating the shutter 113, the photoelectric conversion element 114 receives an object light through the lens 111 and the aperture 112, and the object light is converted into analog image signals. An example of the photoelectric conversion element 114 is a CCD charge-coupled device). The preprocessing unit 115 includes a preamplifier, an analog signal processing unit such as an AGC (automatic gain control), and an A/D conversion unit. The preprocessing unit 115 performs preprocesses such as amplifying/clamping on the analog image signals received from the photoelectric conversion element 114, and then converts the analog image signals into digital image signals.

The digital signals output from the preprocessing unit 115 are sent through a camera signal processing section 12, and loaded into a frame memory 15. Examples of the frame memory 15 include VRAM, SRAM, and DRAM. The frame memory 15 is used for temporarily holding image signals to be processed by the camera signal processing section 12.

The camera signal processing section 12 includes a digital signal processor (DSP). The camera signal processing section 12 includes a highlighted shape area image generation/display control unit 130, which performs the image processing function according to an embodiment of the present invention. Details are described below. A ROM 13 is a program memory used for holding programs executed by the camera signal processing section 12, and a RAM 14 is a working memory used for temporarily holding data that is processed halfway by the camera signal processing section 12, or other necessary data.

A CPU 16 includes a microcomputer, and controls the photographing section 11 and the camera signal processing section 12. The CPU 16 can also serve as the ROM 13 and the RAM 14.

The camera signal processing section 12 reads image signals loaded in the frame memory 15, and performs processes on the image signals, such as image compression. Subsequently, the image signals are sent through an interface unit (I/F) 17, and stored in an external storage unit 20. Examples, of the external storage unit 20 include an IC memory card and an optical magnetic disk. Alternatively, a modem card or an ISDN card, for example, can be used to send the image signals to a remote terminal via a network. On the other hand, image signals read from the external storage unit 20 are sent via the I/F 17 to the camera signal processing section 12, where the image signals are decompressed, and then loaded in, the frame memory 15.

Figure 19:
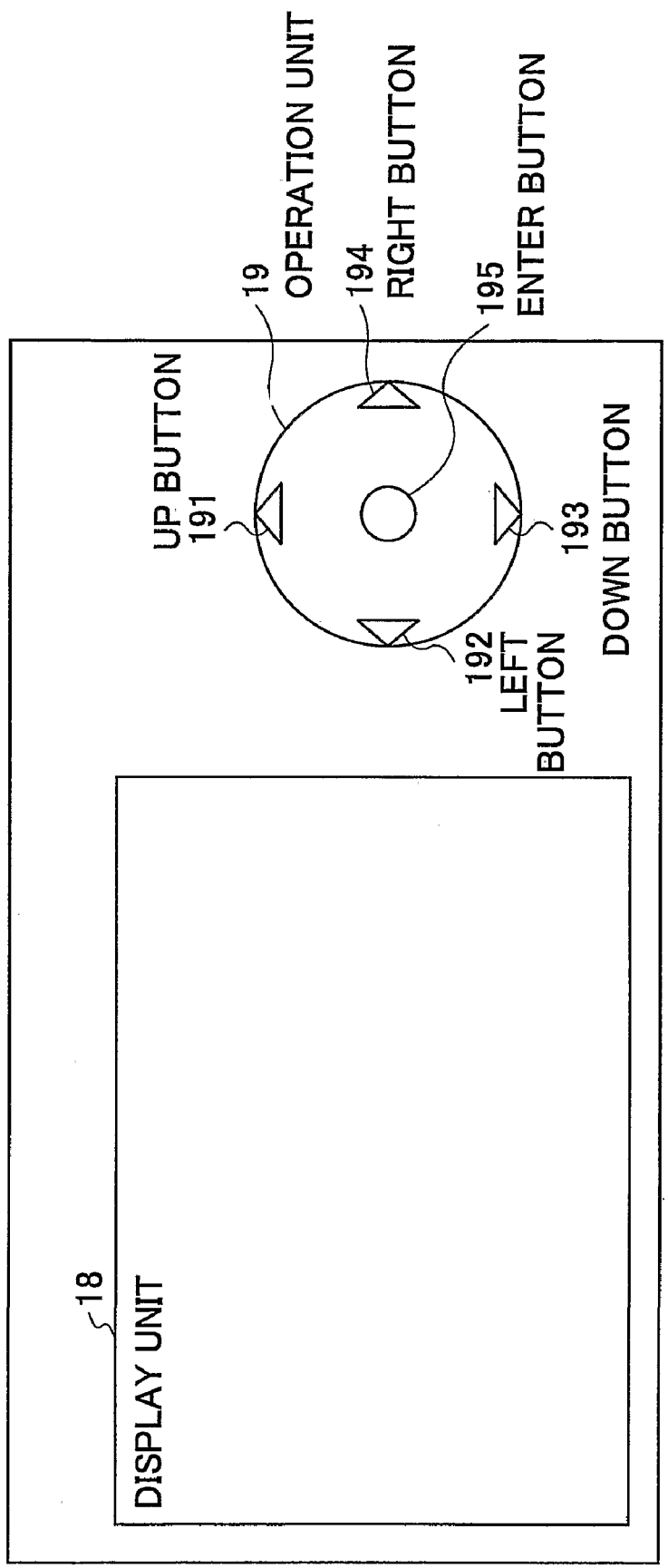
FIG. 19 is a schematic of a display unit and an operation unit disposed on the backside of the digital camera shown in FIG. 18.

As shown in FIG. 19, a display unit 18 and an operation unit 19 are adjacent to each other on the backside of the digital camera. An example of the display unit 18 is a liquid crystal display device. The operation unit 19 includes up/down/left/right buttons 191 through 194, and an enter button 195.

To display the image signals, the image signals in the frame memory 15 or the RAM 14 are sent to the display unit 18 via the camera signal processing section 12 and the I/F 17. By pressing the buttons 191 through 15 in conjunction with the contents displayed on the display unit 18, operating signals are sent to the camera signal processing section 12 and the highlighted shape area image generation/display control unit 130 via the I/F 17, and various processes and display controls are executed, which are described below.

An example of a configuration and operation processes of the highlighted shape area image generation/display control unit 130 are described below. The function of the highlighted shape area image generation/display control unit 130 can be executed by storing a program in the ROM 13, and causing the digital signal processor (DSP) in the camera signal processing section 12 to execute the program. Alternatively, the process function can be partly or entirely realized by hardware.

In the following example, quadrangles are extracted from an input image as candidate shapes. However, the present embodiment is applicable to any shape. As a matter of description, four quadrangles (candidate quadrangles) are used; however, any number of quadrangles can be used.

Figure 20:
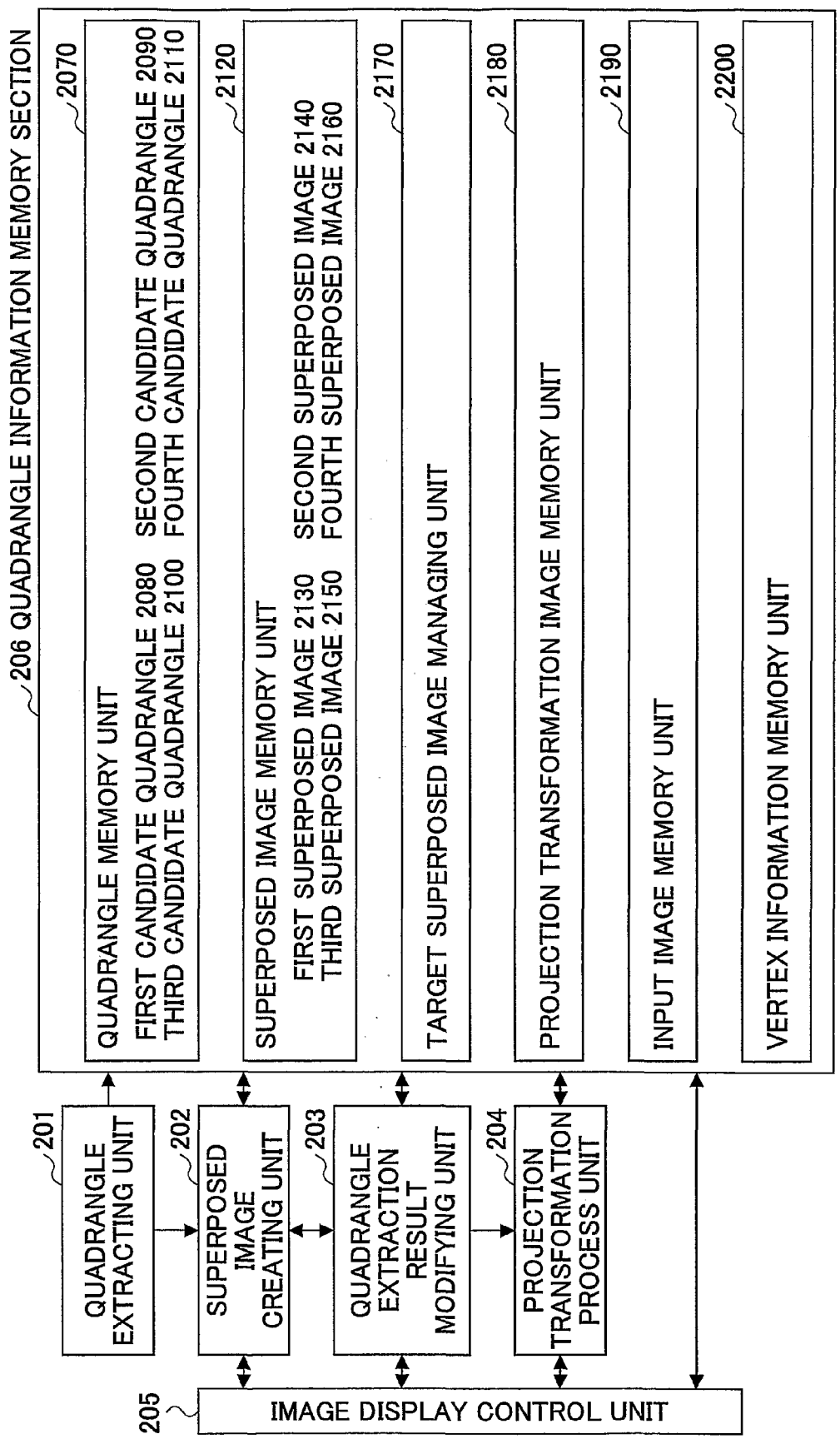
FIG. 20 is a functional block diagram of a highlighted shape area image generation/display control unit shown in FIG. 18.

FIG. 20 is a functional block diagram of the highlighted shape area image generation/display control unit 130. The highlighted shape area image generation/display control unit 130 includes the following units. A quadrangle extracting unit 201, functioning as a shape extracting unit, extracts a quadrangle from a photographed input image. A superposed image creating unit 202, functioning as a highlighted shape area image generating unit, creates a superposed image, which includes a highlighted shape area, by superposing one or more quadrangles extracted by the quadrangle extracting unit 201 in the input image. A quadrangle extraction result modifying unit 203 modifies a quadrangle extracted by the quadrangle extracting unit 201 according to need. A projection transformation process unit 204 calculates a projection transformation matrix from quadrangle data before or after modification, and performs projection transformation on the input image. An image display control unit 205 controls display of a superposed image or a projection transformation image on the display unit 18, based on instructions from the other units. A quadrangle information memory section 206 holds information about quadrangles, such as the process stages or process results in the other units. An example of the quadrangle information memory section 206 is the RAM 14. The quadrangle information memory section 206 includes the following units. A quadrangle memory unit 2070 holds the shapes of extracted quadrangles. A superposed image memory unit 2120 holds superposed images in which one or more quadrangles are superposed in the input image. A target superposed image managing unit 2170 holds one superposed image among the images held in the superposed image memory unit 2120, as a target superposed image. A projection transformation image memory unit 2180 holds an image obtained by performing projection transformation on the input image. An input image memory unit 2190 holds the input image. A vertex information memory unit 2200 holds coordinates of vertexes used for modifying the shape of a quadrangle selected by a user, and also holds the color to be displayed on the display unit 18. The frame memory 15 can serve as the input image memory unit 2190. Processes and operations of the units 201 through 205 are described in detail.

<Quadrangle Extracting Unit 201>

The quadrangle extracting unit 201 fetches a photographed image held in the input image memory unit 2190, and extracts a quadrangle from the input image. An example of the photographed image is shown in FIG. 21.

Figure 21:
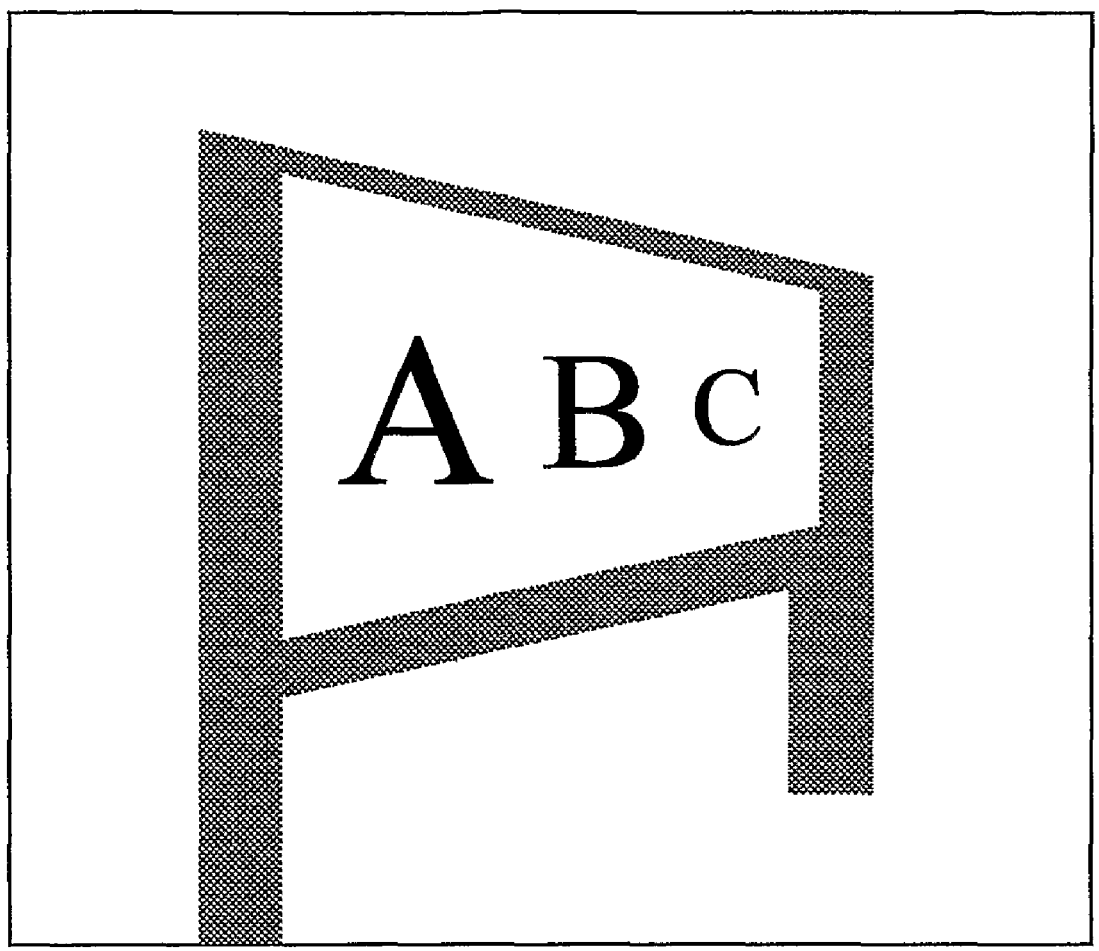
FIG. 21 is an example of an input image.

Assuming that the photographed image shown in FIG. 21 is the input image, the quadrangle extracting unit 201 extracts quadrangles of various combinations from the input image, evaluates the quadrangles, sorts the quadrangles according to evaluation values, selects the top four quadrangles (combinations of four vertexes expressing a quadrangle), and stores them in the quadrangle memory unit 2070. The four quadrangles in descending order are a first candidate quadrangle 2080, a second candidate quadrangle 2090, a third candidate quadrangle 2100, and a fourth candidate quadrangle 2110. As described above, there can be any number of quadrangles.

The quadrangle extracting unit 201 can use any conventional method of extracting quadrangles (see, for example, Patent Documents 2, 3). However, by using the method described in this specification, quadrangles can be extracted with greater precision and greater speed.

<Superposed Image Creating Unit 202> (Part 1)

The superposed image creating unit 202 uses an input image held in the input image memory unit 2190' and the candidate quadrangles held in the quadrangle memory unit 2070 (first candidate quadrangle 2080, second candidate quadrangle 2090, third candidate quadrangle 2100, fourth candidate quadrangle 2110) to create a first superposed image 2130, a second superposed image 2140, a third superposed image 2150, and a fourth superposed image 2160, which are highlighted shape area images, and loads the superposed images in the superposed image memory unit 2120. At the same time, one of the four superposed images is loaded in the target superposed image managing unit 2170 as a target superposed image. In a default setting, the first superposed image 2130 is the target superposed image.

Superposed images can be created in various ways. A typical method (part 1) is described first, and variations thereof are described below.

Figure 22:
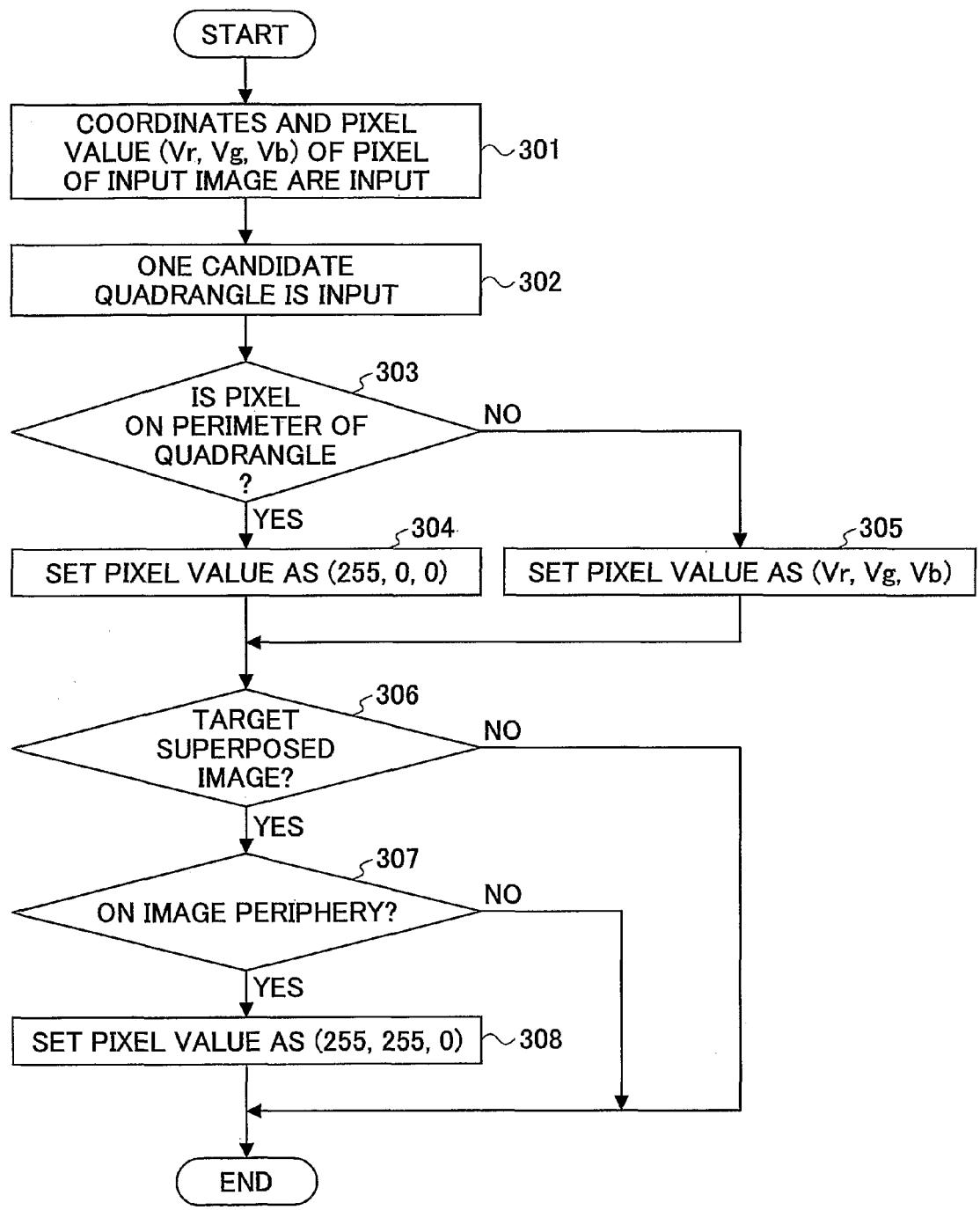
FIG. 22 is a flowchart of a superposed image creation method (part 1) according to a third embodiment.

FIG. 22 is a flowchart of a superposed image creation method (part 1) according to a third embodiment. The process shown in FIG. 22 is performed for all pixels of the candidate quadrangles and the input image (RGB 256 shades).

Coordinates and a pixel value (Vr, Vg, Vb) of a pixel of an input image are input (step 301). Vr represents a pixel value for red (R), Vg represents a pixel value for green (G), and Vb represents a pixel value for blue (B). One candidate quadrangle is input (step 302). In this example, it is assumed that the first candidate quadrangle 2080 is input. Each pixel of the input image is considered as a target pixel, and the following process is performed on a target pixel.

The superposed image creating unit 202 determines whether a target pixel is on the perimeter of the quadrangle (step 303). A pixel on the perimeter of a quadrangle is defined as a pixel on a side of the quadrangle formed by four vertexes extracted by the quadrangle extracting unit 201 being connected by Bresenham's line drawing algorithm (assuming that the quadrangle has a line width 1). A pixel on the quadrangle perimeter having a line width 2 is defined as a combination of a pixel on the quadrangle perimeter having a line width 1 and a pixel adjacent to the pixel on the quadrangle perimeter having a line width 1. A pixel on the quadrangle perimeter having a line width 3 and a line width 4 can be defined similarly. Pixels other than those on the quadrangle perimeter, and that are surrounded by pixels on the quadrangle perimeter, located inside the quadrangle, are referred to as pixels inside the quadrangle. Pixels that do not correspond to pixels on the quadrangle perimeter or inside the quadrangle are referred to as pixels outside the quadrangle.

When the target pixel is a pixel on the quadrangle perimeter, the pixel value thereof is set as (255, 0, 0) (red) (step 304). When a target pixel is not on the quadrangle perimeter, the pixel value thereof remains as (Vr, Vg, Vb) (step 305).

Next, the superposed image creating unit 202 determines whether the superposed image to be created is a target superposed image (step 306). When the superposed image to be created is a target superposed image, the superposed image creating unit 202 determines whether the target pixel is on the image periphery (step 307). Specifically, three pixels from the image edge are defined as pixels on the image periphery. For example, in an image of 320×240, pixels having an x coordinate of 0, 1, 2, 3, 317, 318, 319 or a y coordinate of 0, 1, 2, 237, 238; 239 are pixels on the image periphery. When a target pixel is on the image periphery, the pixel value is set as (255, 255, 0) (yellow) (step 308).

By performing the above process for all pixels in an input image, the superposed image creating unit 202 creates the first superposed image 2130 in which an area corresponding to the first candidate quadrangle 2080 is highlighted by red. Moreover, if the first superposed image 2130 is a target superposed image, the periphery of the image is highlighted by yellow. The created first superposed image 2130 is loaded in the superposed image memory unit 2120.

In a similar manner, the superposed image creating unit 202 creates the second superposed image 2140 from the second candidate quadrangle 2090, the third superposed image 2150 from the third candidate quadrangle 2100, and the fourth superposed image 2160 from the fourth candidate quadrangle 2110, and loads the created images in the superposed image memory unit 2120. At the same time, the target superposed image is loaded in the target superposed image managing unit 2170.

Figure 23:
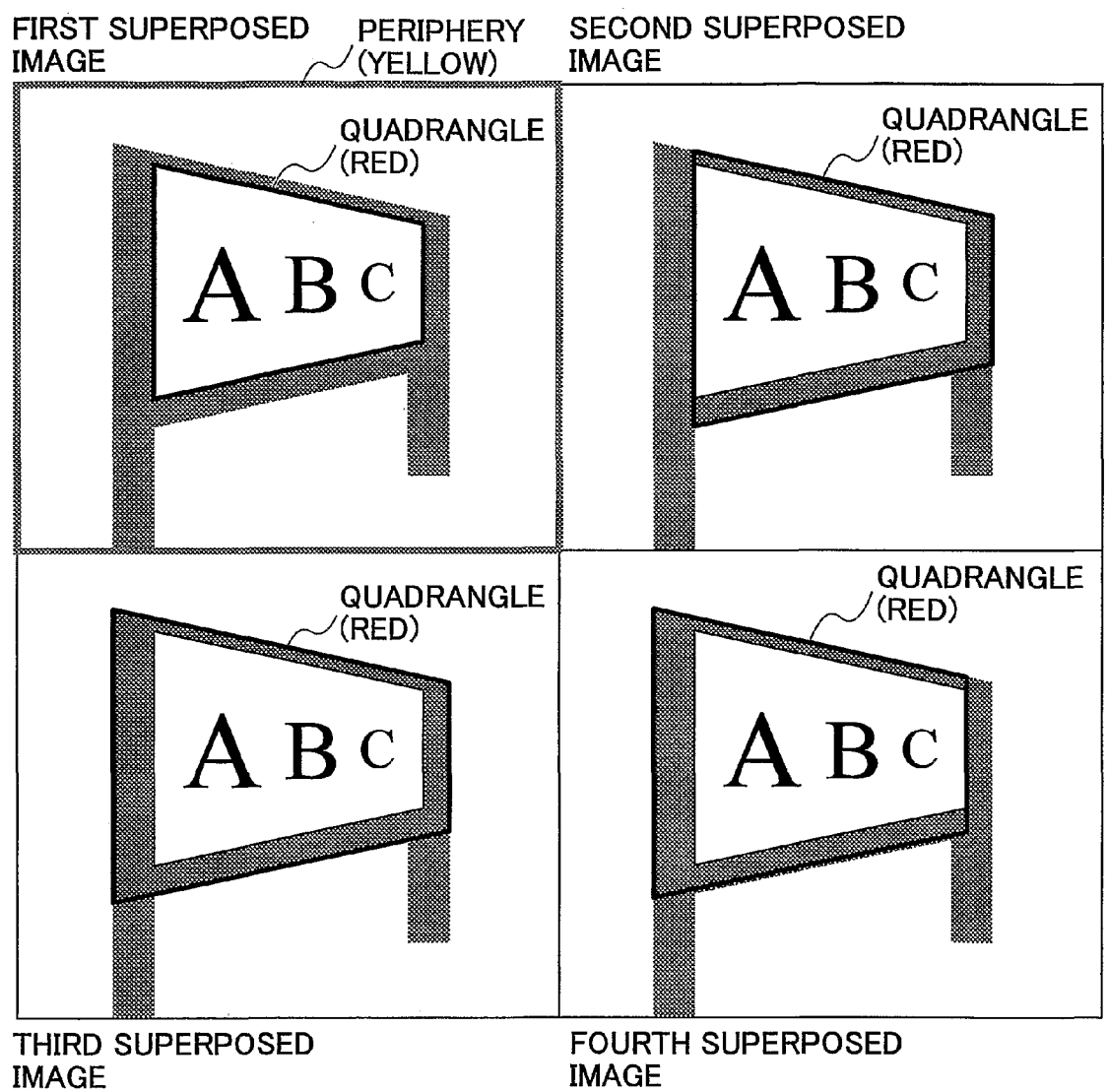
FIG. 23 is an example of superposed images.

When all four superposed images are created, the superposed image creating unit 202 instructs the image display control unit 205 to display them at once. For example, an instruction is given to display the first superposed image 2130 in the top left, the second superposed image 2140 in the top right, the third superposed image 2150 in the bottom left, and the fourth superposed image 2160 in the bottom right. The image display control unit 205 reads the superposed images 2130 through 2160 from the superposed image memory unit 2120, and displays them on the display unit 18 according to the instructions from the superposed image creating unit 202. FIG. 23 is one example shown on the display unit 18. FIG. 23 indicates that the first superposed image 2130 is the target superposed image.

Figure 24:
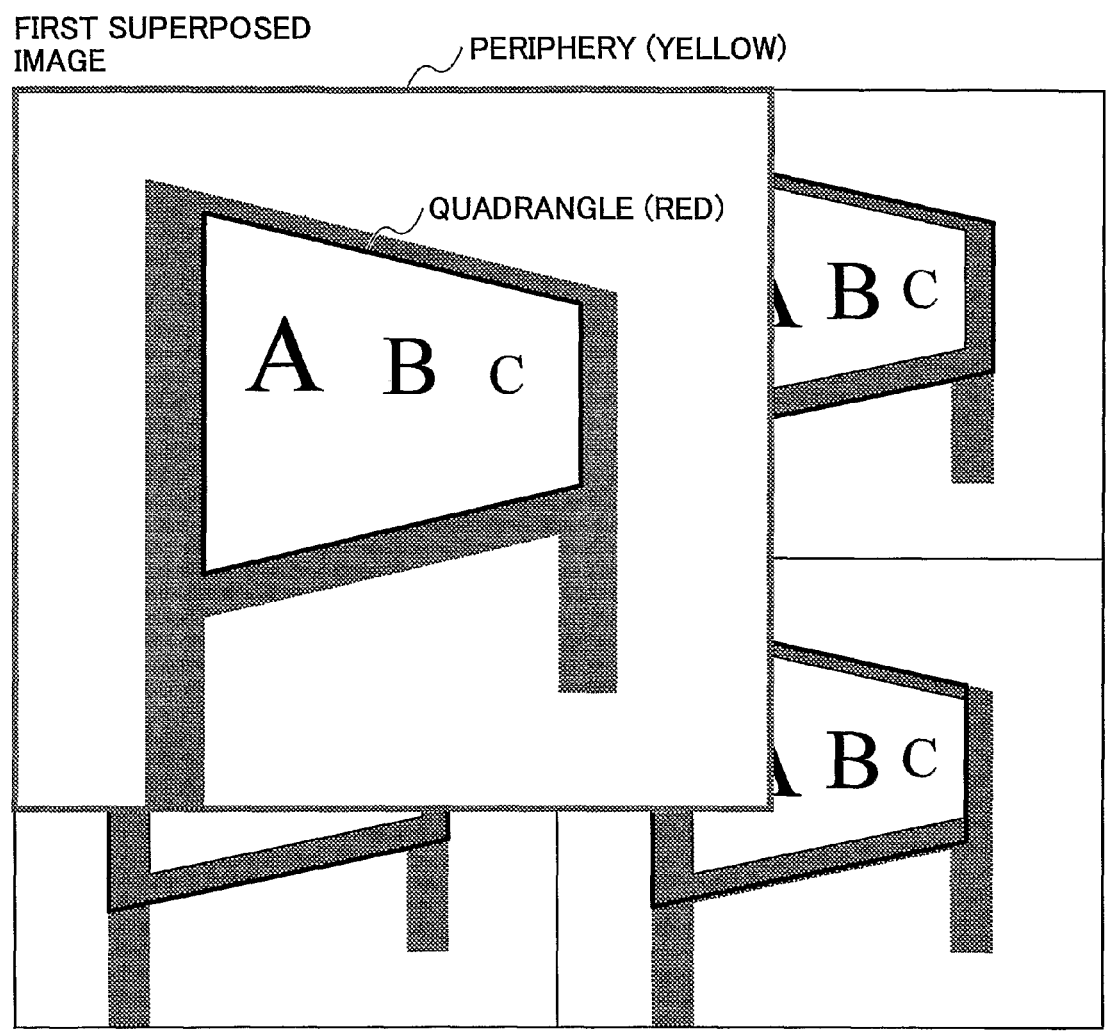
FIG. 24 is another example of superposed images.
Figure 25:
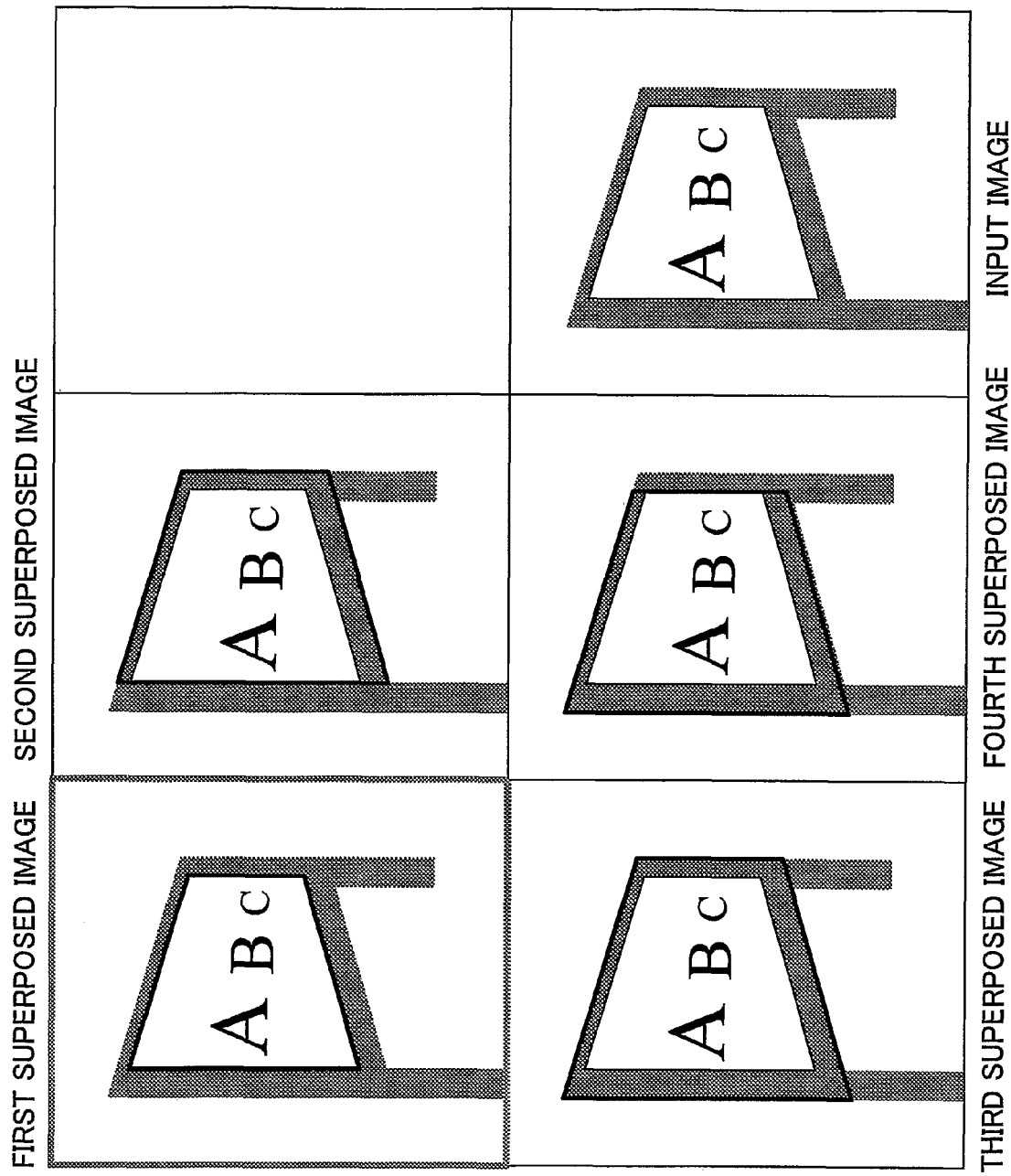
FIG. 25 is still another example of superposed images.

Besides displaying all four superposed images at the same size, only the target superposed image can be enlarged at the front, as shown in FIG. 24. Alternatively, as shown in FIG. 25, the input image (shown in FIG. 21) can also be displayed together with the four superposed images.

<Quadrangle Extraction Result Modifying Unit 203>

The user views the superposed images displayed on the display unit 18, and operates the up/down/left/right buttons 191 through 194 and the enter button 195 according to need, in order to switch the target superposed image or modify the shape of the quadrangle.

Figure 26:
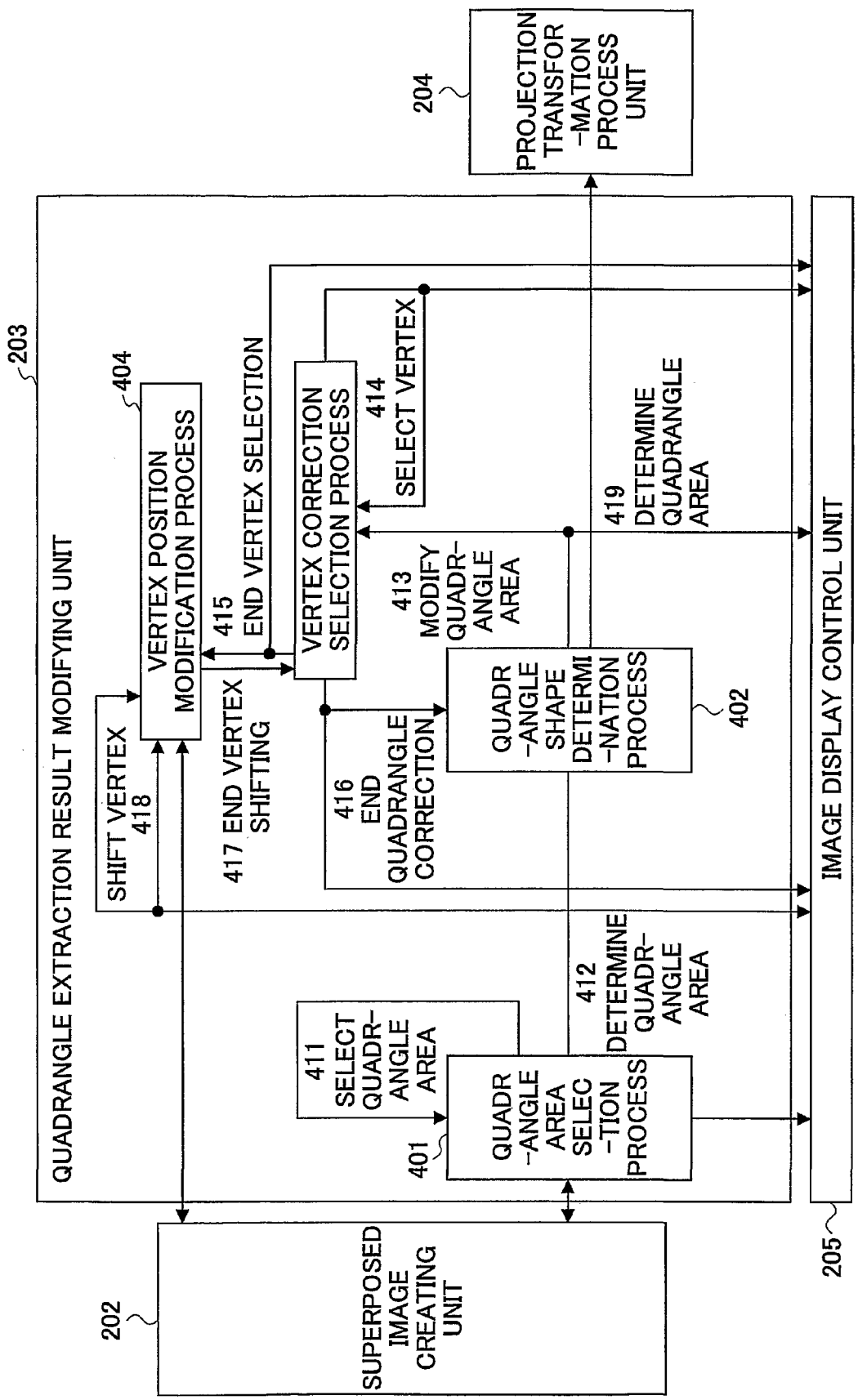
FIG. 26 is a transition chart of the process performed by a quadrangle extraction result modifying unit shown in FIG. 20.

The quadrangle extraction result modifying unit 203 receives operation information from the operation unit 19, selects the target superposed image, modifies the quadrangle in the target superposed image, and instructs the superposed image creating unit 202 to create a superposed image again. FIG. 26 is a transition chart of the process performed by the quadrangle extraction result modifying unit 203. In FIG. 26, steps performed by the quadrangle extraction result modifying unit 203 are denoted by 401 through 404, and instructions from a user are denoted by 411 through 419. The user inputs instructions by pressing the up/down/left/right buttons 191 through 194 and the enter button 195 shown in FIG. 19. The steps of the process are described in detail below. In the initial stage, the superimposed images are shown on the display unit 18 as shown in FIG. 23, and the target superposed image is the first superposed image 2130.

(i) Quadrangle Area Selection Process

In a quadrangle area selection process 401, the user selects a quadrangle from four quadrangles. In the initial stage, a quadrangle corresponding to the target superposed image (first superposed image 2130) held in the target superposed image managing unit 2170 is selected.

Figure 27:
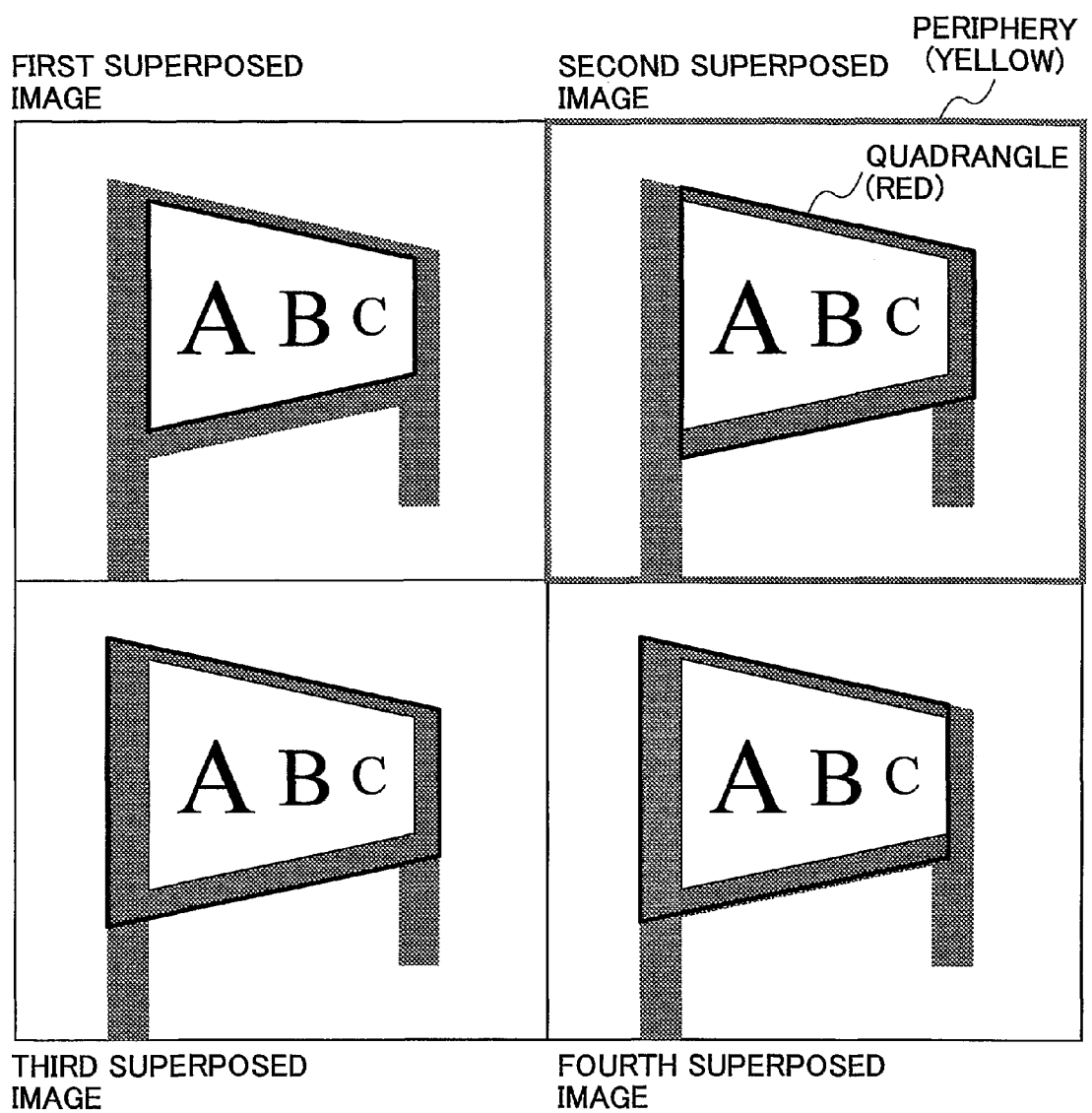
FIG. 27 is an example of switching the target superposed image.

When the user presses the right button 194 (step 411), the target superposed image held in the target superposed image managing unit 2170 switches from the first superposed image 2130 to the second superposed image 2140. The superposed image creating unit 202 updates the first superposed image 2130, the second superposed image 2140, the third superposed image 2150, and fourth superposed image 2160. The superposed image creating unit 202 instructs the image display control unit 205 to update the displayed image. When this instruction is received, the image display control unit 205 updates the display unit 18. When the contents of FIG. 23 are displayed in the initial stage, by pressing the right button 194, the display is updated to the contents of FIG. 27.

When the user presses the left button 192 in the initial stage (step 411), the target superposed image held in the target superposed image managing unit 2170 switches from the first superposed image 2130 to the fourth superposed image 2160. The superposed image creating unit 202 updates the first superposed image 2130, the second superposed image 2140, the third superposed image 2150, and fourth superposed image 2160. The superposed image creating unit 202 instructs the image display control unit 205 to update the displayed image.

As described above, every time the right button 194 is pressed, the target superposed image held in the target superposed image managing unit 2170 switches according to the ascending order of the superposed images held in the superposed image memory unit 2120. Every time the left button 192 is pressed, the target superposed image held in the target superposed image managing unit 2170 switches according to the descending order of the superposed images held in the superposed image memory unit 2120. When the user presses the enter button 195 (step 142), the process shifts to a quadrangle shape determination process 402. In this example, the enter button 195 is pressed in the display state shown in FIG. 23 (first superposed image 2130 is target superposed image).

(ii) Quadrangle Shape Determination Process

In the quadrangle shape determination process 402, it is determined whether the quadrangle corresponding to the target superposed image held in the target superposed image managing unit 2170 needs to be modified.

Figure 28:
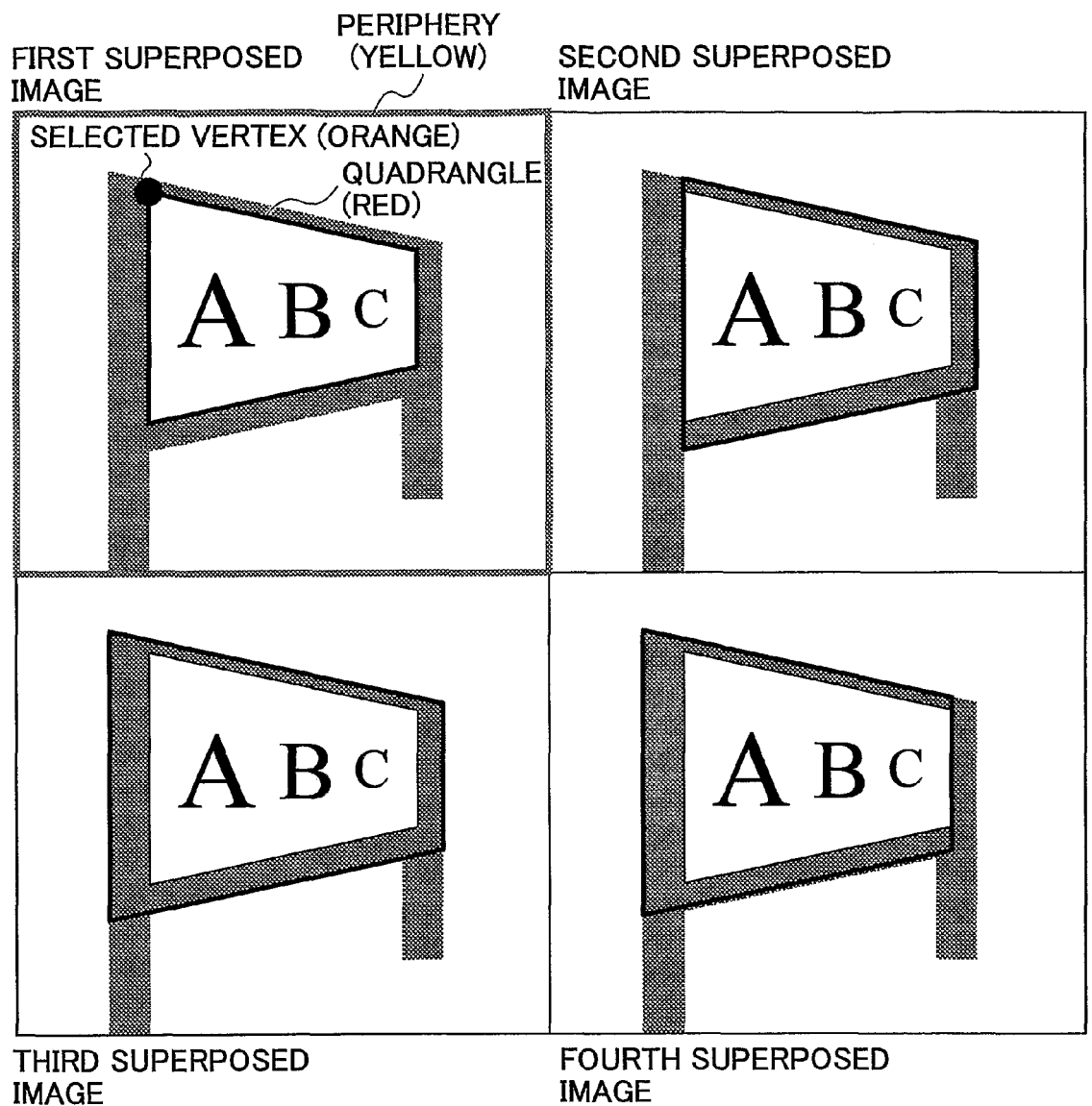
FIG. 28 is an example of modifying a quadrangle corresponding to the target superposed image.

When the user presses any one of the up button 191, the left button 192, the down button 193, or the right button 194 (step 413), the color of a vertex among the vertexes of the selected quadrangle changes, and the process shifts to a vertex correction selection process 403. In FIG. 28, it is determined that the quadrangle corresponding to the first superposed image 2130, which is selected as the target superposed image, needs to be modified, and the top left vertex of the quadrangle is selected. The objective of shifting to the vertex correction selection process 403 is to achieve a quadrangle desired by the user in case none of the automatically extracted quadrangles match the desired quadrangle, by manual correction. Specifically, the user can manually correct the difference between the quadrangle corresponding to the target superposed image held in the target superposed image managing unit 2170 and the desired quadrangle.

The coordinates and the display color of the selected vertex are held in the vertex information memory unit 2200, but the data of the superposed image memory unit 2120 remains unchanged. Therefore, if the quadrangle extraction result modifying unit 203 instructs the image display control unit 205 not to display the vertex, the display returns to the state shown in FIG. 23, from the state shown in FIG. 28. When the enter button 195 is pressed (step 419), the process shifts to the process performed by the projection transformation process unit 204.

(iii) Vertex Correction Selection Process

Figure 29:
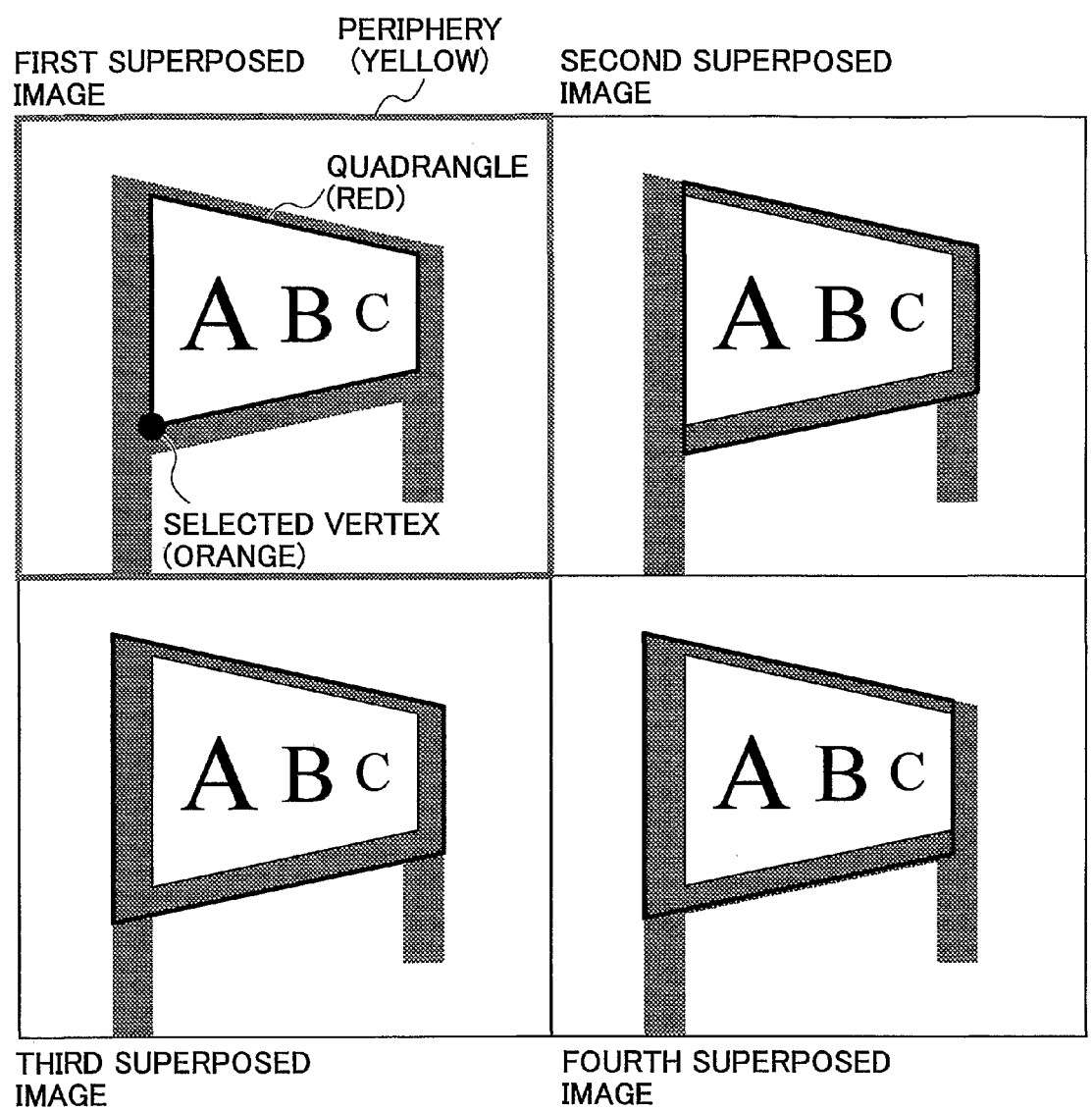
FIG. 29 is another example of modifying a quadrangle corresponding to the target superposed image.

The vertex correction selection process 403 determines the vertex whose position is to be corrected from among the four vertexes expressing the selected quadrangle. When the user presses the left button 192 or the right button 194 (step 414), the selected vertex changes, and therefore, coordinates and the display color held in the vertex information memory unit 2200 change. Accordingly, the image display control unit 205 is instructed to update the vertex information to be displayed (FIG. 29).

Figure 30:
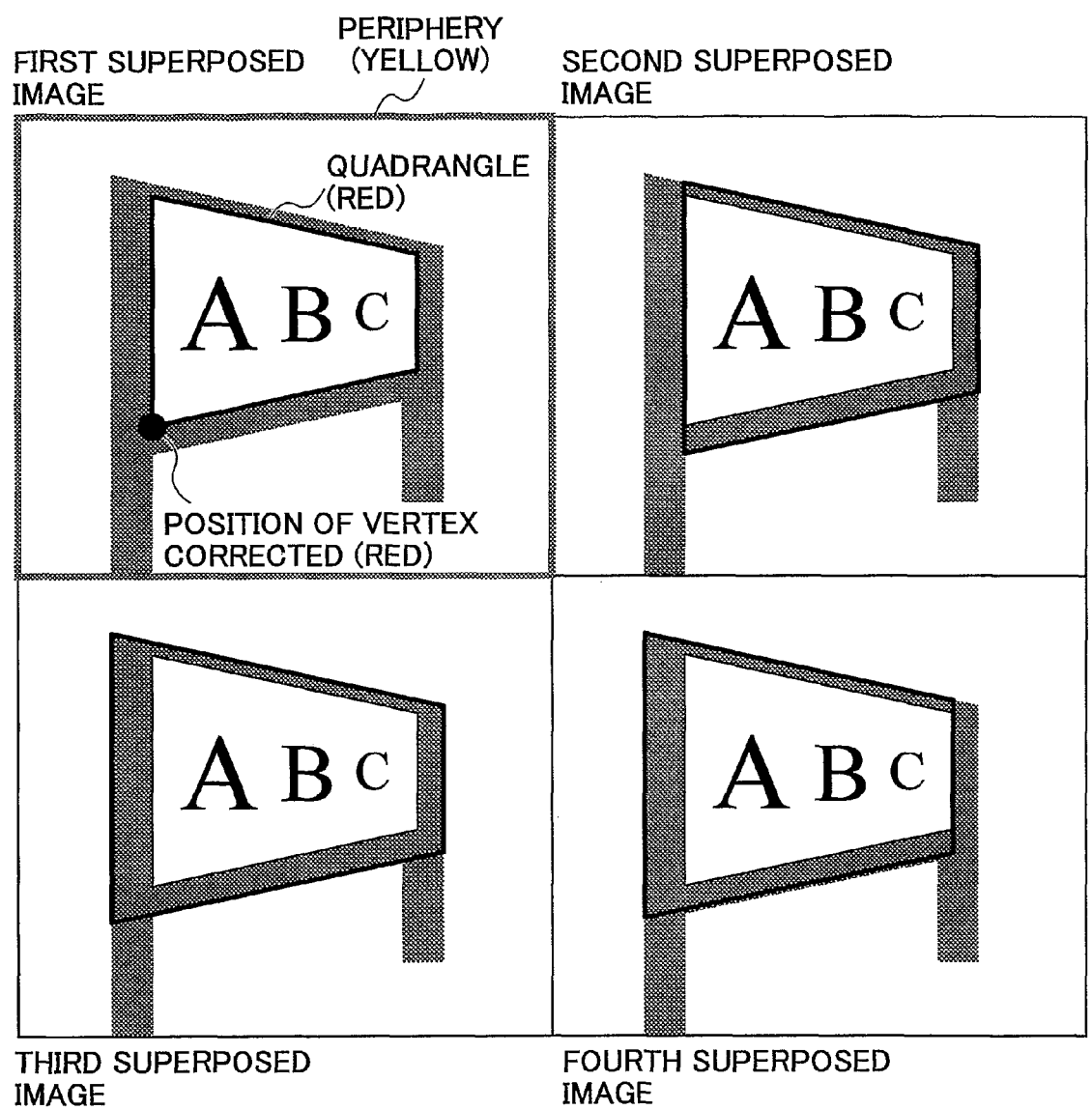
FIG. 30 is still another example of modifying a quadrangle corresponding to the target superposed image.

The four vertexes of the quadrangle are set in order, and therefore, the selected vertex switches from one to another by pressing the right button 194 or the left button 192. When the user presses the up button 191 (step 415), the color of the selected vertex changes (FIG. 30), and the process shifts to a vertex position modification process 404. When the user presses the enter button 195 (step 416), the process shifts to the quadrangle shape determination process 402.

(iv) Vertex Position Modification Process

Figure 31:
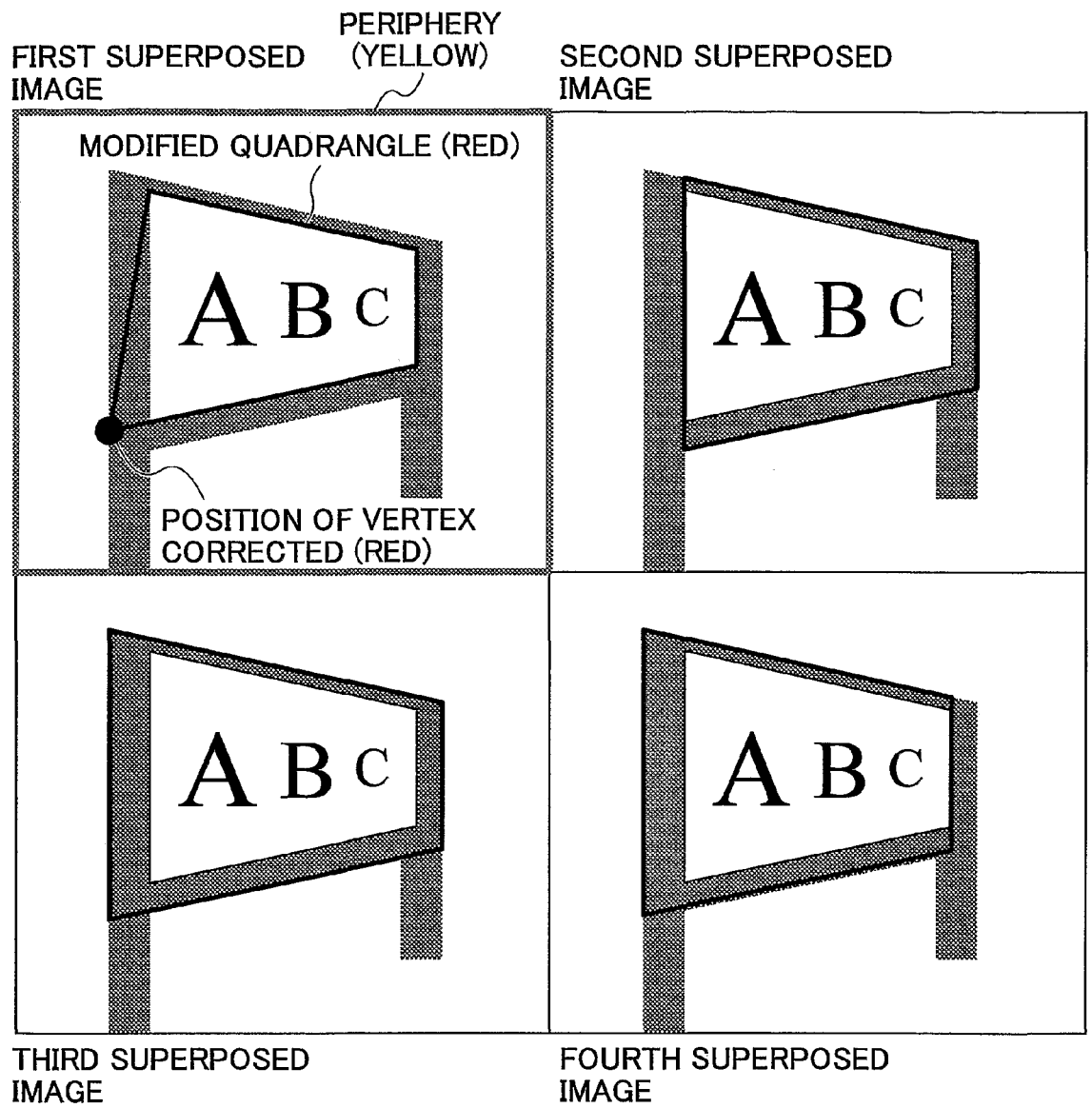
FIG. 31 is still another example of modifying a quadrangle corresponding to the target superposed image.

In the vertex position modification process 404, the user changes the position of the selected vertex. When the user presses any one of the up button 191, the left button 192, the down button 193, or the right button 194 (step 418), in accordance with the direction indicated by the pressed button, the shape of the quadrangle corresponding to the target superposed image held in the target superposed image managing unit 2170 is modified, the superposed image is updated by the superposed image creating unit 202, the coordinates of the vertex held in the vertex information memory unit 2200 are updated, and the image display control unit 205 is instructed to display the modified shape of the quadrangle (FIG. 31). When the user presses the enter button 195 (step 417), the process shifts to the vertex correction selection process 403.

<Projection Transformation Process Unit 204>

The projection transformation process unit 204 calculates a projection transformation matrix based on data of the modified quadrangle (if modification is unnecessary, the quadrangle originally extracted) corresponding to the target superposed image (for example, the first superposed image 2130) held in the target superposed image managing unit 2170. The method of calculating a projection transformation matrix is known (see, for example, Patent Document 1), and the description is therefore omitted.

The projection transformation process unit 204 uses the calculated projection transformation matrix to perform projection transformation on an input image (photographed image) held in the input image memory unit 2190, loads the input image that has undergone projection transformation in the projection transformation image memory unit 2180, and instructs the image display control unit 205 to display the input image that has undergone projection transformation. The image display control unit 205 reads the image that has undergone projection transformation from the projection transformation image memory unit 2180, and displays it on the display unit 18.

Figure 32A:
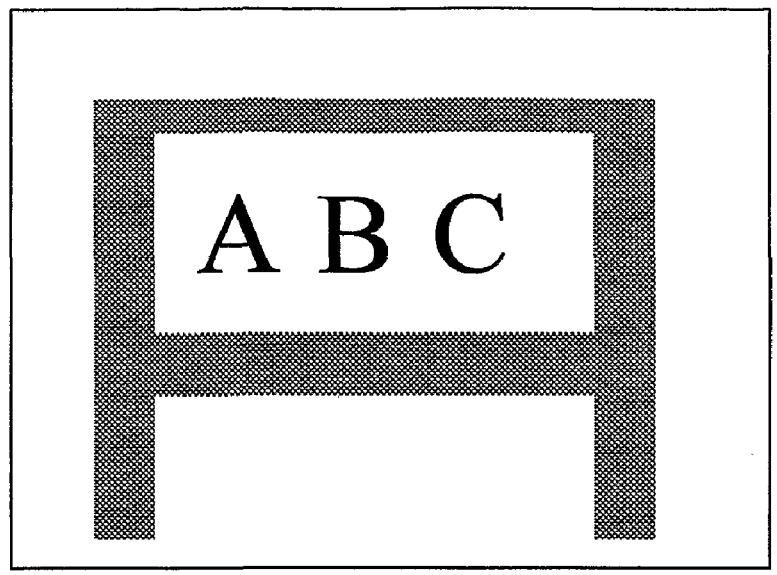
FIGS. 32A, 32B are examples of projection transformation images.
Figure 32B:
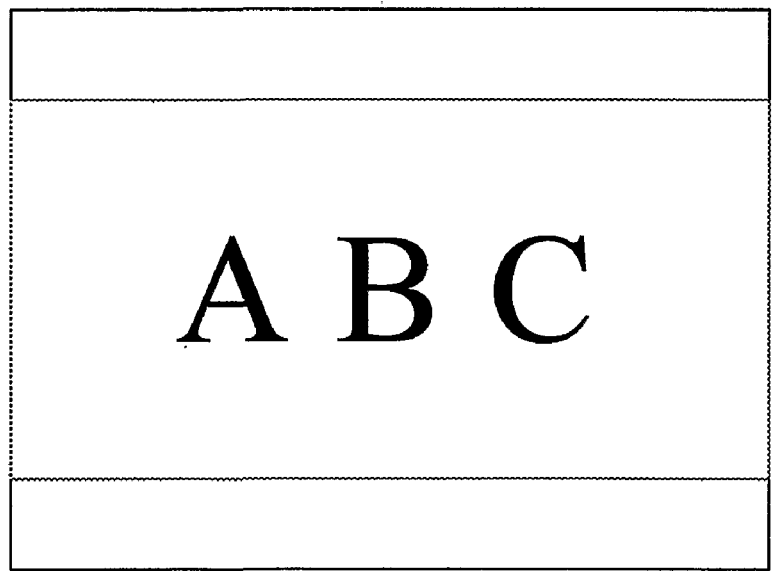

FIGS. 32A, 32B are example screens displaying images that has undergone projection transformation. Each of the images in FIGS. 32A, 32B underwent projection transformation with a projection transformation matrix calculated from the first candidate quadrangle 2080 corresponding to the first superposed image 2130, based on the input image shown in FIG. 21. The image shown in FIG. 32B is obtained by calculating a projection transformation matrix and performing projection transformation on the input image so that the size of the extracted quadrangle is maximized in the image.

<Image Display Control Unit 205>

The image display control unit 205 reads an image held in the superposed image memory unit 2120, the target superposed image managing unit 2170, the input image memory unit 2190, or the projection transformation image memory unit 2180, based on instructions from the superposed image creating unit 202, the quadrangle extraction result modifying unit 203, or the projection transformation process unit 204, and controls the image to be displayed on the display unit 18. Descriptions of operations of the image display control unit 205 have been given above in association with those of the superposed image creating unit 202, the quadrangle extraction result modifying unit 203, or the projection transformation process unit 204, and are therefore omitted here.

[Variations of the Superposed Image Creating Unit 202]

As described above, there are many variations of the method of creating a superposed image (highlighted shape area image) performed by the superposed image creating unit 202, besides the superposed image creation method (part 1) according to the third embodiment. Other variations are described below.

<Superposed Image Creating Unit 202> (Part 2)

FIG. 33 is a flowchart of a superposed image creation method (part 2) according to a fourth embodiment. Similar to the process shown in FIG. 22, the process of FIG. 33 is performed for all pixels of the candidate quadrangles and the input image (RGB 256 shades).

Coordinates and a pixel value (Vr, Vg, Vb) of a pixel of an input image are input (step 501). One candidate quadrangle is input (step 502). In this example, it is assumed that the first candidate quadrangle 2080 is input. In the present embodiment, the superposed image creating unit 202 determines at this point whether the superposed image to be created is a target superposed image (step 503). When the superposed image to be created is a target superposed image (Yes in step 503), the process proceeds to step 504. When the superposed image to be created is not a target superposed image (No in step 503), the process proceeds to step 508. Each pixel of the input image is considered as a target pixel, and the following process is performed on a target pixel.

First, the process performed when the superposed image to be created is a target superposed image (step 504) is described. When a target pixel is inside the quadrangle, the pixel value thereof remains as (Vr, Vg, Vb) (step 505). When the target pixel is on the quadrangle perimeter, the pixel value thereof is set as (0, 0, 255) (blue) (step 506). When the target pixel is outside the quadrangle, the pixel value thereof is set as (0, 0, 0) (black) (step 507).

Next, the process performed when the superposed image to be created is not a target superposed image (step 508) is described. When a target pixel is inside the quadrangle, the pixel value thereof remains as (Vr, Vg, Vb) (step 509). When the target pixel is on the quadrangle perimeter, the pixel value thereof is set as (255, 0, 0) (red) (step 510). When the target pixel is outside the quadrangle, the pixel value thereof remains as (Vr, Vg, Vb) (step 511).

By performing the above process for all pixels in an input image, the superposed image creating unit 202 creates the first superposed image 2130 corresponding to the first candidate quadrangle 2080, as follows. Specifically, if the first superposed image 2130 is the target superposed image, the area corresponding to the first candidate quadrangle 2080 is highlighted by blue, and the background is colored with black. If the first superposed image 2130 is not the target superposed image, the area corresponding to the first candidate quadrangle 2080 is highlighted by red, and the rest part of the area remains unchanged. The created first superposed image 2130 is loaded in the superposed image memory unit 2120.

In a similar manner, the superposed image creating unit 202 creates the second superposed image 2140 from the second candidate quadrangle 2090, the third superposed image 2150 from the third candidate quadrangle 2100, and the fourth superposed image 2160 from the fourth candidate quadrangle 2110, and loads the created images in the superposed image memory unit 2120. At the same time, the target superposed image is loaded in the target superposed image managing unit 2170.

When all four superposed images are created, the superposed image creating unit 202 instructs the image display control unit 205 to display them at once. For example, an instruction is given to display the first superposed image 2130 in the top left, the second superposed image 2140 in the top right, the third superposed image 2150 in the bottom left, and the fourth superposed image 2160 in the bottom right. The image display control unit 205 reads the superposed images 2130 through 2160 from the superposed image memory unit 2120, and displays them on the display unit 18 according to the instructions from the superposed image creating unit 202. FIG. 34 is one example shown on the display unit 18. FIG. 34 indicates that the first superposed image 2130 is the target superposed image. Similar to the third embodiment (part 1), only the target superposed image can be enlarged and displayed in front of the rest of the images, as shown in FIG. 24, so that the target superposed image can be easily recognized. Alternatively, the input image (shown in FIG. 21) can be displayed together with the four superposed images, as shown in FIG. 25, so that the superposed images can be compared with the input image.

<Superposed Image Creating Unit 202> (Part 3)

Figure 35:
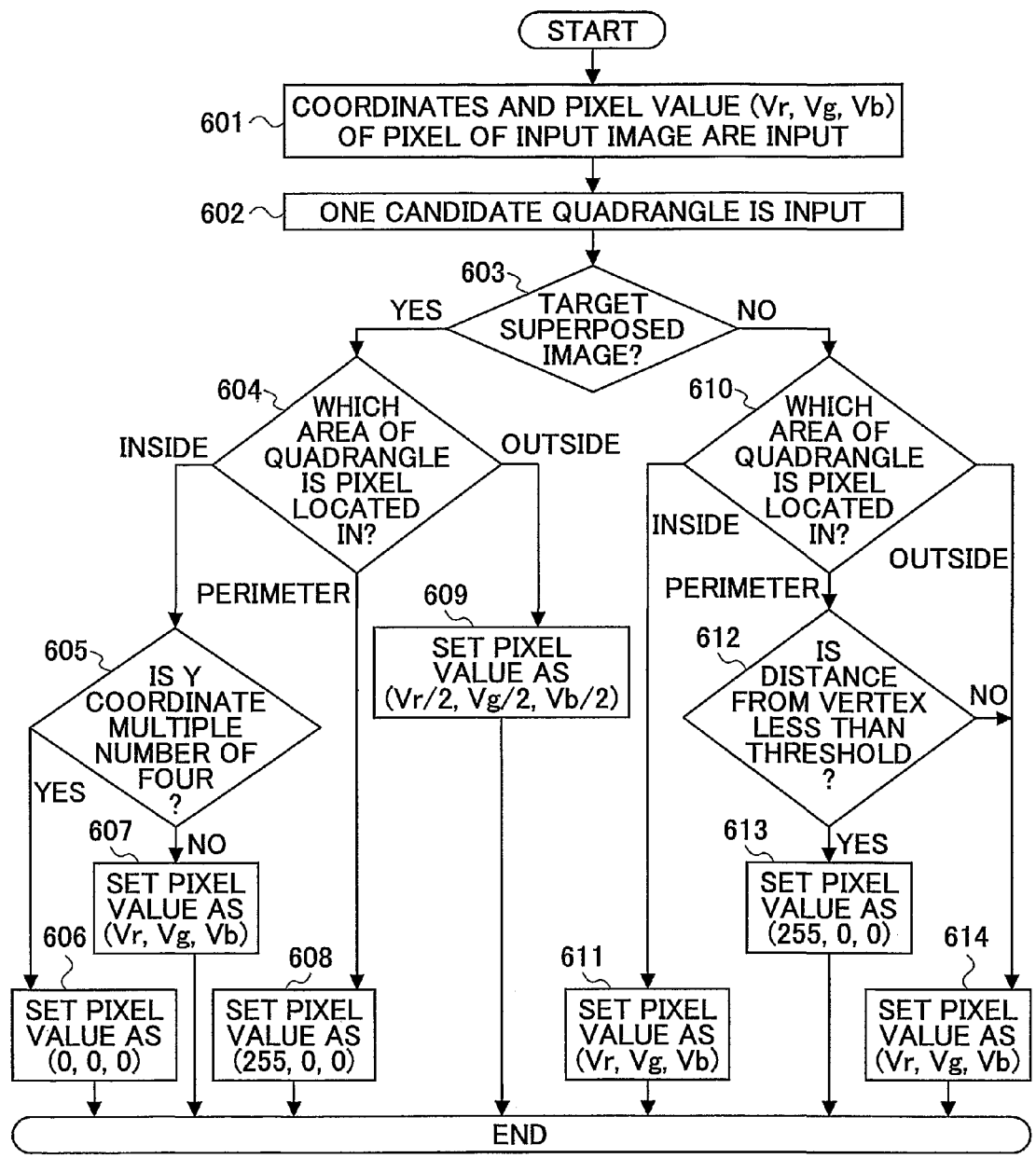
FIG. 35 is a flowchart of a superposed image creation method (part 3) according to a fifth embodiment.

FIG. 35 is a flowchart of a superposed image creation method (part 3) according to a fifth embodiment. Similar to the process shown in FIG. 22, the process of FIG. 35 is performed for all pixels of the candidate quadrangles and the input image (RGB 256 shades).

Coordinates and a pixel value (Vr, Vg, Vb) of a pixel of an input image are input (step 601). One candidate quadrangle is input (step 602). In this example, it is assumed that the first candidate quadrangle 2080 is input. The superposed image creating unit 202 determines at this point whether the superposed image to be created is a target superposed image (step 603). When the superposed image to be created is a target superposed image (Yes in step 603), the process proceeds to step 604. When the superposed image to be created is not a target superposed image (No in step 603), the process proceeds to step 610. Each pixel of the input image is considered as a target pixel, and the following process is performed on a target pixel.

First, the process performed when the superposed image to be created is a target superposed image (step 604) is described. When a target pixel is inside the quadrangle, the superposed image creating unit 202 determines whether the Y coordinate is a multiple number of four (step 605). When the Y coordinate is a multiple number of four (Yes in step 605), the pixel value thereof is set as (0, 0, 0) (black) (step 606). When the Y coordinate is not a multiple number of four (No in step 605), the pixel value thereof remains as (Vr, Vg, Vb) (step 607). When the target pixel is on the quadrangle perimeter, the pixel value thereof is set as (255, 0, 0) (red) (step 608). When the target pixel is outside the quadrangle, the pixel value thereof is set as (Vr/2, Vg/2, Vb/2) (step 609).

Next, the process performed when the superposed image to be created is not a target superposed image (step 610) is described. When a target pixel is inside the quadrangle, the pixel value thereof remains as (Vr, Vg, Vb) (step 611). When the target pixel is on the quadrangle perimeter, the superposed image creating unit 202 determines whether the distance between the target pixel and a vertex of the quadrangle is less than a predetermined threshold (step 612). When the distance between the target pixel and the vertex of the quadrangle is less than the predetermined threshold (Yes in step 612), the pixel value thereof is set as (255, 0, 0) (red) (step 613). When the distance between the target pixel and the vertex of the quadrangle is greater than or equal to the predetermined threshold (No in step 612), the pixel value thereof remains as (Vr, Vg, Vb) (step 614). Also, when the target pixel is outside the quadrangle, the pixel value thereof remains as (Vr, Vg, Vb) (step 614).

By performing the above process for all pixels in an input image, the superposed image creating unit 202 creates the first superposed image 2130 corresponding to the first candidate quadrangle 2080, as follows. Specifically, if the first superposed image 2130 is the target superposed image, the area corresponding to the first candidate quadrangle 2080 is highlighted by red, black horizontal lines are added in the inside of the quadrangle area, and the background is converted to grey. If the first superposed image 2130 is not the target superposed image, only predetermined lengths from four vertexes in the area corresponding to the first candidate quadrangle 2080 are highlighted by red, and the rest remains unchanged. The created first superposed image 2130 is loaded in the superposed image memory unit 2120.

In a similar manner, the superposed image creating unit 202 creates the second superposed image 2140 from the second candidate quadrangle 2090, the third superposed image 2150 from the third candidate quadrangle 2100, and the fourth superposed image 2160 from the fourth candidate quadrangle 2110, and loads the created images in the superposed image memory unit 2120. At the same time, the target superposed image is loaded in the target superposed image managing unit 2170.

Figure 36:
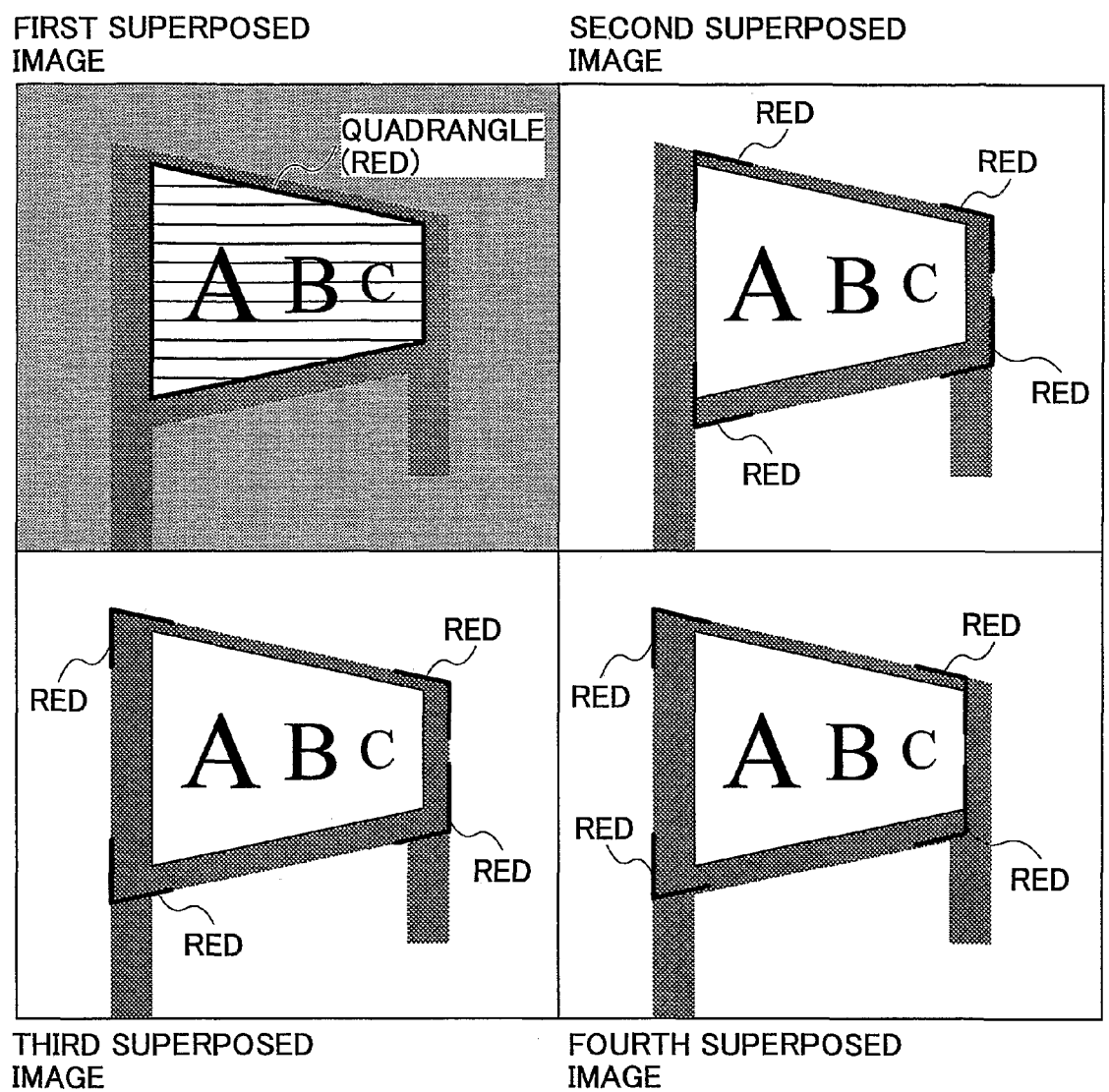
FIG. 36 is an example of superposed images according to the fifth embodiment.

When all four superposed images are created, the superposed image creating unit 202 instructs the image display control unit 205 to display them at once. For example, an instruction is given to display the first superposed image 2130 in the top left, the second superposed image 2140 in the top right, the third superposed image 2150 in the bottom left, and the fourth superposed image 2160 in the bottom right. The image display control unit 205 reads the superposed images 2130 through 2160 from the superposed image memory unit 2120, and displays them on the display unit 18 according to the instructions from the superposed image creating unit 202. FIG. 36, is one example shown on the display unit 18. FIG. 36 indicates that the first superposed image 2130 is the target superposed image. Similar to the third embodiment (part 1), only the target superposed image can be enlarged at the front, or the input image can also be displayed together with the four superposed images.

<Superposed Image Creating Unit 202> (Part 4)

Figure 37:
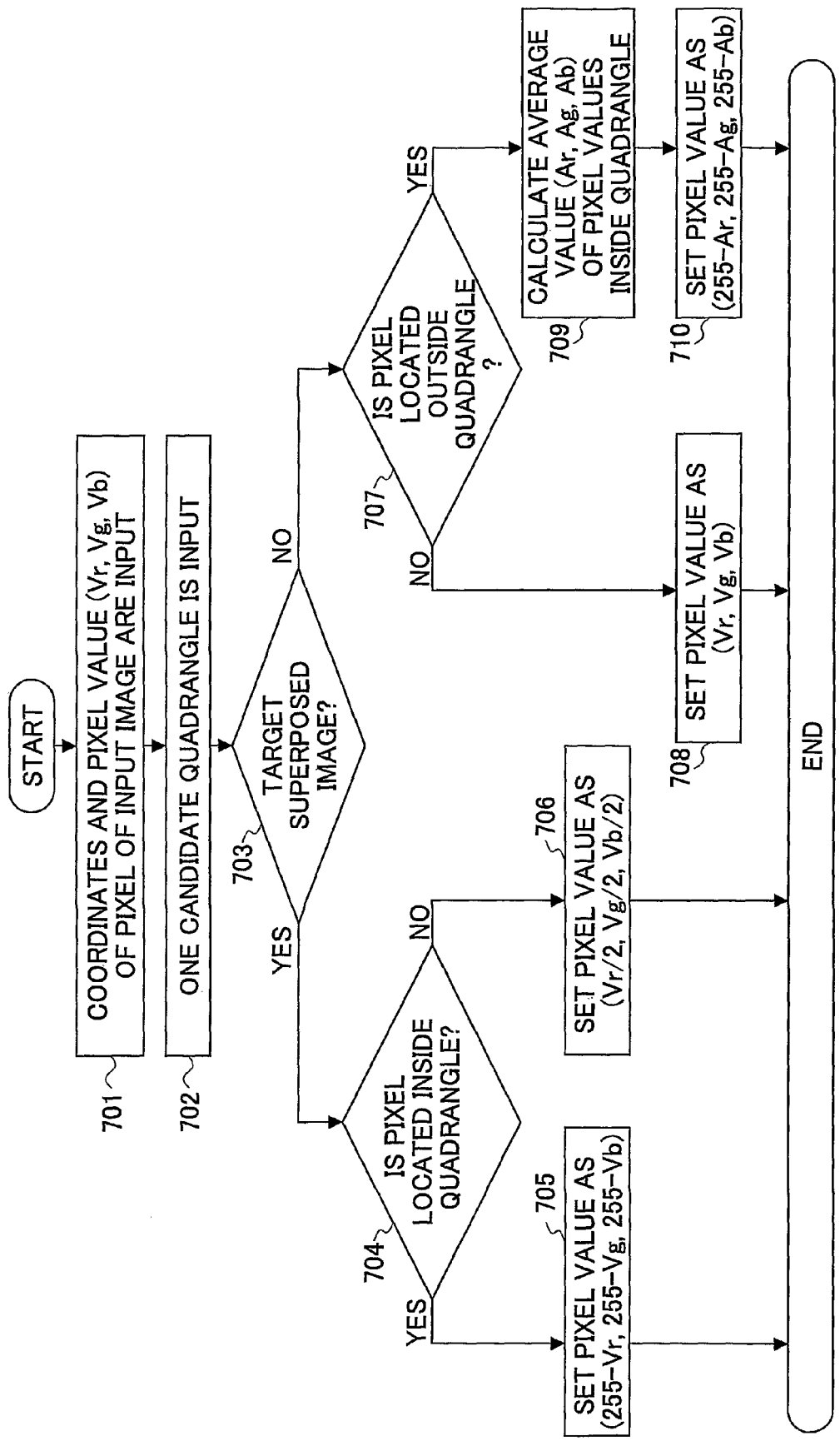
FIG. 37 is a flowchart of a superposed image creation method (part 4) according to a sixth embodiment.

FIG. 37 is a flowchart of a superposed image creation method (part 4) according to a sixth embodiment. Similar to the process shown in FIG. 22, the process of FIG. 37 is performed for all pixels of the candidate quadrangles and the input image (RGB 256 shades).

Coordinates and a pixel value (Vr, Vg, Vb) of a pixel of an input image are input (step 701). One candidate quadrangle is input (step 702). In this example, it is assumed that the first candidate quadrangle 2080 is input. The superposed image creating unit 202 determines at this point whether the superposed image to be created is a target superposed image (step 703). When the superposed image to be created is a target superposed image (Yes in step 703), the process proceeds to step 704. When the superposed image to be created is not a target superposed image (No in step 703), the process proceeds to step 707. Each pixel of the input image is considered as a target pixel, and the following process is performed on a target pixel.

First, the process performed when the superposed image to be created is a target superposed image (step 704) is described. When a target pixel is inside the quadrangle (Yes in step 704), the pixel value thereof is set as (255-Vr, 255-Vg, 255-Vb) (step 705). When the target pixel is not inside the quadrangle (No in step 704), the pixel value thereof is set as (Vr/2, Vg/2, Vb/2) (step 706).

Next, the process performed when the superposed image to be created is not a target superposed image (step 707) is described. When a target pixel is outside the quadrangle (Yes in step 707), an average value (Ar, Ag, Ab) of the pixel values inside the quadrangle is calculated in advance (step 709), and the pixel value of the target pixel is set as (255-Ar, 255-Ag, 255-Ab) (step 710). When the target pixel is not outside the quadrangle (No in step 707), the pixel value thereof remains as (Vr, Vg, Vb) (step 708).

By performing the above process for all pixels in an input image, the superposed image creating unit 202 creates the first superposed image 2130 corresponding to the first candidate quadrangle 2080, as follows. Specifically, if the first superposed image 2130 is the target superposed image, the inside of the quadrangle is highlighted by inverted colors, while the outside of the quadrangle is converted to grey. If the first superposed image 2130 is not the target superposed image, the inside of the quadrangle remains unchanged, and the outside is converted to an inverted color of an average pixel value of the inside of the quadrangle. The created first superposed image 2130 is loaded in the superposed image memory unit 2120.

In a similar manner, the superposed image creating unit 202 creates the second superposed image 2140 from the second candidate quadrangle 2090, the third superposed image 2150 from the third candidate quadrangle 2100, and the fourth superposed image 2160 from the fourth candidate quadrangle 2110, and loads the created images in the superposed image memory unit 2120. At the same time, the target superposed image is loaded in the target superposed image managing unit 2170.

When all four superposed images are created, the superposed image creating unit 202 instructs the image display control unit 205 to display them at once. For example, an instruction is given to display, the first superposed image 2130 in the top left, the second superposed image 2140 in the top right, the third superposed image 2150 in the bottom left, and the fourth superposed image 2160 in the bottom right. The image display control unit 205 reads the superposed images 2130 through 2160 from the superposed image memory unit 2120, and displays them on the display unit 18 according to the instructions from the superposed image creating unit 202. FIG. 38 is one example shown on the display unit 18. FIG. 38 indicates that the first superposed image 2130 is the target superposed image. Similar to the third embodiment (part 1), only the target superposed image can be enlarged at the front, or the input image can also be displayed together with the four superposed images.

<Superposed Image Creating Unit 202> (Part 5)

Figure 39:
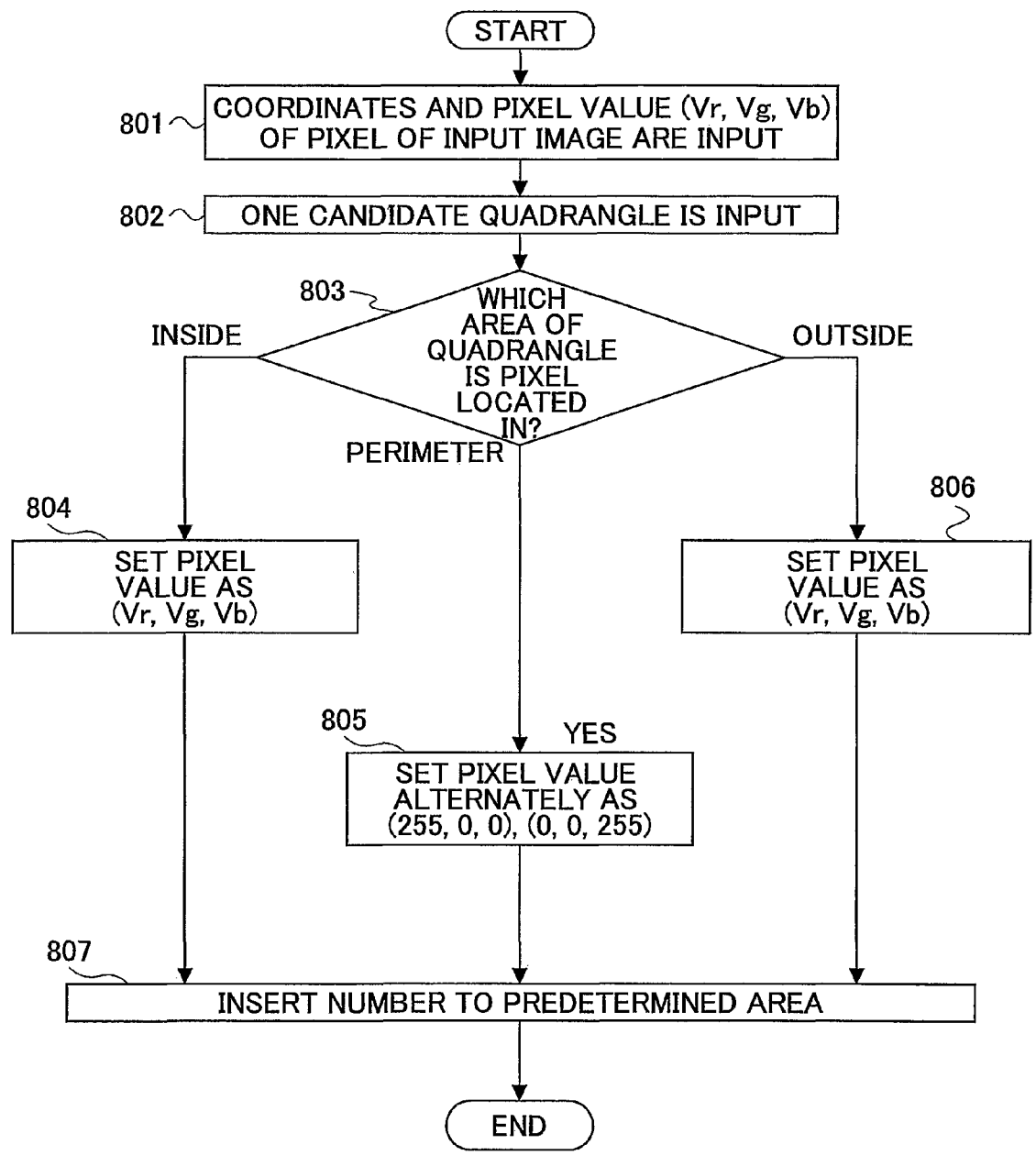
FIG. 39 is a flowchart of a superposed image creation method (part 5) according to a seventh embodiment.

FIG. 39 is a flowchart of a superposed image creation method (part 5) according to a seventh embodiment. Similar to the process shown in FIG. 22, the process of FIG. 39 is performed for all pixels of the candidate quadrangles and the input image (RGB 256 shades).

Coordinates and a pixel value (Vr, Vg, Vb) of a pixel of an input image are input (step 801). One candidate quadrangle is input (step 802). In this example, it is assumed that the first candidate quadrangle 2080 is input. Each pixel of the input image is considered as a target pixel, and the following process is performed on a target pixel.

The superposed image creating unit 202 determines whether a target pixel is inside the extracted quadrangle (first candidate quadrangle), on the perimeter of the quadrangle, or outside the quadrangle (step 803). When the target pixel is inside the quadrangle, the pixel value thereof remains as (Vr, Vg, Vb) (step 804). When the target pixel is on the perimeter of the quadrangle, the pixel value thereof is alternately set as (255, 0, 0) (red) or (0, 0, 255) (blue) for each fixed interval (step 805). When the target pixel is outside the quadrangle, the pixel value thereof remains as (Vr, Vg, Vb) (step 806). When processes are completed for all pixels, a number corresponding to the superposed image is provided in a predetermined area (step 807). For example, the background is set as (255, 255, 255), and the number is set as (0, 0, 0).

By performing the above process for all quadrangles, the superposed image creating unit 202 creates superposed images each including a quadrangle alternately highlighted by red and blue. Also, numbers "1", "2", "3", and "4" are provided in the first, second, third, and fourth superposed image, respectively.

Figure 40:
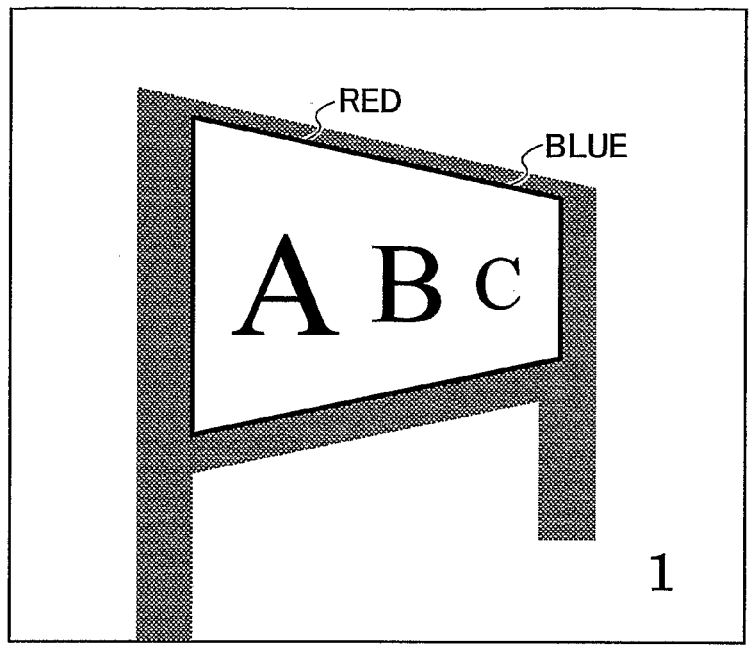
FIG. 40 is an example of a superposed image according to the seventh embodiment.
Figure 41:
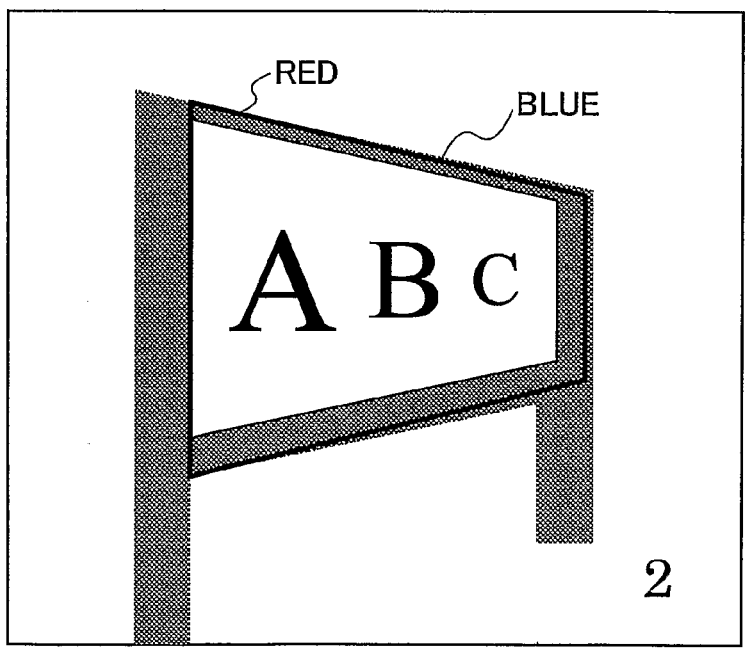
FIG. 41 is another example of a superposed image according to the seventh embodiment.
Figure 42:
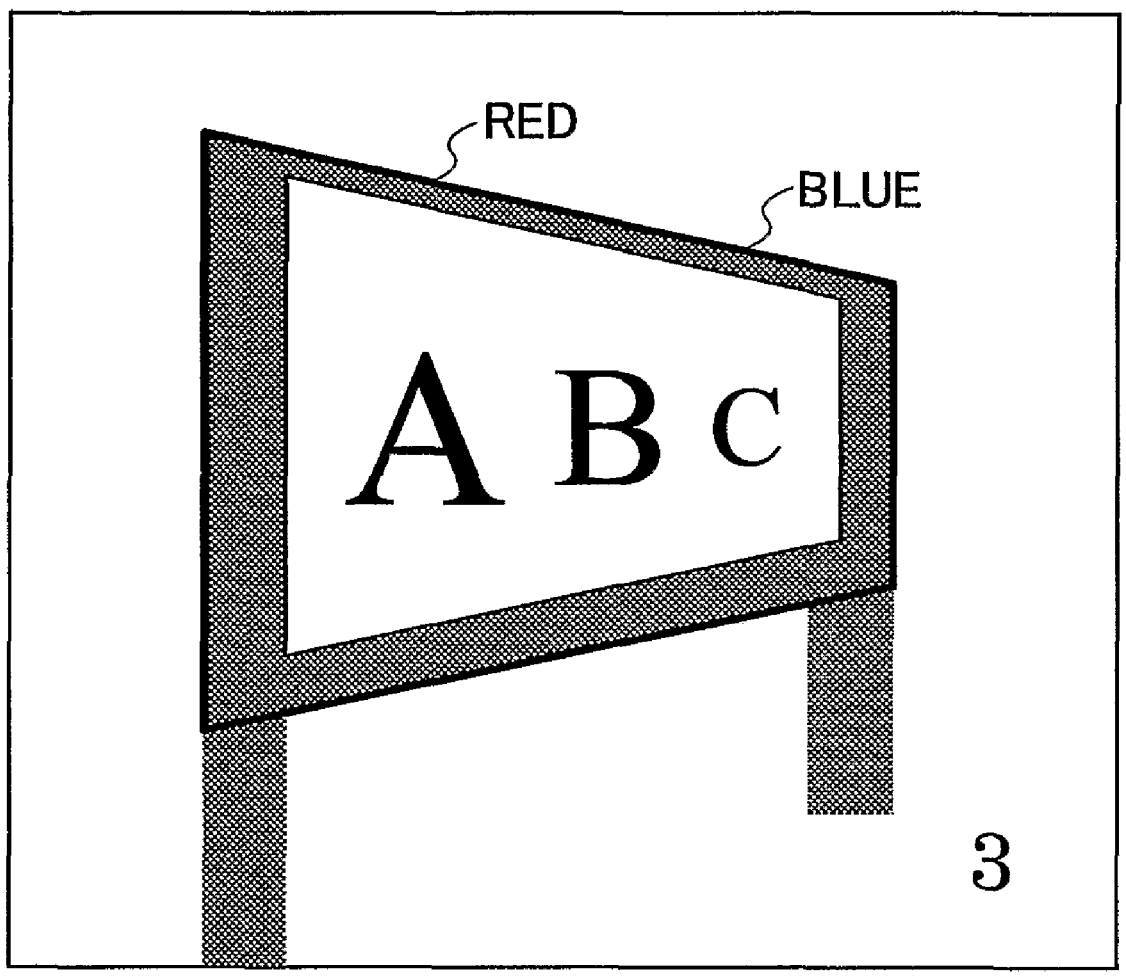
FIG. 42 is still another example of a superposed image according to the seventh embodiment.

FIGS. 40 through 43 are examples of superposed images according to the present embodiment. FIG. 40 is the first superposed image, FIG. 41 is the second superposed image, FIG. 42 is the third superposed image, and FIG. 43 is the fourth superposed image. In this case, the superposed images are displayed individually, and the displayed image can be switched by pressing the right button 194 or the left button 192, etc.

<Superposed Image Creating Unit 202> (Part 6)

FIG. 44 is a flowchart of a superposed image creation method (part 6) according to an eighth embodiment. In the eighth embodiment, the first to fourth candidate quadrangles are included in a single superposed image.

Coordinates and a pixel value (Vr, Vg, Vb) of a pixel of an input image are input (step 901). The first to fourth candidate quadrangles are input (step 902). One of the first to fourth candidate quadrangles is considered as a target quadrangle, each pixel of the input image is considered as a target pixel, and the following process is performed on each candidate quadrangle and all pixels of the input image.

The superposed image creating unit 202 determines whether the target pixel is on the perimeter of the first candidate quadrangle, the second candidate quadrangle, the third candidate quadrangle, or the fourth candidate quadrangle (step 903). When the target pixel is not on any of the perimeters (No in step 903), the pixel value thereof remains as (Vr, Vg, Vb) (step 904). For example, the line width of the perimeter of the first candidate quadrangle is 2, and the line width of the perimeter of the remaining candidate quadrangles is 1.

When the target pixel is on the perimeter, of any one of the first candidate quadrangle, the second candidate quadrangle, the third candidate quadrangle, or the fourth candidate quadrangle (Yes in step 903), the superposed image creating unit 202 determines whether the target pixel is on the perimeter of a target quadrangle (step 905). The line width of the perimeter of the target candidate quadrangle is 2, and the line width of the perimeter of the remaining candidate quadrangles is 1. When the target pixel is on the perimeter of a target quadrangle (Yes in step 905), the pixel value thereof is set as (255, 0, 0) (red) (step 906). When the target pixel is not on the perimeter of the target quadrangle (No in step 905), the pixel value thereof is set as (0, 0, 255) (blue) (step 907). When the target pixel is on the perimeter of the target quadrangle and also on the perimeter of a quadrangle other than the target quadrangle, it is determined as being on the perimeter of the target quadrangle.

Figure 45:
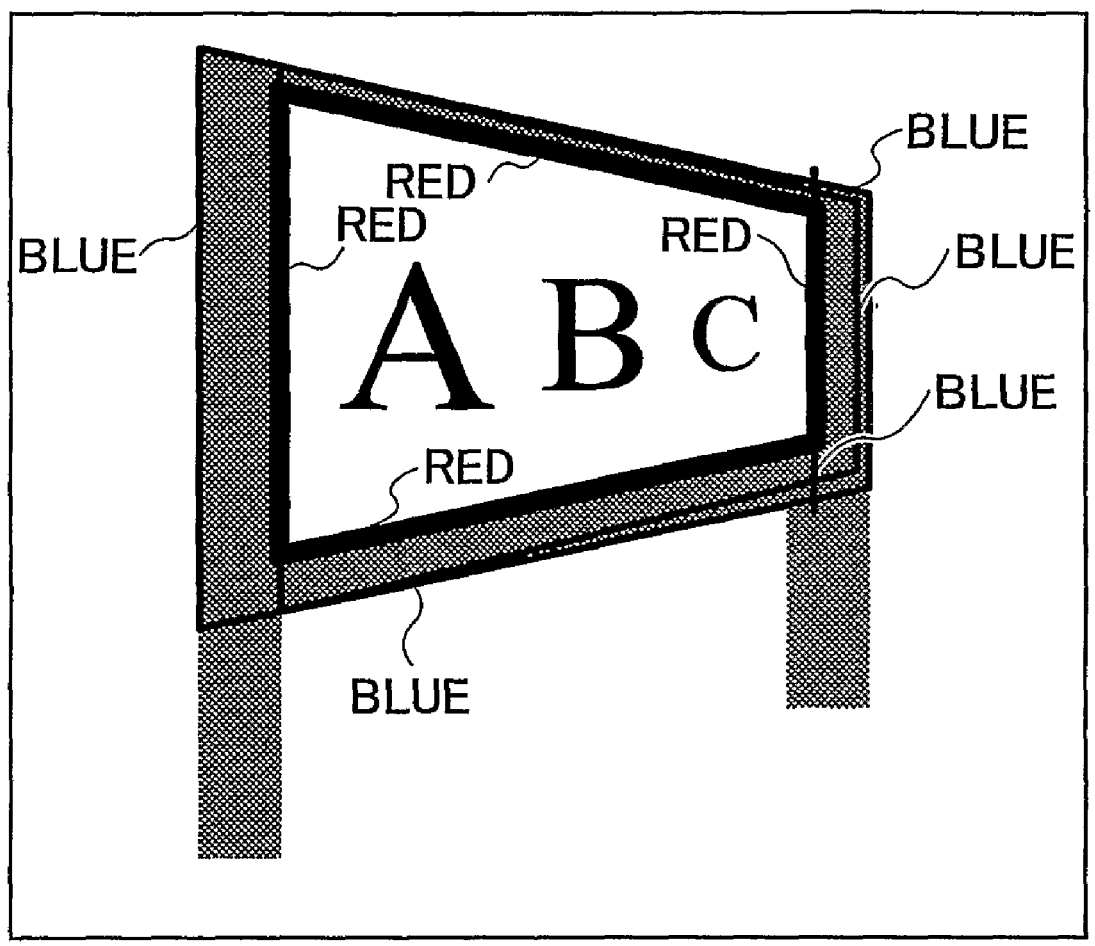
FIG. 45 is an example of a superposed image according to the eighth embodiment.

FIG. 45 is an example screen displaying a superposed image obtained in the present embodiment. In this example, the first candidate quadrangle is the target quadrangle, and therefore, the perimeter of the first candidate quadrangle is highlighted by red, and the other candidate quadrangles are highlighted by blue.

By switching the target quadrangle in the superposed image to the second candidate triangle, the perimeter of only the second candidate quadrangle becomes red, and perimeters of other quadrangles become blue. When the target quadrangle is switched the third candidate triangle, the perimeter of only the third candidate quadrangle becomes red, and perimeters of other quadrangles become blue. The target quadrangle can be switched by pressing the left button 192 or the right button 194.

Other methods besides the above-described variations of creating superposed images are conceivable. A list of functions used in methods for creating superposed images, including the above-described methods, is given below.

The following are functions used for highlighting the shape area when the image is dependent on the pixel value of an input image:

1. A function to convert the luminance value (RGB) of the input image to another coordinate system (for example, HSV coordinate system), perform a process on the coordinate system after conversion, and then convert back the luminance value to the RGB coordinate system.

2. A function to calculate an average value of pixel values around pixels of an input image, and output the calculated value.

3. A function to calculate variations of neighboring pixels (differential filter, Gaussian filter, etc.) of pixels of an input image, and output the calculated value.

4. A function to perform a mosaic process on the pixels of an input image.

5. A function to perform an embossing process on the pixels of an input image.

6. A function to calculate an average value of pixel values of another area (for example, an external area of the quadrangle as opposed to the internal area of the quadrangle) when the image is input, and calculate an output value based on the average value.

The following are functions used for highlighting the shape area when the image is not dependent on the luminance vale of an input image:

1. A function to paint the area with a checkered pattern.
2. A function to paint the area with vertical lines of white (single color 1) and black (single color 2).
3. A function to paint the area with white (single color 1) and create sesame-like noises with black (single color 2).

To serve both pixels dependent on the luminance value of the input image and pixels not dependent on the luminance value of the input image, it is possible to create a function by merging a function dependent on the luminance value of the input image and a function not dependent on the luminance value of the input image. For example, on an image that has undergone a process by a first function, particular coordinates can be painted with a letter by a second function.

Moreover, as described in the eighth embodiment (Part 6), the line width of the perimeter of the quadrangle can be varied.

The method according to the first embodiment described with reference to FIGS. 4 through 14 can be employed for extracting candidate quadrangles from a photographed image in the other embodiments. The quadrangle extracting unit 201 shown in FIG. 20 is the same as the quadrangle extracting section 200 shown in FIG. 3.

According to the present invention, a quadrangle can be recognized from a photographed image, and the recognized quadrangle can be transformed into an image that appears to have been taken from the front, with high precision and high speed.

According to the present invention, in using a digital camera, etc., when a plurality of shapes, e.g., rectangles, extracted from a photographed image are superposed on an image displayed for the user to select a desired rectangle, the user can easily select the optimal rectangle. Moreover, when a desired shape is not extracted, the user can modify an extracted shape to obtain the desired shape, without taking a photograph of the object again.

The present invention is not limited to the specifically disclosed embodiment, and variations and expansions may be made without departing from the scope of the present invention.

The present application is based on Japanese Priority Patent Application No. 2005-243958, filed on Aug. 25, 2005, and Japanese Priority Patent Application No. 2005-251440, filed on Aug. 31, 2005, the entire contents of which are hereby incorporated by reference.

The invention claimed is:

1. An image processing method implemented by a computer programmed as an image processing apparatus for recognizing one or more quadrangles from an input image, the method comprising the steps of:

(a) detecting, by the image processing apparatus, a plurality of edge areas from the input image;

(b) extracting a plurality of lines, the lines corresponding to the edge areas detected;

(b') selecting a plurality of line pairs from the lines extracted at the step (b), generating a new line according to a positional relationship between two lines included in a line pair among the selected line pairs, and adding the new line to the lines extracted at the step (b);

(c) categorizing into a category a line pair selected from the extracted lines according to a positional relationship between two lines included in the line pair, and calculating a line pair evaluation value for the line pair, wherein the step (c) includes selecting all line pairs from the lines extracted in step (b) and the new line generated in step (b');

(d) selecting a combination of two line pairs from a plurality of line pairs, generating a quadrangle from four lines included in the two line pairs selected, and calculating a quadrangle evaluation value for the quadrangle based on the categories and the line pair evaluation values of the two line pairs forming the quadrangle; and (e) selecting a quadrangle based on the calculated quadrangle evaluation value.

2. The image processing method according to claim 1, wherein the step (a) includes calculating a vertical luminance variation amount and a horizontal luminance variation amount for each pixel of the input image;

detecting the edge areas from the input image based on the calculated vertical luminance variation amounts and horizontal luminance variation amounts;

dividing a two-dimensional space formed by the vertical luminance variation amounts and the horizontal luminance variation amounts by direction; and assigning the edge areas to a plurality of direction groups corresponding to the directions.

3. The image processing method according to claim 2, wherein the step (b) includes extracting lines for each of the direction groups.

4. The image processing method according to claim 1, wherein the step (c) includes categorizing a line pair as opposite, adjacent, or unrelated according to a positional relationship between two lines included in the line pair, and the step (d) includes generating a quadrangle from line pairs categorized as opposite and adjacent.

5. The image processing method according to claim 1, wherein the step (d) includes obtaining an area of a quadrangle, and weighting the quadrangle evaluation value based on the area.

6. The image processing method according to claim 1, wherein the step (d) includes obtaining a projection transformation matrix to transform a quadrangle into a parallelogram, and weighting the quadrangle evaluation value based on a shape of the parallelogram obtained by performing projection transformation on the quadrangle.

7. The image processing method according to claim 1, further comprising a step of:

(g) calculating a projection transformation matrix from a quadrangle selected at the step (e), and performing projection transformation on the input image.

8. An image processing apparatus for recognizing one or more quadrangles from an input image, the apparatus comprising:

an edge area detecting unit configured to detect a plurality of edge areas from the input image;

a line extracting unit configured to extract a plurality of lines, the lines corresponding to the edge areas detected;

a line generating unit configured to select a plurality of line pairs from the lines extracted by the line extracting unit, generate a new line according to a positional relationship between two lines included in a line pair among the selected line pairs, and add the new line to the lines extracted by the line extracting unit;

a line pair categorization/evaluation unit configured to select a line pair from the extracted lines, categorize the line pair into a category according to a positional relationship between two lines included in the line pair, and calculate a line pair evaluation value for the line pair, wherein the line pair categorization/evaluation unit selects all line pairs from the lines extracted by the line extracting unit and the new line generated by the line generating unit;

a quadrangle evaluation unit configured to select a combination of two line pairs from a plurality of line pairs, generate a quadrangle from four lines included in the two line pairs selected, and calculate a quadrangle evaluation value for the quadrangle based on the categories and the line pair evaluation values of the two line pairs forming the quadrangle; and a quadrangle selecting unit configured to select a quadrangle based on the calculated quadrangle evaluation value.

9. The image processing apparatus according to claim 8, wherein the edge area detecting unit calculates a vertical luminance variation amount and a horizontal luminance variation amount for each pixel of the input image;

detects the edge areas from the input image based on the calculated vertical luminance variation amounts and horizontal luminance variation amounts;

divides a two-dimensional space formed by the vertical luminance variation amounts and the horizontal luminance variation amounts by direction; and assigns the edge areas to a plurality of direction groups corresponding to the directions.

10. A digital camera including the image processing apparatus according to claim 8.

11. A non-transitory computer readable medium storing a program that causes a computer to execute the steps of the image processing method according to claim 1.

12. An image processing method implemented by a computer programmed as an image processing apparatus for recognizing one or more quadrangles from an input image, the method comprising the steps of:

(a) detecting, by the image processing apparatus, a plurality of edge areas from the input image;

(b) extracting a plurality of lines, the lines corresponding to the edge areas detected;

(b') selecting a plurality of line pairs from the lines extracted at the step (b), generating a new line according to a positional relationship between two lines included in a line pair among the selected line pairs, and adding the new line to the lines extracted at the step (b);

(c) categorizing into a category a line pair selected from the extracted lines according to a positional relationship between two lines included in the line pair, and calculating a line pair evaluation value for the line pair;

(d) selecting a combination of two line pairs from a plurality of line pairs, generating a quadrangle from four lines included in the two line pairs selected, and calculating a quadrangle evaluation value for the quadrangle based on the categories and the line pair evaluation values of the two line pairs forming the quadrangle; and
(e) selecting a quadrangle based on the calculated quadrangle evaluation value,
wherein the step (a) includes
    calculating a vertical luminance variation amount and a horizontal luminance variation amount for each pixel of the input image;
    detecting the edge areas from the input image based on the calculated vertical luminance variation amounts and horizontal luminance variation amounts;
    dividing a two-dimensional space formed by the vertical luminance variation amounts and the horizontal luminance variation amounts by direction; and
    assigning the edge areas to a plurality of direction groups corresponding to the directions;
the step (b) includes extracting lines for each of the direction groups; and
the step (b) includes searching each edge area, integrating a plurality of edge areas which edge areas are adjacent to each other by a predetermined number of pixels to form an integrated edge area, removing the original edge areas used for forming the integrated edge area, and extracting a line corresponding to the integrated edge area.

* * * * *